(12) United States Patent  
Adato et al.

(10) Patent No.: US 12,154,459 B2  
(45) Date of Patent: Nov. 26, 2024

(54) CUSTOMIZED PRESENTATION OF ITEMS ON ELECTRONIC VISUAL DISPLAYS IN RETAIL STORES BASED ON AVAILABILITY OF PRODUCTS

(71) Applicant: Trax Technology Solutions Pte Ltd., Singapore (SG)

(72) Inventors: Yair Adato, Kfar Ben Nun (IL); Nir Hemed, Tel Aviv (IL); Dolev Pomeranz, Hod Hasharon (IL)

(73) Assignee: Trax Technology Solutions Pte Ltd., Singapore (SG)

( * ) Notice: Subject to any disclaimer, the term of this patent is extended or adjusted under 35 U.S.C. 154(b) by 392 days.

(21) Appl. No.: 17/563,412

(22) Filed: Dec. 28, 2021

(65) Prior Publication Data

US 2022/0122137 A1    Apr. 21, 2022

Related U.S. Application Data

(63) Continuation of application No. PCT/IB2020/000601, filed on Jul. 20, 2020.  
(Continued)

(51) Int. Cl.  
*G06Q 30/00* (2023.01)  
*G01G 19/52* (2006.01)  
(Continued)

(52) U.S. Cl.  
CPC .......... *G09F 13/045* (2021.05); *G01G 19/52* (2013.01); *G06Q 10/063114* (2013.01);  
(Continued)

(58) Field of Classification Search  
CPC .............................................. G06Q 30/06–08  
See application file for complete search history.

(56) References Cited

U.S. PATENT DOCUMENTS 9,052,536 B2    6/2015  Artwohl  
9,967,109 B2    5/2018  Nishimura  
(Continued)

FOREIGN PATENT DOCUMENTS

EP            3 301 388 A1     4/2018  
WO    WO 2012/028551 A1     3/2012  
(Continued)

OTHER PUBLICATIONS

Halverson, R., "Shelf Pricing Catches on at Chains", Discount Store News 28 n.3: p5(2), Lebhar-Friedman, Feb. 6, 1989 (Year: 1989).*  
(Continued)

*Primary Examiner* — Ethan D Civan  
(74) *Attorney, Agent, or Firm* — Haynes and Boone, LLP

(57) ABSTRACT

Methods, systems, and computer-readable media are provided for customized presentation of items on electronic visual displays in retail stores. In one implementation, a method may comprise: obtaining a plurality of images of products in a retail store captured; analyzing a first image to determine whether products of a particular product type are available at a first point in time; analyzing a second image to determine whether products of the particular product type are available at a second point in time; based on the determination of whether products of the particular product type are available at the first point in time and the determination of whether products of the particular product type are available at the second point in time, selecting at least one display parameter for a particular item; and using the selected at least one display parameter to display the particular item on an electronic visual display.

19 Claims, 33 Drawing Sheets

Related U.S. Application Data

(60) Provisional application No. 62/876,685, filed on Jul. 21, 2019.

(51) Int. Cl.

| | | |
|---|---|---|
| *G06Q 10/0631* | (2023.01) | |
| *G06Q 10/087* | (2023.01) | |
| *G06Q 30/0201* | (2023.01) | |
| *G06Q 30/0207* | (2023.01) | |
| *G06Q 30/0238* | (2023.01) | |
| *G06Q 30/0241* | (2023.01) | |
| *G06Q 30/0601* | (2023.01) | |
| *G06V 20/68* | (2022.01) | |
| *G06V 40/10* | (2022.01) | |
| *G09F 3/20* | (2006.01) | |
| *G09F 13/04* | (2006.01) | |
| *G09F 13/12* | (2006.01) | |

(52) U.S. Cl.
CPC ....... *G06Q 10/087* (2013.01); *G06Q 30/0201* (2013.01); *G06Q 30/0223* (2013.01); *G06Q 30/0238* (2013.01); *G06Q 30/0241* (2013.01); *G06Q 30/0601* (2013.01); *G06Q 30/0625* (2013.01); *G06V 20/68* (2022.01); *G06V 40/10* (2022.01); *G09F 3/204* (2013.01); *G09F 3/208* (2013.01); *G09F 13/12* (2013.01)

(56) References Cited

U.S. PATENT DOCUMENTS

| | | |
|---|---|---|
| 9,972,284 B2 | 5/2018 | Lee |
| 10,705,288 B2 | 7/2020 | Dunn |
| 10,891,681 B2 | 1/2021 | Lee |
| 11,645,613 B1 | 5/2023 | Capers et al. |
| 2006/0237427 A1 | 10/2006 | Logan |
| 2008/0052202 A1 | 2/2008 | Bodin et al. |
| 2010/0180615 A1 | 7/2010 | Linder et al. |
| 2012/0169477 A1 | 7/2012 | Seo et al. |
| 2013/0063326 A1 | 3/2013 | Riegel |
| 2014/0006229 A1 | 1/2014 | Birch et al. |
| 2014/0316561 A1 | 10/2014 | Tkachenko et al. |
| 2015/0199942 A1* | 7/2015 | Mochizuki ............ G06F 3/147 345/1.3 |
| 2015/0348155 A1* | 12/2015 | DuBois ............ G06Q 30/0603 705/14.51 |
| 2016/0033194 A1 | 2/2016 | Sumihiro et al. |
| 2016/0182864 A1 | 6/2016 | Izawa et al. |
| 2016/0328813 A1* | 11/2016 | Montgomery ....... G06Q 10/087 |
| 2017/0124603 A1 | 5/2017 | Olson |
| 2017/0193434 A1 | 7/2017 | Shah et al. |
| 2017/0219276 A1 | 8/2017 | Wang et al. |
| 2017/0329078 A1 | 11/2017 | Dunn et al. |
| 2018/0060803 A1 | 3/2018 | Cheruku et al. |
| 2018/0091568 A1 | 3/2018 | Edington, Jr. |
| 2018/0150788 A1* | 5/2018 | Vepakomma ......... G06V 10/25 |
| 2018/0335252 A1 | 11/2018 | Oh |
| 2018/0365630 A1 | 12/2018 | Seals et al. |
| 2019/0122263 A1 | 4/2019 | Avakian |
| 2019/0212760 A1 | 7/2019 | Tiwari et al. |
| 2019/0213545 A1 | 7/2019 | Adato et al. |
| 2019/0272557 A1 | 9/2019 | Smith et al. |
| 2019/0272580 A1* | 9/2019 | Kawamura ............ H04N 7/183 |
| 2019/0279625 A1 | 9/2019 | Huang et al. |
| 2019/0354926 A1 | 11/2019 | Im |
| 2020/0300538 A1 | 9/2020 | Avakian et al. |
| 2021/0366005 A1 | 11/2021 | Avakian et al. |

FOREIGN PATENT DOCUMENTS

| | | |
|---|---|---|
| WO | WO 2018/002709 A2 | 1/2018 |
| WO | WO 2019/048924 A1 | 3/2019 |

OTHER PUBLICATIONS

International Search Report and Written Opinion in counterpart Application No. PCT/IB2020/000601 dated Sep. 11, 2020 (14 pages).
Non-Final Rejection mailed Jan. 11, 2024 for U.S. Appl. No. 17/563,145 (10 pages).
Non-Final Rejection mailed Dec. 22, 2023 for U.S. Appl. No. 17/563,245 (62 pages).
Non-Final Rejection mailed Feb. 9, 2024 for U.S. Appl. No. 17/563,615 (20 pages).
Non-Final Rejection mailed Nov. 9, 2023 for U.S. Appl. No. 17/563,712 (31 pages).

* cited by examiner

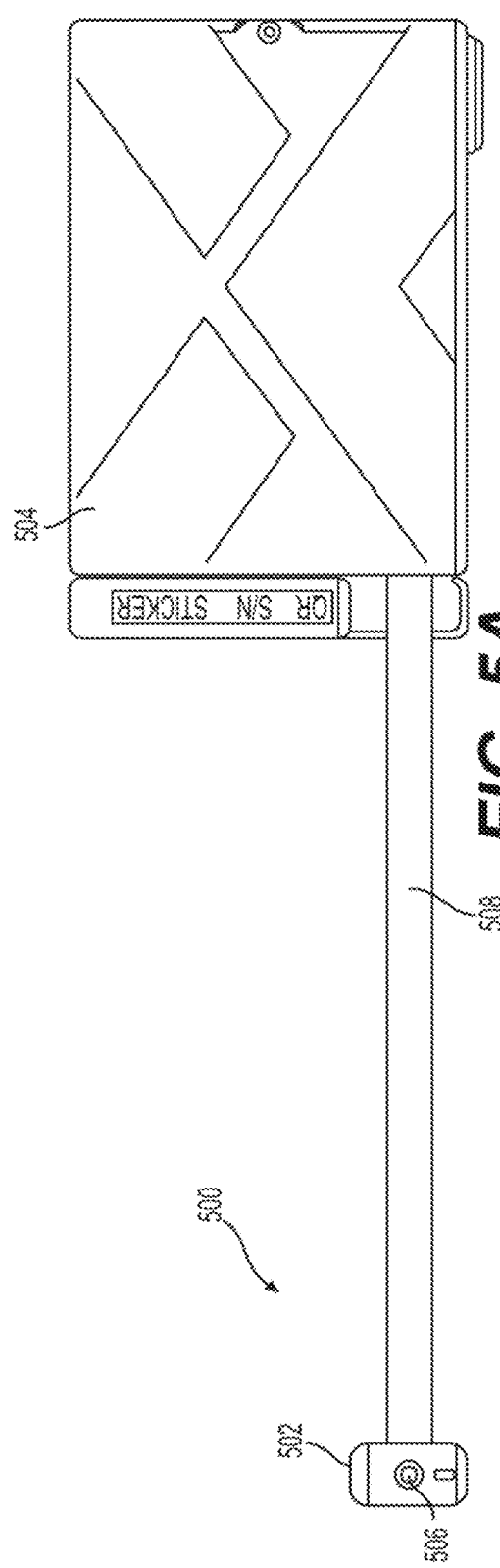
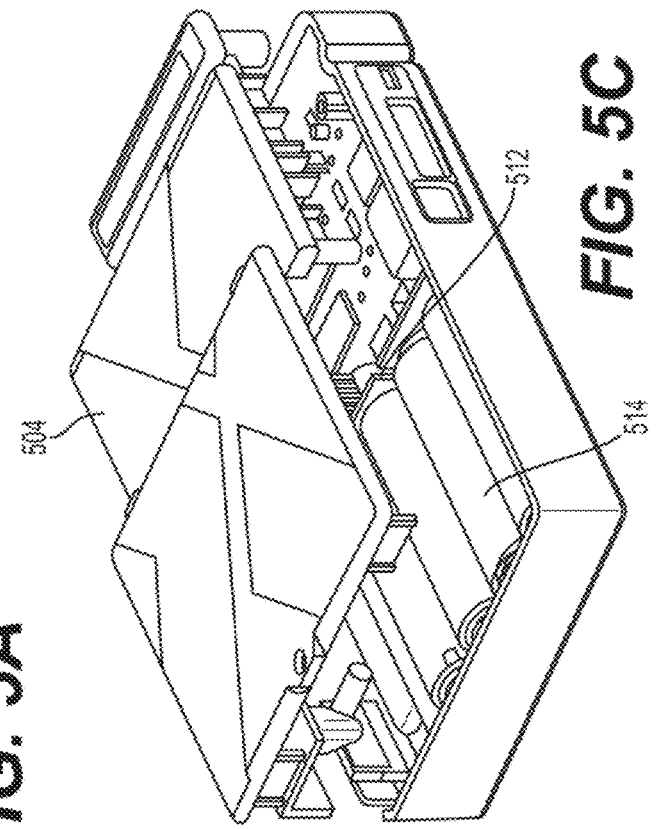
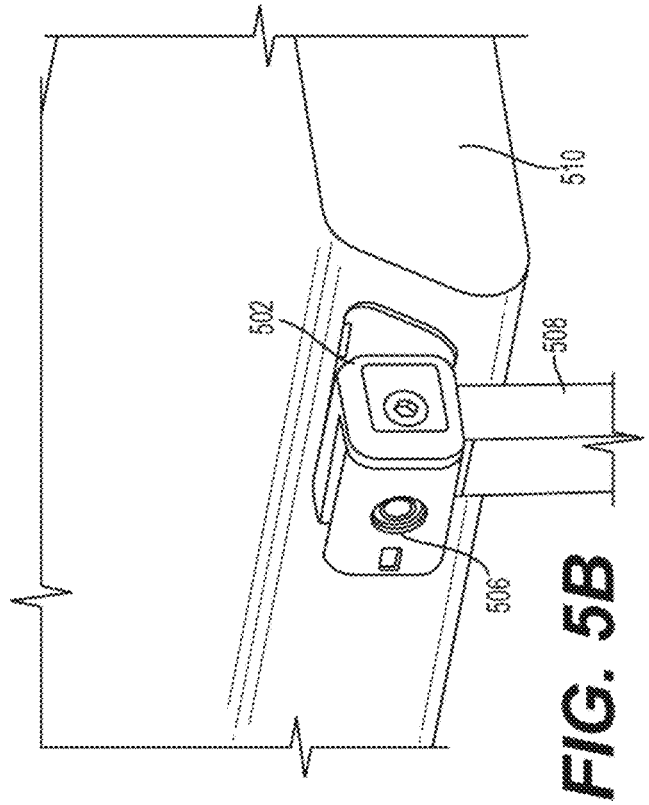
FIG. 5A
FIG. 5B
FIG. 5C

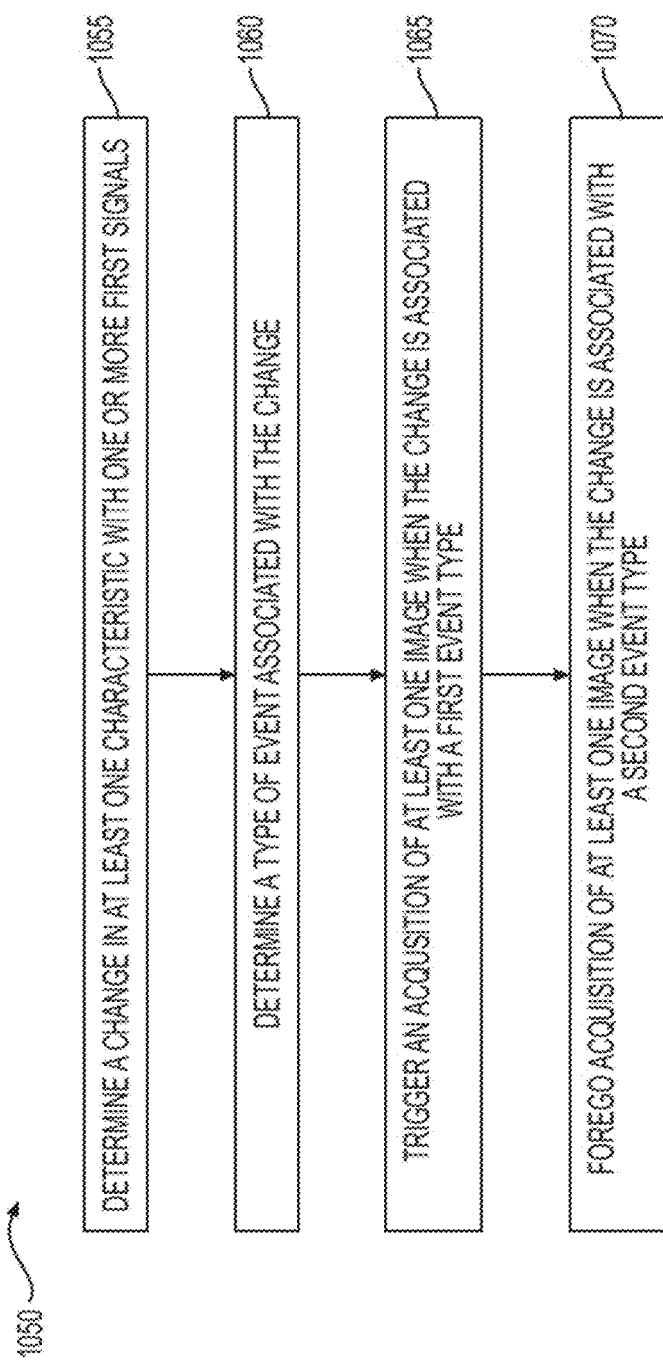

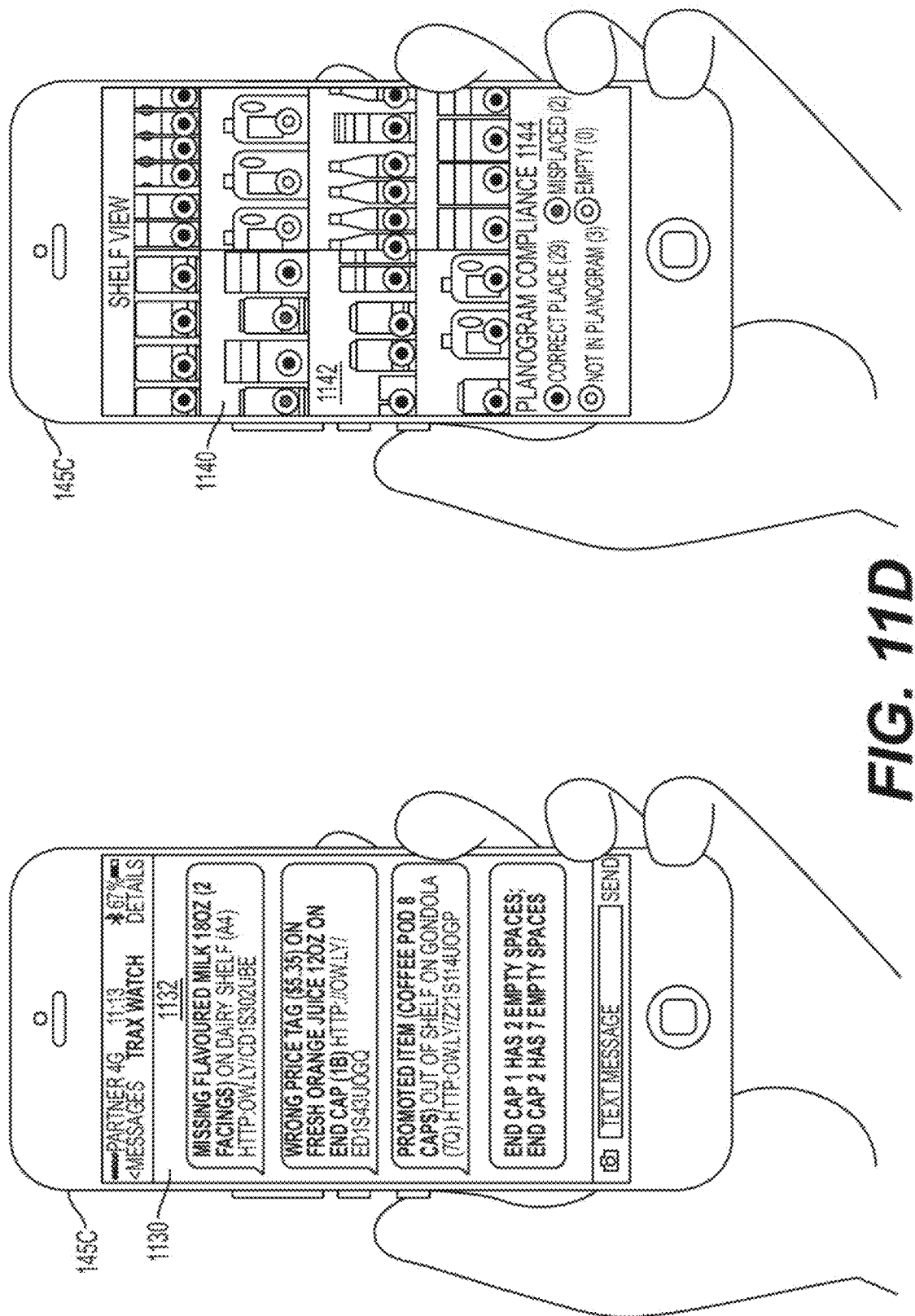

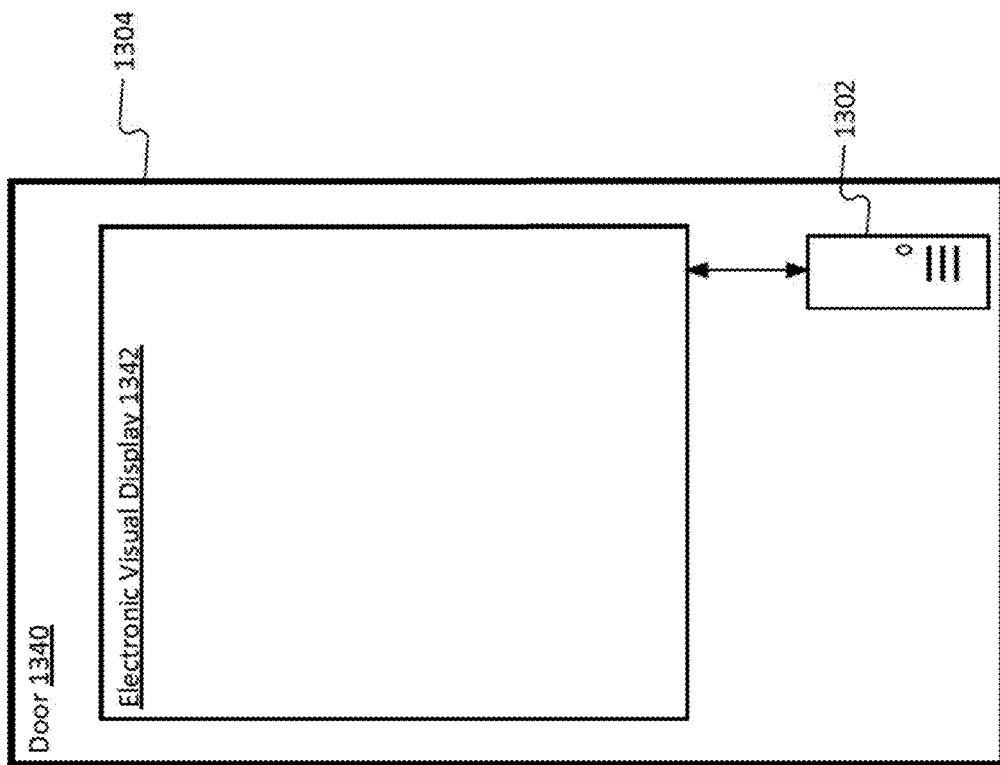
FIG. 13C
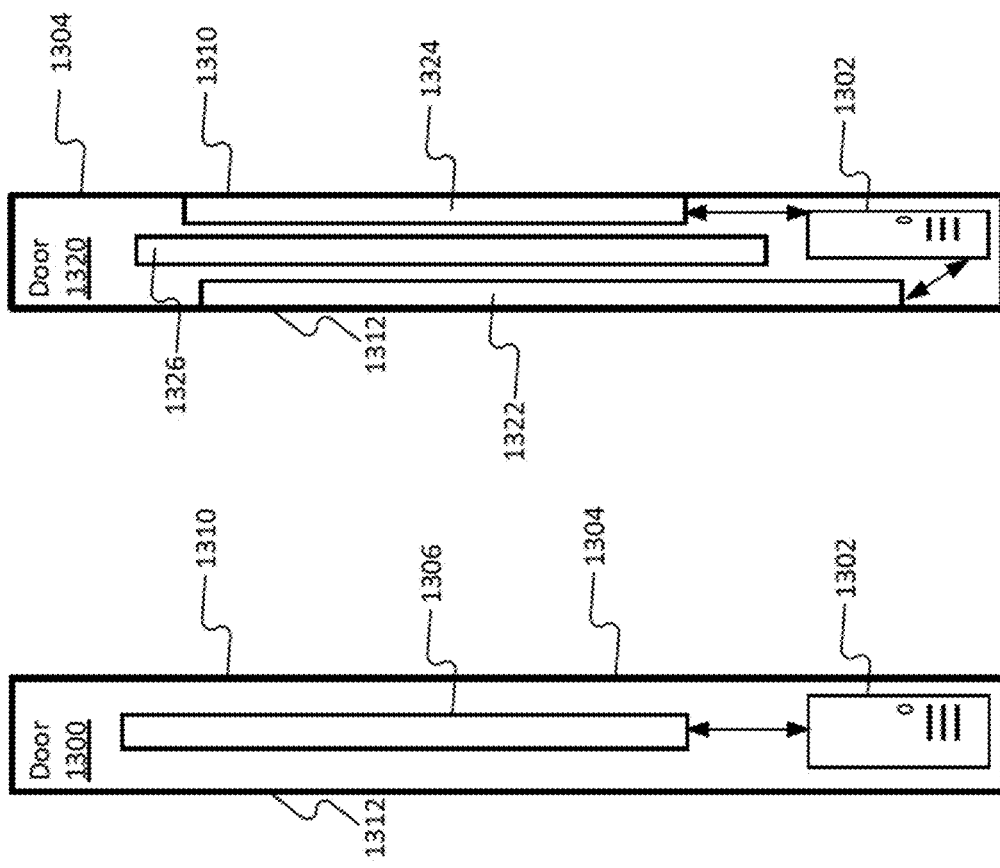
FIG. 13B
FIG. 13A

CUSTOMIZED PRESENTATION OF ITEMS ON ELECTRONIC VISUAL DISPLAYS IN RETAIL STORES BASED ON AVAILABILITY OF PRODUCTS

CROSS REFERENCE TO RELATED APPLICATION

This application is a continuation of PCT Application No. PCT/IB2020/000601, filed on Jul. 20, 2020, which claims the benefit of priority of U.S. Provisional Application No. 62/876,685, filed Jul. 21, 2019. The foregoing applications are incorporated herein by reference in their entireties.

BACKGROUND

I. Technical Field

The present disclosure relates generally to systems, methods, and devices for providing information in retail stores, and more specifically to systems, methods, and devices for capturing, providing information on electronic visual displays in retail stores.

II. Background Information

Shopping in stores is a prevalent part of modern daily life. Store owners (also known as "retailers") stock a wide variety of products on store shelves and add associated labels and promotions to the store shelves. Typically, retailers have a set of processes and instructions for providing information in retail stores. The source of some of these instructions may include contractual obligations and other preferences related to the retailer methodology for providing information. Moreover, providing selected information may drive higher sales, improve customers' experience, and enhance in-store execution. Nowadays, many retailers and suppliers send people to stores to personally monitor and control the provided information. Such a monitoring technique, however, may be inefficient and may result in non-uniform compliance among retailers relative to various product-related guidelines. This technique may also result in significant gaps in compliance, as it does not allow for continuous monitoring of dynamically changing product displays. To increase productivity, among other potential benefits, there is a technological need to provide a dynamic solution that will automatically provide selected information.

The disclosed devices and methods are directed to providing new ways for providing information in retail stores.

SUMMARY

Embodiments consistent with the present disclosure provide methods, systems, and computer-readable media are provided for providing information on electronic visual displays in retail stores. In one implementation, a door for a retail storage container may include one or more electronic visual displays. In one implementation, the electronic visual display may be connected to a shelf in the retail store.

In some embodiments, methods, systems, and computer-readable media are provided for controlling information displayed on an electronic visual display that is part of a door for a retail storage container. In some examples, a door for a retail storage container is provided.

In some embodiments, a door for a retail storage container may comprise at least a first part that may be configured to face customers when the door is closed and a second part that may be configured to face the internal side of the retail storage container when the door is closed. The second part may comprise at least an electronic visual display configured to display information, and at least part of the electronic visual display may be configured to be visible to the customers at least when the door is open at a selected angle. In one example, the at least part of the electronic visual display may be configured to be hidden from the customers when the door is closed. In one example, the retail storage container may be a refrigerator unit. In one example, the displayed information may be based on a person facing the retail storage container. In one example, the displayed information may be based on data related to products stored in the retail storage container. In one example, the displayed information may be based on a label positioned in the retail storage container. In one example, the retail storage container may comprise a shelf, a plurality of sensors may be positioned on the shelf and may be configured to be positioned between the shelf and products positioned on the shelf, and the displayed information may be based on an analysis of data captured using the plurality of sensors. In one example, the retail storage container may comprise a shelf, and the displayed information may be based on an analysis of weight data captured using a weight sensor, the weight sensor may be configured to measure a weight of at least one product placed on the shelf. In one example, an indication of a state of the door may be received, in response to a first state of the door, the electronic visual display may be caused to display the information, and in response to a second state of the door, causing the electronic visual display to display the information may be forgone. In one example, an indication of whether the door is open may be received, and an adjustment to a power scheme of the electronic visual display may be caused based on the received indication.

In some examples, the retail storage container may comprise an image sensor, and the second part may further comprise a mirror that may be configured to reflect towards the image sensor an image of at least a portion of an internal part of the retail storage container. For example, the displayed information may be based on an analysis of the image reflected by the mirror and digitally captured using the image sensor. In another example, the image sensor may be configured to capture an image of a person facing the retail storage container when the door is open. In yet another example, the retail storage container may comprise a shelf, and the mirror may be configured to reflect towards the image sensor an image of at least part of the shelf and of an area above the shelf In an additional example, an indication that the door is closed may be received, and in response to the received indication, the image sensor may be caused to capture at least one image.

In some examples, the second part may further comprise an image sensor that may be configured to capture at least one image of at least a portion of an internal part of the retail storage container. For example, the displayed information may be based on an analysis of the at least one image. In another example, the image sensor may be configured to capture an image of a person facing the retail storage container when the door is open. In yet another example, the retail storage container may comprise a shelf, and the image sensor may be configured to capture an image of at least part of the shelf and of an area above the shelf In an additional example, an indication that the door is closed may be received, and in response to the received indication, the image sensor may be caused to capture the at least one image.

In some embodiments, methods, systems, and computer-readable media are provided for controlling information displayed on a transparent electronic display that is part of a door for a retail storage container.

In some embodiments, an indication of at least one position associated with a first product type in the retail storage container may be received, an indication of at least one position associated with a second product type in the retail storage container, the second product type differs from the first product type may be received, the indication of the at least one position associated with the first product type may be used to select a first region of the transparent electronic display, the indication of the at least one position associated with the second product type may be used to select a second region of the transparent electronic display, the second region differs from the first region, visual information related to the first product type may be displayed on the first region of the transparent electronic display, and visual information related to the second product type may be displayed on the second region of the transparent electronic display. In one example, the selection of the first region of the transparent electronic display may be configured to cause at least part of the displayed visual information related to the first product type to appear over at least part of the at least one position associated with the first product type when viewed from a particular viewing point, and the selection of the second region of the transparent electronic display may be configured to cause at least part of the displayed visual information related to the second product type to appear over at least part of the at least one position associated with the second product type when viewed from the particular viewing point. In one example, the selection of the first region of the transparent electronic display and the selection of the second region of the transparent electronic display may be based on a person facing the retail storage container. In one example, the at least one position associated with the first product type may include a position of the first product type in a planogram, and the at least one position associated with the second product type may include a position of the second product type in the planogram. In one example, the indication of the at least one position associated with the first product type may be based on an analysis of at least one image of products placed in the retail storage container. In one example, the retail storage container may comprise a shelf, a plurality of sensors may be positioned on the shelf and may be configured to be positioned between the shelf and products positioned on the shelf, and the indication of the at least one position associated with the first product type may be based on an analysis of data captured using the plurality of sensors. In one example, the retail storage container may comprise a shelf, and the indication of the at least one position associated with the first product type may be based on an analysis of weight data captured using the weight sensor, the weight sensor may be configured to measure a weight of at least one product placed on the shelf. In one example, the at least one position associated with the first product type may include a position of products of the first product type in the retail storage container. In one example, the at least one position associated with the first product type may include a position of a label corresponding to the first product type in the retail storage container. In one example, the at least one position associated with the first product type may include a position of an empty space dedicated to the first product type in the retail storage container. In one example, the at least one position associated with the first product type may include a position at which products of the first product type were previously placed in the retail storage container and at which products of the first product type are not currently placed. In one example, the displayed visual information related to the first product type may be based on an analysis of at least one image of products placed in the retail storage container. In one example, the retail storage container may comprise a shelf, a plurality of sensors may be positioned on the shelf and may be configured to be positioned between the shelf and products positioned on the shelf, and the displayed visual information related to the first product type may be based on an analysis of data captured using the plurality of sensors. In one example, the retail storage container may comprise a shelf, and the displayed visual information related to the first product type may be based on an analysis of weight data captured using the weight sensor, the weight sensor may be configured to measure a weight of at least one product placed on the shelf. In one example, the displayed visual information related to the first product type may be based on a state of the door. In one example, the displayed visual information related to the first product type may be based on an amount of products of the first product type placed in the retail storage container. In one example, an amount of products of the first product type in the retail storage container may be obtained, the amount of products of the first product type in the retail storage container may be compared with a selected threshold, in response to a first result of the comparison, first visual information related to the first product type may be displayed, and in response to a second result of the comparison, second visual information related to the first product type may be displayed, the second visual information may differ from the first visual information. In one example, the displayed visual information related to the first product type may be based on facings of the first product type in the retail storage container. In one example, the displayed visual information related to the first product type may be based on information presented on a label corresponding to the first product type. In one example, the displayed visual information related to the first product type may be based on a price corresponding to the first product type. In one example, the displayed visual information related to the first product type may be based on the selected first region of the transparent electronic display. In one example, the displayed visual information related to the first product type may be based on the at least one position associated with the first product type in the retail storage container. In one example, the displayed visual information related to the first product type may be based on a person facing the retail storage container. In one example, the displayed visual information related to the first product type may include an indication of a need to restock the first product type in the retail storage container.

In some embodiments, methods, systems, and computer-readable media are provided for selecting items for presentation on electronic visual displays in retail stores. In some embodiments, methods, systems, and computer-readable media are provided for customized presentation of items on electronic visual displays in retail stores.

In some embodiments, a plurality of images of products in a retail store captured using at least one image sensor may be obtained. The plurality of images may comprise at least a first image corresponding to a first point in time and a second image corresponding to a second point in time, the first point in time is earlier than the second point in time. Further, in some examples, the first image may be analyzed to determine whether products of a particular product type are available at the first point in time, and the second image may be analyzed to determine whether products of the particular product type are available at the second point in time. Further, in some examples, based on the determination of whether products of the particular product type are available at the first point in time and the determination of whether products of the particular product type are available at the second point in time, it may be selected whether to display a particular item on an electronic visual display in the retail store. Further, in some examples, in response to a selection to display the particular item, causing the electronic visual display to display the particular item, and in response to a selection not to display the particular item, forgoing causing the electronic visual display to display the particular item.

In one example, in response to a determination that products of the particular product type are missing at the first point in time and a determination that products of the particular product type are missing at the second point in time, it may be selected not to display the particular item on the electronic visual display in the retail store, and in response to at least one of a determination that products of the particular product type are available at the first point in time and a determination that products of the particular product type are available at the second point in time, it may be selected to display the particular item on the electronic visual display in the retail store.

In one example, in response to a determination that products of the particular product type are missing at the first point in time and a determination that products of the particular product type are missing at the second point in time, it may be selected to display the particular item on the electronic visual display in the retail store, and in response to at least one of a determination that products of the particular product type are available at the first point in time and a determination that products of the particular product type are available at the second point in time, it may be selected not to display the particular item on the electronic visual display in the retail store.

In some examples, the plurality of images may comprise a preceding image corresponding to a preceding point in time, the preceding image may be analyzed to determine whether products of the particular product type are available at the preceding point in time, and the selection of whether to display the particular item on the electronic visual display in the retail store may be further based on the determination of whether products of the particular product type are available at the preceding point in time. In one example, in response to a determination that products of the particular product type are missing at the preceding point in time, a determination that products of the particular product type are available at the first point in time and a determination that products of the particular product type are missing at the second point in time, it may be selected not to display the particular item on the electronic visual display in the retail store, and in response to a determination that products of the particular product type are available at the preceding point in time, the determination that products of the particular product type are available at the first point in time and the determination that products of the particular product type are missing at the second point in time, it may be selected to display the particular item on the electronic visual display in the retail store. In one example, in response to a determination that products of the particular product type are missing at the preceding point in time, a determination that products of the particular product type are missing at the first point in time and a determination that products of the particular product type are missing at the second point in time, it may be selected not to display the particular item on the electronic visual display in the retail store, and in response to at least one of a determination that products of the particular product type are available at the preceding point in time, a determination that products of the particular product type are available at the first point in time and the determination that products of the particular product type are available at the second point in time, it may be selected to display the particular item on the electronic visual display in the retail store. In one example, in response to a determination that products of the particular product type are missing at the preceding point in time, a determination that products of the particular product type are missing at the first point in time and a determination that products of the particular product type are missing at the second point in time, it may be selected to display the particular item on the electronic visual display in the retail store, and in response to at least one of a determination that products of the particular product type are available at the preceding point in time, a determination that products of the particular product type are available at the first point in time and the determination that products of the particular product type are available at the second point in time, it may be selected not to display the particular item on the electronic visual display in the retail store. In one example, in response to a determination that products of the particular product type are missing at the preceding point in time, a determination that products of the particular product type are available at the first point in time and a determination that products of the particular product type are missing at the second point in time, it may be selected to display the particular item on the electronic visual display in the retail store, and in response to at least one of a determination that products of the particular product type are available at the preceding point in time and a determination that products of the particular product type are available at the second point in time, it may be selected not to display the particular item on the electronic visual display in the retail store.

In one example, the selection of whether to display the particular item on the electronic visual display in the retail store may be further based on an elapsed time between the first point in time and the second point in time. In one example, the selection of whether to display the particular item on the electronic visual display in the retail store may be further based on an elapsed time since the second point in time. In one example, the selection of whether to display the particular item on the electronic visual display in the retail store may be further based on information related to a person in a vicinity of the electronic visual display. In one example, the selection of whether to display the particular item on the electronic visual display in the retail store may be further based on a time of day.

In one example, the electronic visual display may be connected to a shelf in the retail store. In one example, the electronic visual display may be connected to a door of a retail storage container in the retail store. In one example, the electronic visual display may be part of a personal device of a store associate. In one example, the electronic visual display may be part of a personal device of a customer.

In one example, data captured at the first point in time using a plurality of sensors positioned on a shelf in the retail store that may be configured to be positioned between the shelf and products positioned on the shelf may be obtained, data captured at the second point in time using the plurality of sensors may be obtained, the determination of whether products of the particular product type are available at the first point in time may be based on an analysis of the data captured at the first point in time using the plurality of sensors, and the determination of whether products of the particular product type are available at the second point in time may be based on an analysis of the data captured at the second point in time using the plurality of sensors.

In one example, weight data captured at the first point in time using a weight sensor corresponding to at least part of a shelf in the retail store may be obtained, weight data captured at the second point in time using the weight sensor may be obtained, the determination of whether products of the particular product type are available at the first point in time may be based on an analysis of the weight data captured at the first point in time using the weight sensor, and the determination of whether products of the particular product type are available at the second point in time may be based on an analysis of the weight data captured at the second point in time using the weight sensor.

In some embodiments, a plurality of images of products in a retail store captured using at least one image sensor may be obtained. The plurality of images may comprise at least a first image corresponding to a first point in time and a second image corresponding to a second point in time, the first point in time is earlier than the second point in time. Further, in some examples, the first image may be analyzed to determine whether products of a particular product type are available at the first point in time, and the second image may be analyzed to determine whether products of the particular product type are available at the second point in time. Further, in some examples, based on the determination of whether products of the particular product type are available at the first point in time and the determination of whether products of the particular product type are available at the second point in time, at least one display parameter for a particular item may be selected. Further, in some examples, the selected at least one display parameter may be used to display the particular item on an electronic visual display in the retail store.

In one example, the at least one display parameter may include a display size for the particular item. In one example, the at least one display parameter may include a motion pattern for the particular item. In one example, the at least one display parameter may include a display position on the electronic visual display for the particular item. In one example, the at least one display parameter may include a color scheme for the particular item.

In one example, the plurality of images may comprise a preceding image corresponding to a preceding point in time, the preceding image may be analyzed to determine whether products of the particular product type are available at the preceding point in time, and the selection of the at least one display parameter for the particular item may be further based on the determination of whether products of the particular product type are available at the preceding point in time.

In one example, the selection of the at least one display parameter for the particular item may be further based on an elapsed time between the first point in time and the second point in time. In one example, the selection of the at least one display parameter for the particular item may be further based on an elapsed time since the second point in time. In one example, the selection of the at least one display parameter for the particular item may be further based on information related to a person in a vicinity of the electronic visual display. In one example, the selection of the at least one display parameter for the particular item may be further based on a time of day.

In one example, the electronic visual display may be connected to a shelf in the retail store. In one example, the electronic visual display may be connected to a door of a retail storage container in the retail store. In one example, the electronic visual display may be part of a personal device of a store associate. In one example, the electronic visual display may be part of a personal device of a customer.

In one example, data captured at the first point in time using a plurality of sensors positioned on a shelf in the retail store that may be configured to be positioned between the shelf and products positioned on the shelf may be obtained, data captured at the second point in time using the plurality of sensors may be obtained, the determination of whether products of the particular product type are available at the first point in time may be based on an analysis of the data captured at the first point in time using the plurality of sensors, and the determination of whether products of the particular product type are available at the second point in time may be based on an analysis of the data captured at the second point in time using the plurality of sensors.

In one example, weight data captured at the first point in time using a weight sensor corresponding to at least part of a shelf in the retail store may be obtained, weight data captured at the second point in time using the weight sensor may be obtained, the determination of whether products of the particular product type are available at the first point in time may be based on an analysis of the weight data captured at the first point in time using the weight sensor, and the determination of whether products of the particular product type are available at the second point in time may be based on an analysis of the weight data captured at the second point in time using the weight sensor.

In some embodiments, an image of products in a retail store captured using at least one image sensor may be obtained, and the image may be analyzed to determine a condition of products of a particular product type. Further, in some examples, based on the determined condition of the products of the particular product type, selecting whether to display a particular item on an electronic visual display in the retail store. Further, in some examples, in response to a selection to display the particular item, the electronic visual display may be caused to display the particular item, and in response to a selection not to display the particular item, causing the electronic visual display to display the particular item may be forgone.

In one example, the particular item may include an indication of the particular product type. In one example, the particular item may include an indication of the determined condition of the products of the particular product type. In one example, the selection of whether to display the particular item on the electronic visual display in the retail store may be further based on an elapsed time since the capturing of the image. In one example, the selection of whether to display the particular item on the electronic visual display in the retail store may be further based on a time of day. In one example, the selection of whether to display the particular item on the electronic visual display in the retail store may be further based on information related to a person in a vicinity of the electronic visual display. In one example, the electronic visual display may be connected to a shelf in the retail store. In one example, the electronic visual display may be connected to a door of a retail storage container in the retail store. In one example, the electronic visual display may be part of a personal device of a store associate. In one example, the electronic visual display may be part of a personal device of a customer. In one example, data captured using a plurality of sensors positioned on a shelf in the retail store that may be configured to be positioned between the shelf and products positioned on the shelf may be obtained, and the determination of the condition of the products of the particular product type may be further based on an analysis of the data captured using the plurality of sensors.

In some examples, a preceding image of products in a retail store captured using the at least one image sensor at a preceding point in time before the capturing time of the image may be obtained, the preceding image may be analyzed to determine a preceding condition of the products of the particular product type at the preceding point in time, and the selection of whether to display the particular item on the electronic visual display in the retail store may be further based on the determined preceding condition. For example, the determined preceding condition may be compared with the determined condition, and the selection of whether to display the particular item on the electronic visual display in the retail store may be based on a result of the comparison. In another example, the determined preceding condition and the determined condition may be used to predict a future condition of products of the particular product type at a later point in time after the capturing time of the image, and the selection of whether to display the particular item on the electronic visual display in the retail store may be based on the predicted future condition.

In one example, in response to a determination that the condition of the products of the particular product type is a good condition, it may be selected to display the particular item on the electronic visual display in the retail store, and in response to a determination that the condition of the products of the particular product type is a bad condition, it may be selected not to display the particular item on the electronic visual display in the retail store. In one example, in response to a determination that the condition of the products of the particular product type is a bad condition, it may be selected to display the particular item on the electronic visual display in the retail store, and in response to a determination that the condition of the products of the particular product type is a good condition, it may be selected not to display the particular item on the electronic visual display in the retail store. In one example, in response to a determination that the condition of the products of the particular product type is a condition that requires maintenance, it may be selected to display the particular item on the electronic visual display in the retail store, and in response to a determination that the condition of the products of the particular product type is a condition that do not require maintenance, it may be selected not to display the particular item on the electronic visual display in the retail store. In one example, the image may be analyzed to determine a condition of the products of a second product type, the second product type differs from the particular product type, and the selection of whether to display the particular item on the electronic visual display in the retail store may be further based on the determined condition of the products of the second product type.

In some embodiments, an image of products in a retail store captured using at least one image sensor may be obtained, and the image may be analyzed to determine a condition of products of a particular product type. Further, in some examples, based on the determined condition of the products of the particular product type, at least one display parameter for a particular item may be selected, and the selected at least one display parameter may be used to display the particular item on an electronic visual display in the retail store.

In one example, the at least one display parameter may include a display size for the particular item. In one example, the at least one display parameter may include a motion pattern for the particular item. In one example, the at least one display parameter may include a display position on the electronic visual display for the particular item. In one example, the at least one display parameter may include a color scheme for the particular item. In one example, the selection of the at least one display parameter for the particular item may be further based on an elapsed time since the capturing of the image. In one example, the selection of the at least one display parameter for the particular item may be further based on a time of day. In one example, the selection of the at least one display parameter for the particular item may be further based on information related to a person in a vicinity of the electronic visual display.

In some examples, a preceding image of products in a retail store captured using the at least one image sensor at a preceding point in time before the capturing time of the image may be obtained, the preceding image may be analyzed to determine a preceding condition of the products of the particular product type at the preceding point in time, and the selection of the at least one display parameter for the particular item may be further based on the determined preceding condition. For example, the determined preceding condition may be compared with the determined condition, and the selection of the at least one display parameter for the particular item may be based on a result of the comparison. In another example, the determined preceding condition and the determined condition may be used to predict a future condition of products of the particular product type at a later point in time after the capturing time of the image, and the selection of the at least one display parameter for the particular item may be based on the predicted future condition.

In one example, the electronic visual display may be connected to a shelf in the retail store. In one example, the electronic visual display may be connected to a door of a retail storage container in the retail store. In one example, the electronic visual display may be part of a personal device of a store associate. In one example, the electronic visual display may be part of a personal device of a customer. In one example, data captured using a plurality of sensors positioned on a shelf in the retail store that may be configured to be positioned between the shelf and products positioned on the shelf may be obtained, and the determination of the condition of the products of the particular product type may be based on an analysis of the data captured using the plurality of sensors. In one example, the image may be analyzed to determine an indicator of urgency of the required maintenance, and the selection of the at least one display parameter for the particular item may be based on the determined indicator of urgency. In one example, the image may be analyzed to determine a condition of the products of a second product type, the second product type differs from the particular product type, and the selection of the at least one display parameter for the particular item may be based on the determined condition of the products of the second product type.

Consistent with other disclosed embodiments, non-transitory computer-readable medium including instructions that when executed by a processor may cause the processor to perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 5A is an illustration of an example system for acquiring images of products in a retail store, consistent with the present disclosure.

FIG. 5B is an illustration of a shelf-mounted camera unit included in a first housing of the example system of FIG. 5A, consistent with the present disclosure.

FIG. 5C is an exploded view illustration of a processing unit included in a second housing of the example system of FIG. 5A, consistent with the present disclosure.

FIG. 10B is illustrates an exemplary method for triggering image acquisition based on product events on a store shelf, consistent with the present disclosure.

FIG. 11D is a schematic illustration of two examples outputs for an employee of the retail store, consistent with the present disclosure.

FIG. 13A is a schematic cross-sectional side view illustration of an exemplary door for a retail storage container, consistent with the present disclosure.

FIG. 13B is a schematic cross-sectional side view illustration of an exemplary door for a retail storage container, consistent with the present disclosure.

FIG. 13C is a schematic cross-sectional view illustration of an exemplary door for a retail storage container, consistent with the present disclosure.

DETAILED DESCRIPTION

Figure 1:
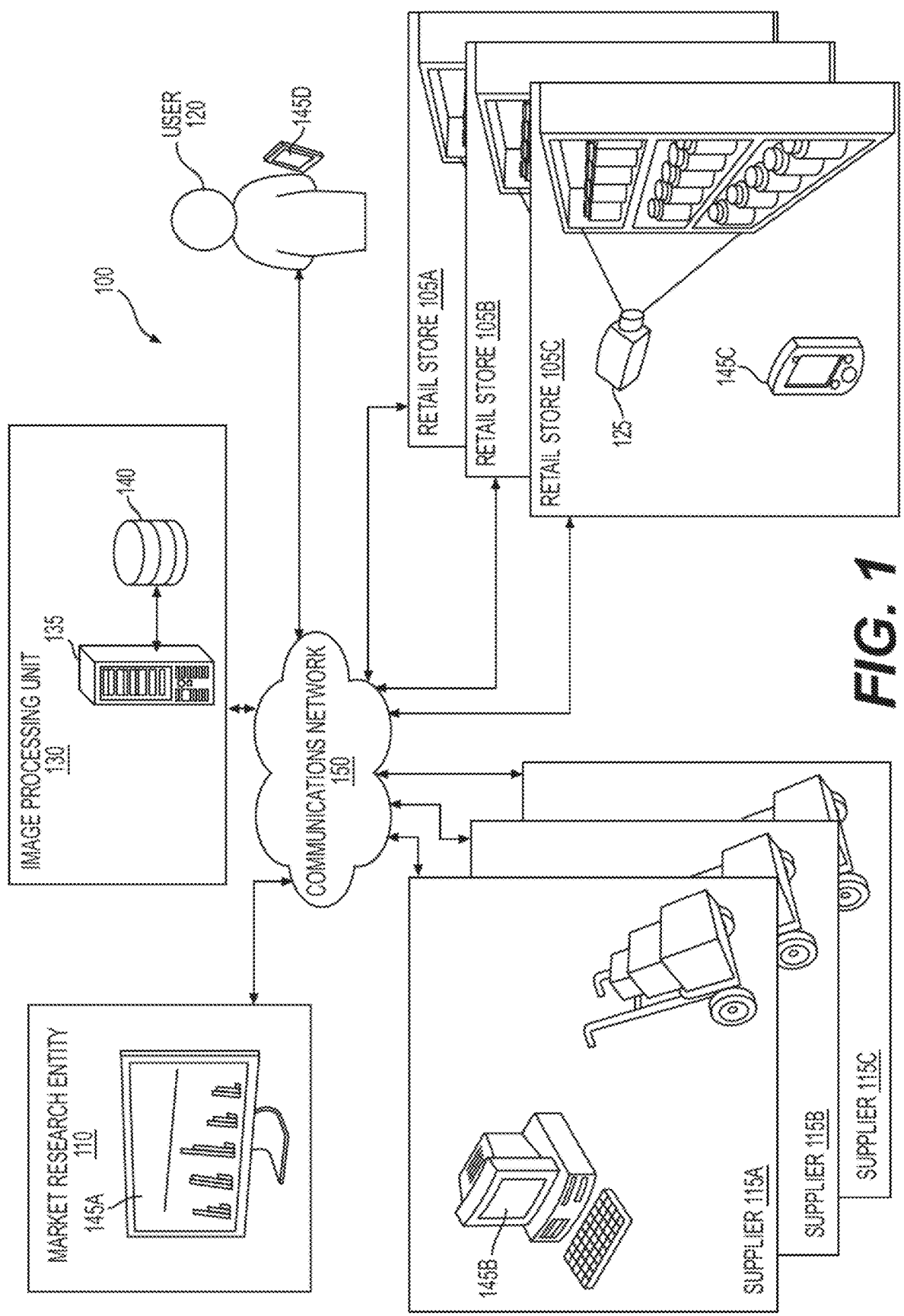
FIG. 1 is an illustration of an exemplary system for analyzing information collected from a retail store.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

The present disclosure is directed to systems and methods for processing images captured in a retail store. As used herein, the term "retail store" or simply "store" refers to an establishment offering products for sale by direct selection by customers physically or virtually shopping within the establishment. The retail store may be an establishment operated by a single retailer (e.g., supermarket) or an establishment that includes stores operated by multiple retailers (e.g., a shopping mall). Embodiments of the present disclosure include receiving an image depicting a store shelf having at least one product displayed thereon. As used herein, the term "store shelf" or simply "shelf" refers to any suitable physical structure which may be used for displaying products in a retail environment. In one embodiment the store shelf may be part of a shelving unit including a number of individual store shelves. In another embodiment, the store shelf may include a display unit having a single-level or multi-level surfaces.

Consistent with the present disclosure, the system may process images and image data acquired by a capturing device to determine information associated with products displayed in the retail store. The term "capturing device" refers to any device configured to acquire image data representative of products displayed in the retail store. Examples of capturing devices may include a digital camera, a time-of-flight camera, a stereo camera, an active stereo camera, a depth camera, a Lidar system, a laser scanner, CCD based devices, or any other sensor based system capable of converting received light into electric signals. The term "image data" refers to any form of data generated based on optical signals in the near-infrared, infrared, visible, and ultraviolet spectrums (or any other suitable radiation frequency range). Consistent with the present disclosure, the image data may include pixel data streams, digital images, digital video streams, data derived from captured images, and data that may be used to construct a 3D image. The image data acquired by a capturing device may be transmitted by wired or wireless transmission to a remote server. In one embodiment, the capturing device may include a stationary camera with communication layers (e.g., a dedicated camera fixed to a store shelf, a security camera, and so forth). Such an embodiment is described in greater detail below with reference to FIG. 4A. In another embodiment, the capturing device may include a handheld device (e.g., a smartphone, a tablet, a mobile station, a personal digital assistant, a laptop, and more) or a wearable device (e.g., smart glasses, a smartwatch, a clip-on camera). Such an embodiment is described in greater detail below with reference to FIG. 4B. In another embodiment, the capturing device may include a robotic device with one or more cameras operated remotely or autonomously (e.g., an autonomous robotic device, a drone, a robot on a track, and more). Such an embodiment is described in greater detail below with reference to FIG. 4C.

In some embodiments, the capturing device may include one or more image sensors. The term "image sensor" refers to a device capable of detecting and converting optical signals in the near-infrared, infrared, visible, and ultraviolet spectrums into electrical signals. The electrical signals may be used to form image data (e.g., an image or a video stream) based on the detected signal. Examples of image sensors may include semiconductor charge-coupled devices (CCD), active pixel sensors in complementary metal-oxide-semiconductor (CMOS), or N-type metal-oxide-semiconductors (NMOS, Live MOS). In some cases, the image sensor may be part of a camera included in the capturing device.

Embodiments of the present disclosure further include analyzing images to detect and identify different products. As used herein, the term "detecting a product" may broadly refer to determining an existence of the product. For example, the system may determine the existence of a plurality of distinct products displayed on a store shelf. By detecting the plurality of products, the system may acquire different details relative to the plurality of products (e.g., how many products on a store shelf are associated with a same product type), but it does not necessarily gain knowledge of the type of product. In contrast, the term "identifying a product" may refer to determining a unique identifier associated with a specific type of product that allows inventory managers to uniquely refer to each product type in a product catalogue. Additionally or alternatively, the term "identifying a product" may refer to determining a unique identifier associated with a specific brand of products that allows inventory managers to uniquely refer to products, e.g., based on a specific brand in a product catalogue. Additionally or alternatively, the term "identifying a product" may refer to determining a unique identifier associated with a specific category of products that allows inventory managers to uniquely refer to products, e.g., based on a specific category in a product catalogue. In some embodiments, the identification may be made based at least in part on visual characteristics of the product (e.g., size, shape, logo, text, color, and so forth). The unique identifier may include any codes that may be used to search a catalog, such as a series of digits, letters, symbols, or any combinations of digits, letters, and symbols. Consistent with the present disclosure, the terms "determining a type of a product" and "determining a product type" may also be used interchangeably in this disclosure with reference to the term "identifying a product."

Embodiments of the present disclosure further include determining at least one characteristic of the product for determining the type of the product. As used herein, the term "characteristic of the product" refers to one or more visually discernable features attributed to the product. Consistent with the present disclosure, the characteristic of the product may assist in classifying and identifying the product. For example, the characteristic of the product may be associated with the ornamental design of the product, the size of the product, the shape of the product, the colors of the product, the brand of the product, a logo or text associated with the product (e.g., on a product label), and more. In addition, embodiments of the present disclosure further include determining a confidence level associated with the determined type of the product. The term "confidence level" refers to any indication, numeric or otherwise, of a level (e.g., within a predetermined range) indicative of an amount of confidence the system has that the determined type of the product is the actual type of the product. For example, the confidence level may have a value between 1 and 10, alternatively, the confidence level may be expressed as a percentage.

In some cases, the system may compare the confidence level to a threshold. The term "threshold" as used herein denotes a reference value, a level, a point, or a range of values, for which, when the confidence level is above it (or below it depending on a particular use case), the system may follow a first course of action and, when the confidence level is below it (or above it depending on a particular use case), the system may follow a second course of action. The value of the threshold may be predetermined for each type of product or may be dynamically selected based on different considerations. In one embodiment, when the confidence level associated with a certain product is below a threshold, the system may obtain contextual information to increase the confidence level. As used herein, the term "contextual information" (or "context") refers to any information having a direct or indirect relationship with a product displayed on a store shelf. In some embodiments, the system may retrieve different types of contextual information from captured image data and/or from other data sources. In some cases, contextual information may include recognized types of products adjacent to the product under examination. In other cases, contextual information may include text appearing on the product, especially where that text may be recognized (e.g., via OCR) and associated with a particular meaning. Other examples of types of contextual information may include logos appearing on the product, a location of the product in the retail store, a brand name of the product, a price of the product, product information collected from multiple retail stores, product information retrieved from a catalog associated with a retail store, etc.

Reference is now made to FIG. 1, which shows an example of a system 100 for analyzing information collected from retail stores 105 (for example, retail store 105A, retail store 105B, and retail store 105C). In one embodiment, system 100 may represent a computer-based system that may include computer system components, desktop computers, workstations, tablets, handheld computing devices, memory devices, and/or internal network(s) connecting the components. System 100 may include or be connected to various network computing resources (e.g., servers, routers, switches, network connections, storage devices, etc.) necessary to support the services provided by system 100. In one embodiment, system 100 may enable identification of products in retail stores 105 based on analysis of captured images. In another embodiment, system 100 may enable a supply of information based on analysis of captured images to a market research entity 110 and to different suppliers 115 of the identified products in retail stores 105 (for example, supplier 115A, supplier 115B, and supplier 115C). In another embodiment, system 100 may communicate with a user 120 (sometimes referred to herein as a customer, but which may include individuals associated with a retail environment other than customers, such as store employee, data collection agent, etc.) about different products in retail stores 105. In one example, system 100 may receive images of products captured by user 120. In another example, system 100 may provide to user 120 information determined based on automatic machine analysis of images captured by one or more capturing devices 125 associated with retail stores 105.

System 100 may also include an image processing unit 130 to execute the analysis of images captured by the one or more capturing devices 125. Image processing unit 130 may include a server 135 operatively connected to a database 140. Image processing unit 130 may include one or more servers connected by a communication network, a cloud platform, and so forth. Consistent with the present disclosure, image processing unit 130 may receive raw or processed data from capturing device 125 via respective communication links, and provide information to different system components using a network 150. Specifically, image processing unit 130 may use any suitable image analysis technique including, for example, object recognition, object detection, image segmentation, feature extraction, optical character recognition (OCR), object-based image analysis, shape region techniques, edge detection techniques, pixel-based detection, artificial neural networks, convolutional neural networks, etc. In addition, image processing unit 130 may use classification algorithms to distinguish between the different products in the retail store. In some embodiments, image processing unit 130 may utilize suitably trained machine learning algorithms and models to perform the product identification. Network 150 may facilitate communications and data exchange between different system components when these components are coupled to network 150 to enable output of data derived from the images captured by the one or more capturing devices 125. In some examples, the types of outputs that image processing unit 130 can generate may include identification of products, indicators of product quantity, indicators of planogram compliance, indicators of service-improvement events (e.g., a cleaning event, a restocking event, a rearrangement event, etc.), and various reports indicative of the performances of retail stores 105. Additional examples of the different outputs enabled by image processing unit 130 are described below with reference to FIGS. 11A-11E and throughout the disclosure.

Consistent with the present disclosure, network 150 may be any type of network (including infrastructure) that provides communications, exchanges information, and/or facilitates the exchange of information between the components of system 100. For example, network 150 may include or be part of the Internet, a Local Area Network, wireless network (e.g., a Wi-Fi/302.11 network), or other suitable connections. In other embodiments, one or more components of system 100 may communicate directly through dedicated communication links, such as, for example, a telephone network, an extranet, an intranet, the Internet, satellite communications, off-line communications, wireless communications, transponder communications, a local area network (LAN), a wide area network (WAN), a virtual private network (VPN), and so forth.

In one example configuration, server 135 may be a cloud server that processes images received directly (or indirectly) from one or more capturing device 125 and processes the images to detect and/or identify at least some of the plurality of products in the image based on visual characteristics of the plurality of products. The term "cloud server" refers to a computer platform that provides services via a network, such as the Internet. In this example configuration, server 135 may use virtual machines that may not correspond to individual hardware. For example, computational and/or storage capabilities may be implemented by allocating appropriate portions of desirable computation/storage power from a scalable repository, such as a data center or a distributed computing environment. In one example, server 135 may implement the methods described herein using customized hard-wired logic, one or more Application Specific Integrated Circuits (ASICs) or Field Programmable Gate Arrays (FPGAs), firmware, and/or program logic which, in combination with the computer system, cause server 135 to be a special-purpose machine.

In another example configuration, server 135 may be part of a system associated with a retail store that communicates with capturing device 125 using a wireless local area network (WLAN) and may provide similar functionality as a cloud server. In this example configuration, server 135 may communicate with an associated cloud server (not shown) and cloud database (not shown). The communications between the store server and the cloud server may be used in a quality enforcement process, for upgrading the recognition engine and the software from time to time, for extracting information from the store level to other data users, and so forth. Consistent with another embodiment, the communications between the store server and the cloud server may be discontinuous (purposely or unintentional) and the store server may be configured to operate independently from the cloud server. For example, the store server may be configured to generate a record indicative of changes in product placement that occurred when there was a limited connection (or no connection) between the store server and the cloud server, and to forward the record to the cloud server once connection is reestablished.

As depicted in FIG. 1, server 135 may be coupled to one or more physical or virtual storage devices such as database 140. Server 135 may access database 140 to detect and/or identify products. The detection may occur through analysis of features in the image using an algorithm and stored data. The identification may occur through analysis of product features in the image according to stored product models. Consistent with the present embodiment, the term "product model" refers to any type of algorithm or stored product data that a processor may access or execute to enable the identification of a particular product associated with the product model. For example, the product model may include a description of visual and contextual properties of the particular product (e.g., the shape, the size, the colors, the texture, the brand name, the price, the logo, text appearing on the particular product, the shelf associated with the particular product, adjacent products in a planogram, the location within the retail store, and so forth). In some embodiments, a single product model may be used by server 135 to identify more than one type of products, such as, when two or more product models are used in combination to enable identification of a product. For example, in some cases, a first product model may be used by server 135 to identify a product category (such models may apply to multiple product types, e.g., shampoo, soft drinks, etc.), and a second product model may be used by server 135 to identify the product type, product identity, or other characteristics associated with a product. In some cases, such product models may be applied together (e.g., in series, in parallel, in a cascade fashion, in a decision tree fashion, etc.) to reach a product identification. In other embodiments, a single product model may be used by server 135 to identify a particular product type (e.g., 6-pack of 16 oz Coca-Cola Zero).

Database 140 may be included on a volatile or non-volatile, magnetic, semiconductor, tape, optical, removable, non-removable, or other type of storage device or tangible or non-transitory computer-readable medium. Database 140 may also be part of server 135 or separate from server 135. When database 140 is not part of server 135, server 135 may exchange data with database 140 via a communication link. Database 140 may include one or more memory devices that store data and instructions used to perform one or more features of the disclosed embodiments. In one embodiment, database 140 may include any suitable databases, ranging from small databases hosted on a work station to large databases distributed among data centers. Database 140 may also include any combination of one or more databases controlled by memory controller devices (e.g., server(s), etc.) or software. For example, database 140 may include document management systems, Microsoft SQL databases, SharePoint databases, Oracle™ databases, Sybase™ databases, other relational databases, or non-relational databases, such as mongo and others.

Consistent with the present disclosure, image processing unit 130 may communicate with output devices 145 to present information derived based on processing of image data acquired by capturing devices 125. The term "output device" is intended to include all possible types of devices capable of outputting information from server 135 to users or other computer systems (e.g., a display screen, a speaker, a desktop computer, a laptop computer, mobile device, tablet, a PDA, etc.), such as 145A, 145B, 145C and 145D. In one embodiment each of the different system components (i.e., retail stores 105, market research entity 110, suppliers 115, and users 120) may be associated with an output device 145, and each system component may be configured to present different information on the output device 145. In one example, server 135 may analyze acquired images including representations of shelf spaces. Based on this analysis, server 135 may compare shelf spaces associated with different products, and output device 145A may present market research entity 110 with information about the shelf spaces associated with different products. The shelf spaces may also be compared with sales data, expired products data, and more. Consistent with the present disclosure, market research entity 110 may be a part of (or may work with) supplier 115. In another example, server 135 may determine product compliance to a predetermined planogram, and output device 145B may present to supplier 115 information about the level of product compliance at one or more retail stores 105 (for example in a specific retail store 105, in a group of retail stores 105 associated with supplier 115, in all retail stores 105, and so forth). The predetermined planogram may be associated with contractual obligations and/or other preferences related to the retailer methodology for placement of products on the store shelves. In another example, server 135 may determine that a specific store shelf has a type of fault in the product placement, and output device 145C may present to a manager of retail store 105 a user-notification that may include information about a correct display location of a misplaced product, information about a store shelf associated with the misplaced product, information about a type of the misplaced product, and/or a visual depiction of the misplaced product. In another example, server 135 may identify which products are available on the shelf and output device 145D may present to user 120 an updated list of products.

The components and arrangements shown in FIG. 1 are not intended to limit the disclosed embodiments, as the system components used to implement the disclosed processes and features may vary. In one embodiment, system 100 may include multiple servers 135, and each server 135 may host a certain type of service. For example, a first server may process images received from capturing devices 125 to identify at least some of the plurality of products in the image, and a second server may determine from the identified products in retail stores 105 compliance with contractual obligations between retail stores 105 and suppliers 115. In another embodiment, system 100 may include multiple servers 135, a first type of servers 135 that may process information from specific capturing devices 125 (e.g., handheld devices of data collection agents) or from specific retail stores 105 (e.g., a server dedicated to a specific retail store 105 may be placed in or near the store). System 100 may further include a second type of servers 135 that collect and process information from the first type of servers 135.

Figure 2:
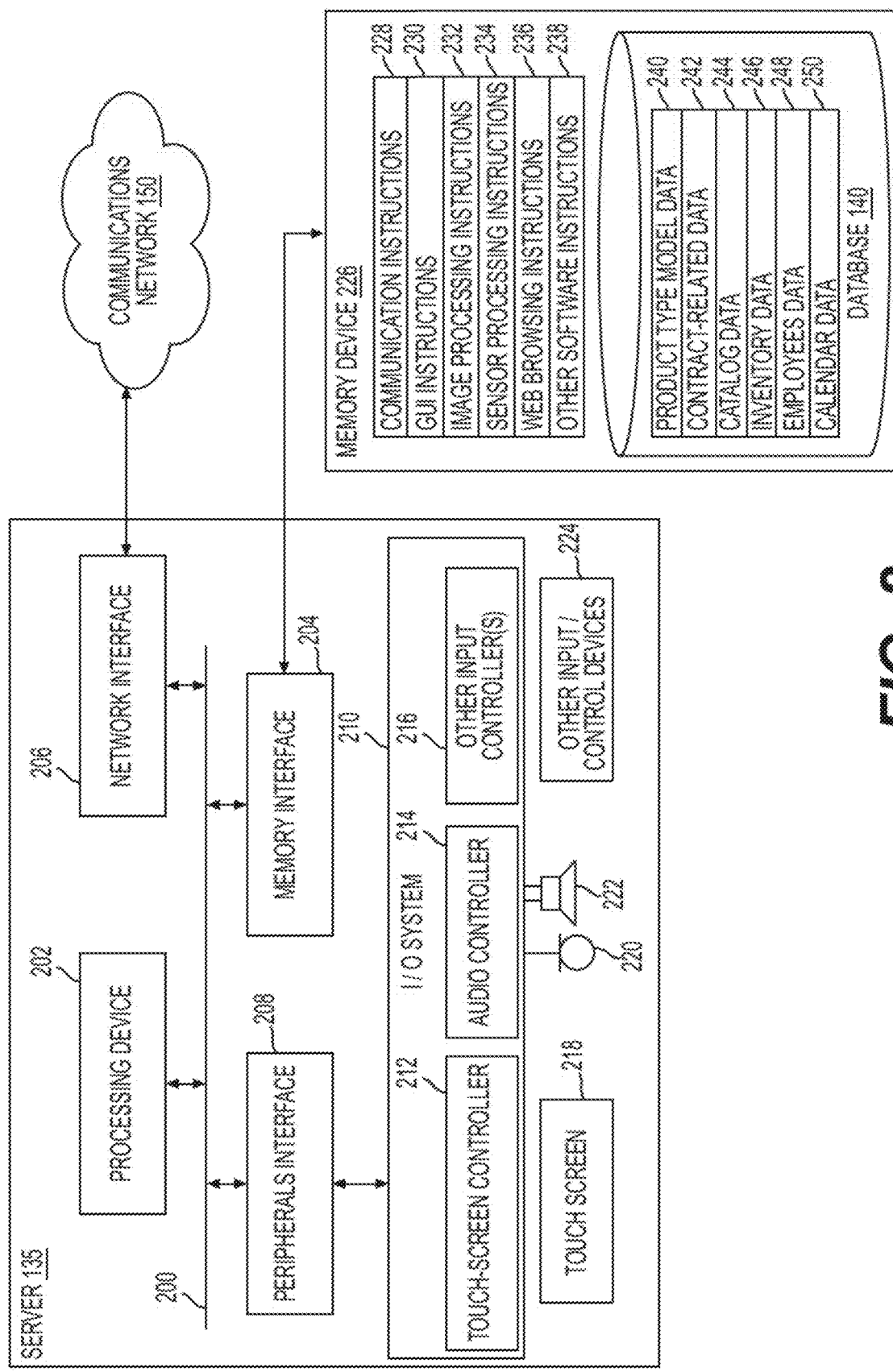
FIG. 2 is a block diagram that illustrates some of the components of an image processing system, consistent with the present disclosure.

FIG. 2 is a block diagram representative of an example configuration of server 135. In one embodiment, server 135 may include a bus 200 (or any other communication mechanism) that interconnects subsystems and components for transferring information within server 135. For example, bus 200 may interconnect a processing device 202, a memory interface 204, a network interface 206, and a peripherals interface 208 connected to an I/O system 210.

Processing device 202, shown in FIG. 2, may include at least one processor configured to execute computer programs, applications, methods, processes, or other software to execute particular instructions associated with embodiments described in the present disclosure. The term "processing device" refers to any physical device having an electric circuit that performs a logic operation. For example, processing device 202 may include one or more processors, integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. Processing device 202 may include at least one processor configured to perform functions of the disclosed methods such as a microprocessor manufactured by Intel™, Nvidia™, manufactured by AMD™, and so forth. Processing device 202 may include a single core or multiple core processors executing parallel processes simultaneously. In one example, processing device 202 may be a single core processor configured with virtual processing technologies. Processing device 202 may implement virtual machine technologies or other technologies to provide the ability to execute, control, run, manipulate, store, etc., multiple software processes, applications, programs, etc. In another example, processing device 202 may include a multiple-core processor arrangement (e.g., dual, quad core, etc.) configured to provide parallel processing functionalities to allow a device associated with processing device 202 to execute multiple processes simultaneously. It is appreciated that other types of processor arrangements could be implemented to provide the capabilities disclosed herein.

Consistent with the present disclosure, the methods and processes disclosed herein may be performed by server 135 as a result of processing device 202 executing one or more sequences of one or more instructions contained in a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within server 135, or at a remote location. Additionally, one or more computer-readable storage mediums can be utilized in implementing a computer-implemented method. The term "computer-readable storage medium" should be understood to include tangible items and exclude carrier waves and transient signals.

According to one embodiment, server 135 may include network interface 206 (which may also be any communications interface) coupled to bus 200. Network interface 206 may provide one-way or two-way data communication to a local network, such as network 150. Network interface 206 may include an integrated services digital network (ISDN) card, cable modem, satellite modem, or a modem to provide a data communication connection to a corresponding type of telephone line. As another example, network interface 206 may include a local area network (LAN) card to provide a data communication connection to a compatible LAN. In another embodiment, network interface 206 may include an Ethernet port connected to radio frequency receivers and transmitters and/or optical (e.g., infrared) receivers and transmitters. The specific design and implementation of network interface 206 depends on the communications network(s) over which server 135 is intended to operate. As described above, server 135 may be a cloud server or a local server associated with retail store 105. In any such implementation, network interface 206 may be configured to send and receive electrical, electromagnetic, or optical signals, through wires or wirelessly, that may carry analog or digital data streams representing various types of information. In another example, the implementation of network interface 206 may be similar or identical to the implementation described below for network interface 306.

Server 135 may also include peripherals interface 208 coupled to bus 200. Peripherals interface 208 may be connected to sensors, devices, and subsystems to facilitate multiple functionalities. In one embodiment, peripherals interface 208 may be connected to I/O system 210 configured to receive signals or input from devices and provide signals or output to one or more devices that allow data to be received and/or transmitted by server 135. In one embodiment I/O system 210 may include or be associated with output device 145. For example, I/O system 210 may include a touch screen controller 212, an audio controller 214, and/or other input controller(s) 216. Touch screen controller 212 may be coupled to a touch screen 218. Touch screen 218 and touch screen controller 212 can, for example, detect contact, movement, or break thereof using any of a plurality of touch sensitivity technologies, including but not limited to capacitive, resistive, infrared, and surface acoustic wave technologies as well as other proximity sensor arrays or other elements for determining one or more points of contact with touch screen 218. Touch screen 218 may also, for example, be used to implement virtual or soft buttons and/or a keyboard. In addition to or instead of touch screen 218, I/O system 210 may include a display screen (e.g., CRT, LCD, etc.), virtual reality device, augmented reality device, and so forth. Specifically, touch screen controller 212 (or display screen controller) and touch screen 218 (or any of the alternatives mentioned above) may facilitate visual output from server 135. Audio controller 214 may be coupled to a microphone 220 and a speaker 222 to facilitate voice-enabled functions, such as voice recognition, voice replication, digital recording, and telephony functions. Specifically, audio controller 214 and speaker 222 may facilitate audio output from server 135. The other input controller(s) 216 may be coupled to other input/control devices 224, such as one or more buttons, keyboards, rocker switches, thumb-wheel, infrared port, USB port, image sensors, motion sensors, depth sensors, and/or a pointer device such as a computer mouse or a stylus.

In some embodiments, processing device 202 may use memory interface 204 to access data and a software product stored on a memory device 226. Memory device 226 may include operating system programs for server 135 that perform operating system functions when executed by the processing device. By way of example, the operating system programs may include Microsoft Windows™, Unix™, Linux™, Apple™ operating systems, personal digital assistant (PDA) type operating systems such as Apple iOS, Google Android, Blackberry OS, or other types of operating systems.

Memory device 226 may also store communication instructions 228 to facilitate communicating with one or more additional devices (e.g., capturing device 125), one or more computers (e.g., output devices 145A-145D) and/or one or more servers. Memory device 226 may include graphical user interface instructions 230 to facilitate graphic user interface processing; image processing instructions 232 to facilitate image data processing-related processes and functions; sensor processing instructions 234 to facilitate sensor-related processing and functions; web browsing instructions 236 to facilitate web browsing-related processes and functions; and other software instructions 238 to facilitate other processes and functions. Each of the above identified instructions and applications may correspond to a set of instructions for performing one or more functions described above. These instructions need not be implemented as separate software programs, procedures, or modules. Memory device 226 may include additional instructions or fewer instructions. Furthermore, various functions of server 135 may be implemented in hardware and/or in software, including in one or more signal processing and/or application specific integrated circuits. For example, server 135 may execute an image processing algorithm to identify in received images one or more products and/or obstacles, such as shopping carts, people, and more.

In one embodiment, memory device 226 may store database 140. Database 140 may include product type model data 240 (e.g., an image representation, a list of features, a model obtained by training machine learning algorithm using training examples, an artificial neural network, and more) that may be used to identify products in received images; contract-related data 242 (e.g., planograms, promotions data, etc.) that may be used to determine if the placement of products on the store shelves and/or the promotion execution are consistent with obligations of retail store 105; catalog data 244 (e.g., retail store chain's catalog, retail store's master file, etc.) that may be used to check if all product types that should be offered in retail store 105 are in fact in the store, if the correct price is displayed next to an identified product, etc.; inventory data 246 that may be used to determine if additional products should be ordered from suppliers 115; employee data 248 (e.g., attendance data, records of training provided, evaluation and other performance-related communications, productivity information, etc.) that may be used to assign specific employees to certain tasks; and calendar data 250 (e.g., holidays, national days, international events, etc.) that may be used to determine if a possible change in a product model is associated with a certain event. In other embodiments of the disclosure, database 140 may store additional types of data or fewer types of data. Furthermore, various types of data may be stored in one or more memory devices other than memory device 226.

The components and arrangements shown in FIG. 2 are not intended to limit the disclosed embodiments. As will be appreciated by a person skilled in the art having the benefit of this disclosure, numerous variations and/or modifications may be made to the depicted configuration of server 135. For example, not all components may be essential for the operation of server 135 in all cases. Any component may be located in any appropriate part of server 135, and the components may be rearranged into a variety of configurations while providing the functionality of the disclosed embodiments. For example, some servers may not include some of the elements shown in I/O system 215.

Figure 3:
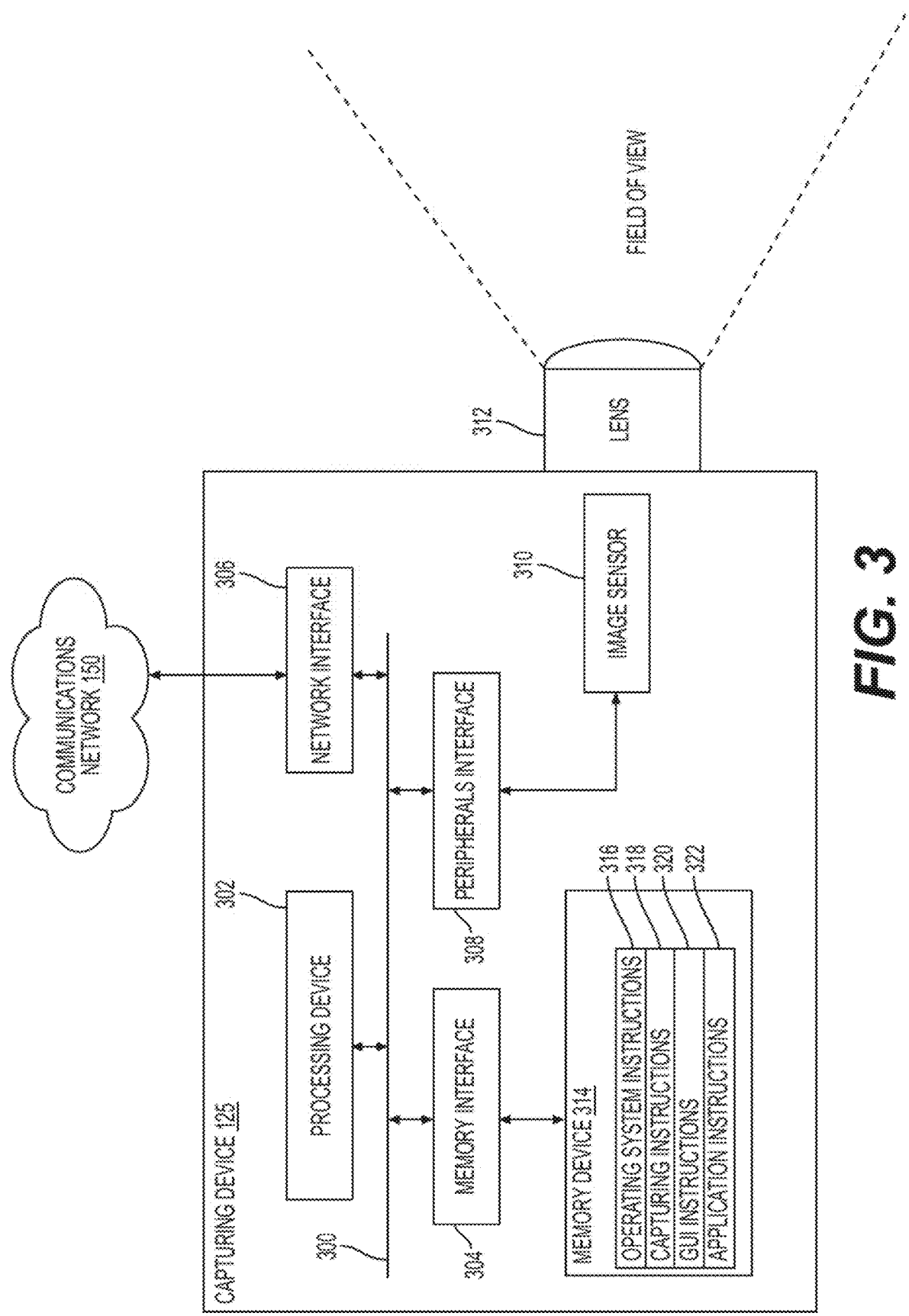
FIG. 3 is a block diagram that illustrates an exemplary embodiment of a capturing device, consistent with the present disclosure.

FIG. 3 is a block diagram representation of an example configuration of capturing device 125. In one embodiment, capturing device 125 may include a processing device 302, a memory interface 304, a network interface 306, and a peripherals interface 308 connected to image sensor 310. These components can be separated or can be integrated in one or more integrated circuits. The various components in capturing device 125 can be coupled by one or more communication buses or signal lines (e.g., bus 300). Different aspects of the functionalities of the various components in capturing device 125 may be understood from the description above regarding components of server 135 having similar functionality.

According to one embodiment, network interface 306 may be used to facilitate communication with server 135. Network interface 306 may be an Ethernet port connected to radio frequency receivers and transmitters and/or optical receivers and transmitters. The specific design and implementation of network interface 306 depends on the communications network(s) over which capturing device 125 is intended to operate. For example, in some embodiments, capturing device 125 may include a network interface 306 designed to operate over a GSM network, a GPRS network, an EDGE network, a Wi-Fi or WiMax network, a Bluetooth® network, etc. In another example, the implementation of network interface 306 may be similar or identical to the implementation described above for network interface 206.

In the example illustrated in FIG. 3, peripherals interface 308 of capturing device 125 may be connected to at least one image sensor 310 associated with at least one lens 312 for capturing image data in an associated field of view. In some configurations, capturing device 125 may include a plurality of image sensors associated with a plurality of lenses 312. In other configurations, image sensor 310 may be part of a camera included in capturing device 125. According to some embodiments, peripherals interface 308 may also be connected to other sensors (not shown), such as a motion sensor, a light sensor, infrared sensor, sound sensor, a proximity sensor, a temperature sensor, a biometric sensor, or other sensing devices to facilitate related functionalities. In addition, a positioning sensor may also be integrated with, or connected to, capturing device 125. For example, such positioning sensor may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. For example, the positioning sensor may be built into mobile capturing device 125, such as smartphone devices. In another example, position software may allow mobile capturing devices to use internal or external positioning sensors (e.g., connecting via a serial port or Bluetooth).

Consistent with the present disclosure, capturing device 125 may include digital components that collect data from image sensor 310, transform it into an image, and store the image on a memory device 314 and/or transmit the image using network interface 306. In one embodiment, capturing device 125 may be fixedly mountable to a store shelf or to other objects in the retail store (such as walls, ceilings, floors, refrigerators, checkout stations, displays, dispensers, rods which may be connected to other objects in the retail store, and so forth). In one embodiment, capturing device 125 may be split into at least two housings such that only image sensor 310 and lens 312 may be visible on the store shelf, and the rest of the digital components may be located in a separate housing. An example of this type of capturing device is described below with reference to FIGS. 5-7.

Consistent with the present disclosure, capturing device 125 may use memory interface 304 to access memory device 314. Memory device 314 may include high-speed, random access memory and/or non-volatile memory such as one or more magnetic disk storage devices, one or more optical storage devices, and/or flash memory (e.g., NAND, NOR) to store captured image data. Memory device 314 may store operating system instructions 316, such as DARWIN, RTXC, LINUX, iOS, UNIX, LINUX, OS X, WINDOWS, or an embedded operating system such as VXWorkS. Operating system 316 can include instructions for handling basic system services and for performing hardware dependent tasks. In some implementations, operating system 316 may include a kernel (e.g., UNIX kernel, LINUX kernel, and so forth). In addition, memory device 314 may store capturing instructions 318 to facilitate processes and functions related to image sensor 310; graphical user interface instructions 320 that enables a user associated with capturing device 125 to control the capturing device and/or to acquire images of an area-of-interest in a retail establishment; and application instructions 322 to facilitate a process for monitoring compliance of product placement or other processes.

The components and arrangements shown in FIG. 3 are not intended to limit the disclosed embodiments. As will be appreciated by a person skilled in the art having the benefit of this disclosure, numerous variations and/or modifications may be made to the depicted configuration of capturing device 125. For example, not all components are essential for the operation of capturing device 125 in all cases. Any component may be located in any appropriate part of capturing device 125, and the components may be rearranged into a variety of configurations while providing the functionality of the disclosed embodiments. For example, some capturing devices may not have lenses, and other capturing devices may include an external memory device instead of memory device 314.

Figure 4A:
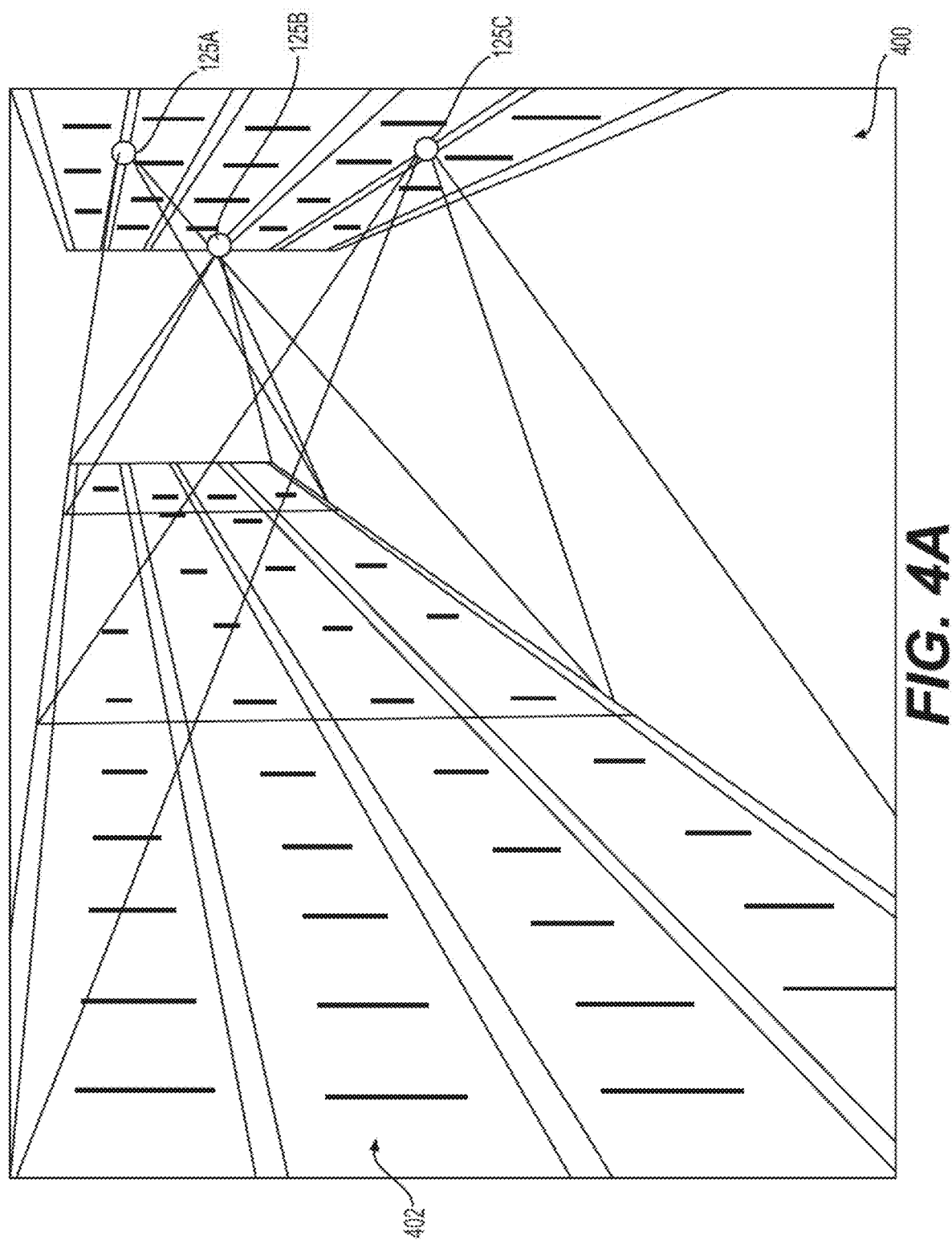
FIG. 4A is a schematic illustration of an example configuration for capturing image data in a retail store, consistent with the present disclosure.
Figure 4B:
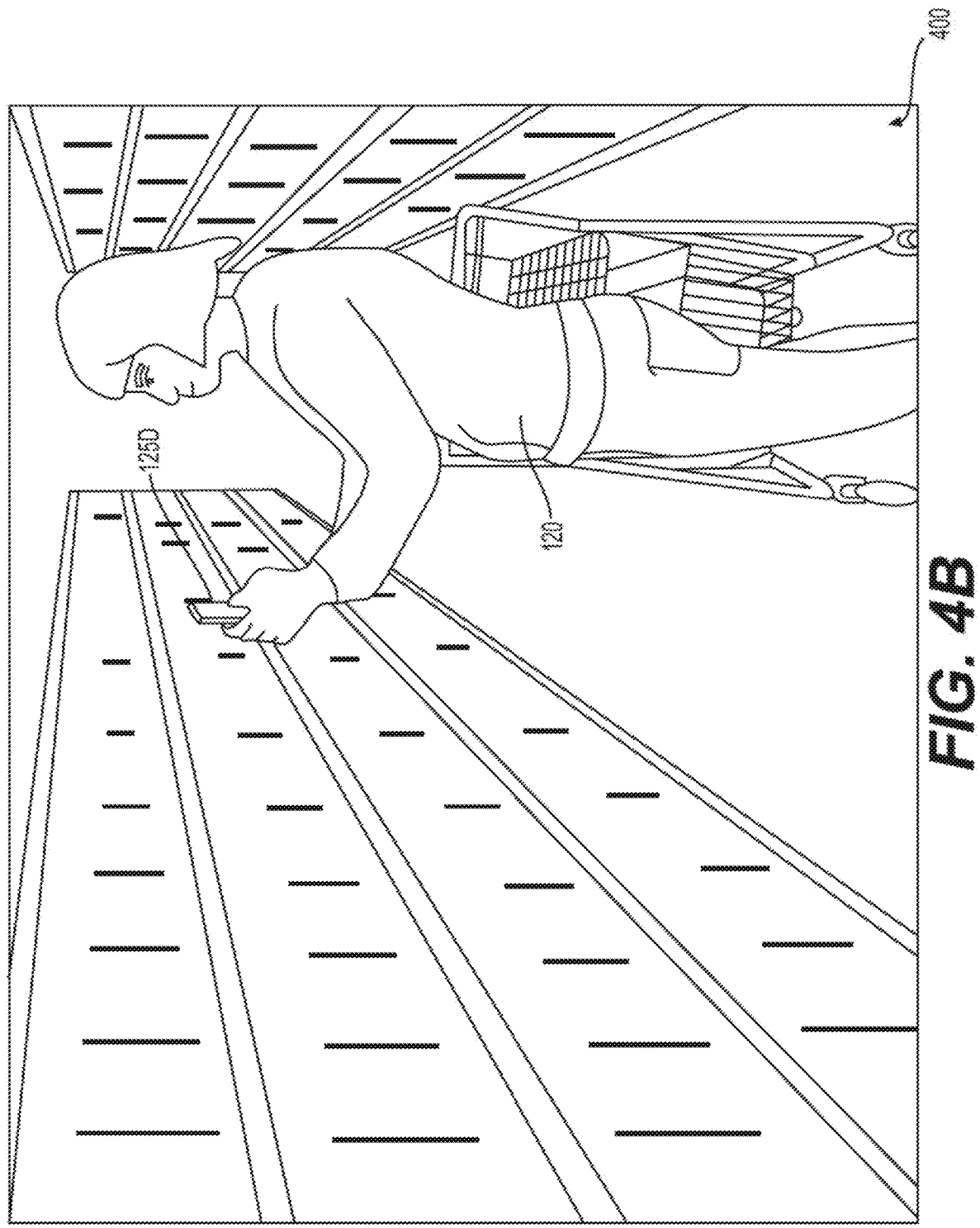
FIG. 4B is a schematic illustration of another example configuration for capturing image data in a retail store, consistent with the present disclosure.
Figure 4C:
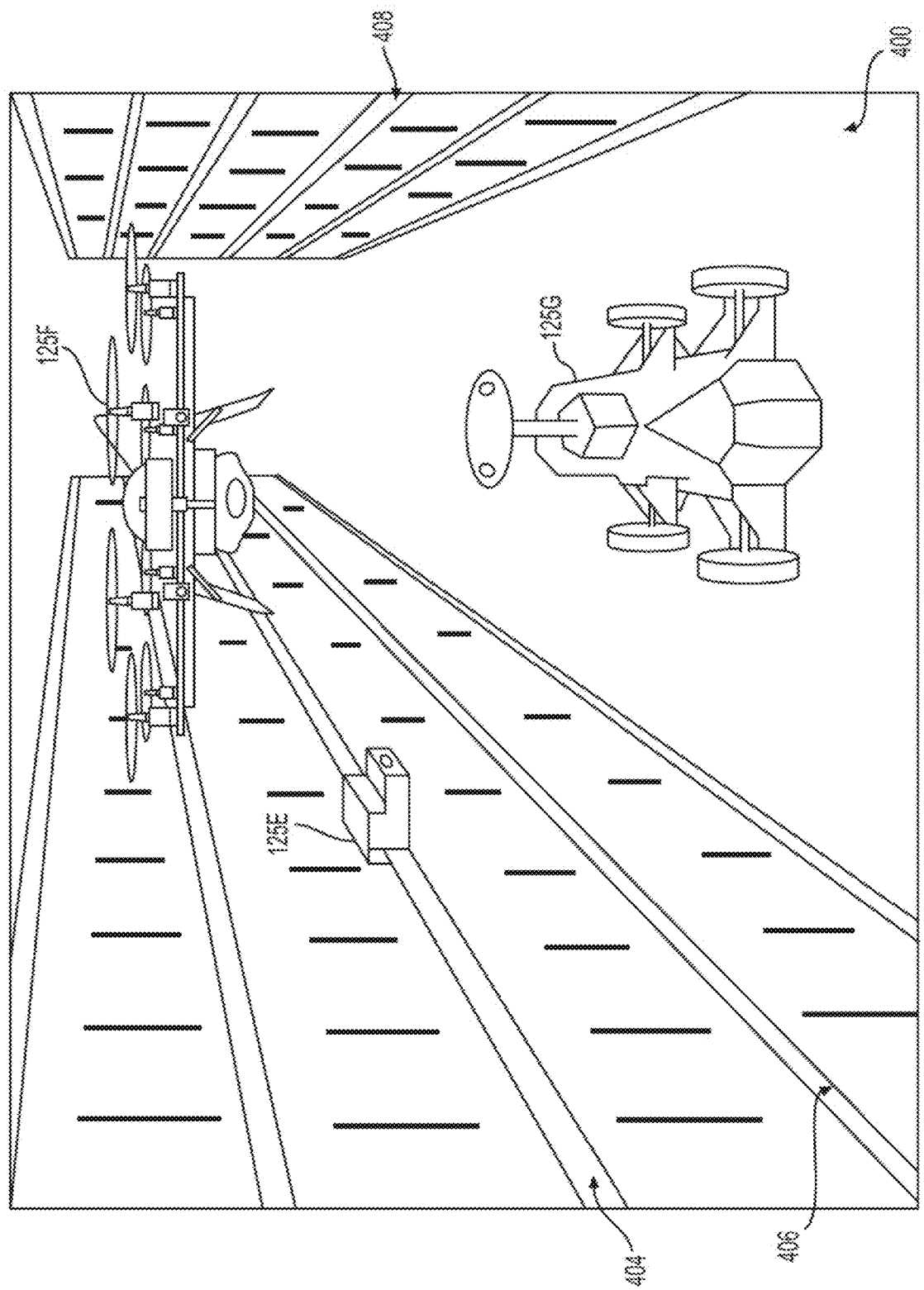
FIG. 4C is a schematic illustration of another example configuration for capturing image data in a retail store, consistent with the present disclosure.

FIGS. 4A-4C illustrate example configurations for capturing image data in retail store 105 according to disclosed embodiments. FIG. 4A illustrates how an aisle 400 of retail store 105 may be imaged using a plurality of capturing devices 125 fixedly connected to store shelves. FIG. 4B illustrates how aisle 400 of retail store 105 may be imaged using a handheld communication device. FIG. 4C illustrates how aisle 400 of retail store 105 may be imaged by robotic devices equipped with cameras.

With reference to FIG. 4A and consistent with the present disclosure, retail store 105 may include a plurality of capturing devices 125 fixedly mounted (for example, to store shelves, walls, ceilings, floors, refrigerators, checkout stations, displays, dispensers, rods which may be connected to other objects in the retail store, and so forth) and configured to collect image data. As depicted, one side of an aisle 400 may include a plurality of capturing devices 125 (e.g., 125A, 125B, and 125C) fixedly mounted thereon and directed such that they may capture images of an opposing side of aisle 400. The plurality of capturing devices 125 may be connected to an associated mobile power source (e.g., one or more batteries), to an external power supply (e.g., a power grid), obtain electrical power from a wireless power transmission system, and so forth. As depicted in FIG. 4A, the plurality of capturing devices 125 may be placed at different heights and at least their vertical fields of view may be adjustable. Generally, both sides of aisle 400 may include capturing devices 125 in order to cover both sides of aisle 400.

Differing numbers of capturing devices 125 may be used to cover shelving unit 402. In addition, there may be an overlap region in the horizontal field of views of some of capturing devices 125. For example, the horizontal fields of view of capturing devices (e.g., adjacent capturing devices) may at least partially overlap with one another. In another example, one capturing device may have a lower field of view than the field of view of a second capturing device, and the two capturing devices may have at least partially overlapping fields of view. According to one embodiment, each capturing device 125 may be equipped with network interface 306 for communicating with server 135. In one embodiment, the plurality of capturing devices 125 in retail store 105 may be connected to server 135 via a single WLAN. Network interface 306 may transmit information associated with a plurality of images captured by the plurality of capturing devices 125 for analysis purposes. In one example, server 135 may determine an existence of an occlusion event (such as, by a person, by store equipment, such as a ladder, cart, etc.) and may provide a notification to resolve the occlusion event. In another example, server 135 may determine if a disparity exists between at least one contractual obligation and product placement as determined based on automatic analysis of the plurality of images. The transmitted information may include raw images, cropped images, processed image data, data about products identified in the images, and so forth. Network interface 306 may also transmit information identifying the location of the plurality capturing devices 125 in retail store 105.

With reference to FIG. 4B and consistent with the present disclosure, server 135 may receive image data captured by users 120. In a first embodiment, server 135 may receive image data acquired by store employees. In one implementation, a handheld device of a store employee (e.g., capturing device 125D) may display a real-time video stream captured by the image sensor of the handheld device. The real-time video stream may be augmented with markings identifying to the store employee an area-of-interest that needs manual capturing of images. One of the situations in which manual image capture may be desirable may occur where the area-of-interest is outside the fields of view of a plurality of cameras fixedly connected to store shelves in aisle 400. In other situations, manual capturing of images of an area-of-interest may be desirable when a current set of acquired images is out of date (e.g., obsolete in at least one respect) or of poor quality (e.g., lacking focus, obstacles, lesser resolution, lack of light, and so forth). Additional details of this embodiment are described in Applicant's International Patent Application No. PCT/IB2018/001107, which is incorporated herein by reference.

In a second embodiment, server 135 may receive image data acquired by crowd sourcing. In one exemplary implementation, server 135 may provide a request to a detected mobile device for an updated image of the area-of-interest in aisle 400. The request may include an incentive (e.g., $2 discount) to user 120 for acquiring the image. In response to the request, user 120 may acquire and transmit an up-to-date image of the area-of-interest. After receiving the image from user 120, server 135 may transmit the accepted incentive or agreed upon reward to user 120. The incentive may comprise a text notification and a redeemable coupon. In some embodiments, the incentive may include a redeemable coupon for a product associated with the area-of-interest. Server 135 may generate image-related data based on aggregation of data from images received from crowd sourcing and from images received from a plurality of cameras fixedly connected to store shelves. Additional details of this embodiment are described in Applicant's International Patent Application No. PCT/IB2017/000919, which is incorporated herein by reference.

With reference to FIG. 4C and consistent with the present disclosure, server 135 may receive image data captured by robotic devices with cameras traversing in aisle 400. The present disclosure is not limited to the type of robotic devices used to capture images of retail store 105. In some embodiments, the robotic devices may include a robot on a track (e.g., a Cartesian robot configured to move along an edge of a shelf or in parallel to a shelf, such as capturing device 125E), a drone (e.g., capturing device 125F), and/or a robot that may move on the floor of the retail store (e.g., a wheeled robot such as capturing device 125G, a legged robot, a snake-like robot, and so forth). The robotic devices may be controlled by server 135 and may be operated remotely or autonomously. In one example, server 135 may instruct capturing device 125E to perform periodic scans at times when no customers or other obstructions are identified in aisle 400. Specifically, capturing device 125E may be configured to move along store shelf 404 and to capture images of products placed on store shelf 404, products placed on store shelf 406, or products located on shelves opposite store shelf (e.g., store shelf 408). In another example, server 135 may instruct capturing device 125F to perform a scan of all the area of retail store 105 before the opening hour. In another example, server 135 may instruct capturing device 125G to capture a specific area-of-interest, similar as described above with reference to receiving images acquired by the store employees. In some embodiments, robotic capturing devices (such as 125F and 125G) may include an internal processing unit that may allow them to navigate autonomously within retail store 105. For example, the robotic capturing devices may use input from sensors (e.g., image sensors, depth sensors, proximity sensors, etc.), to avoid collision with objects or people, and to complete the scan of the desired area of retail store 105.

As discussed above with reference to FIG. 4A, the image data representative of products displayed on store shelves may be acquired by a plurality of stationary capturing devices 125 fixedly mounted in the retail store. One advantage of having stationary image capturing devices spread throughout retail store 105 is the potential for acquiring product images from set locations and on an ongoing basis such that up-to-date product status may be determined for products throughout a retail store at any desired periodicity (e.g., in contrast to a moving camera system that may acquire product images more infrequently). However, there may be certain challenges in this approach. The distances and angles of the image capturing devices relative to the captured products should be selected such as to enable adequate product identification, especially when considered in view of image sensor resolution and/or optics specifications. For example, a capturing device placed on the ceiling of retail store 105 may have sufficient resolutions and optics to enable identification of large products (e.g., a pack of toilet paper), but may be insufficient for identifying smaller products (e.g., deodorant packages). The image capturing devices should not occupy shelf space that is reserved for products for sale. The image capturing devices should not be positioned in places where there is a likelihood that their fields of view will be regularly blocked by different objects. The image capturing devices should be able to function for long periods of time with minimum maintenance. For example, a requirement for frequent replacement of batteries may render certain image acquisition systems cumbersome to use, especially where many image acquisition devices are in use throughout multiple locations in a retail store and across multiple retail stores. The image capturing devices should also include processing capabilities and transmission capabilities for providing real time or near real time image data about products. The disclosed image acquisition systems address these challenges.

FIG. 5A illustrates an example of a system 500 for acquiring images of products in retail store 105. Throughout the disclosure, capturing device 125 may refer to a system, such as system 500 shown in FIG. 5A. As shown, system 500 may include a first housing 502 configured for location on a retail shelving unit (e.g., as illustrated in FIG. 5B), and a second housing 504 configured for location on the retail shelving unit separate from first housing 502. The first and the second housing may be configured for mounting on the retail shelving unit in any suitable way (e.g., screws, bolts, clamps, adhesives, magnets, mechanical means, chemical means, and so forth). In some embodiments, first housing 502 may include an image capture device 506 (e.g., a camera module that may include image sensor 310) and second housing 504 may include at least one processor (e.g., processing device 302) configured to control image capture device 506 and also to control a network interface (e.g., network interface 306) for communicating with a remote server (e.g., server 135).

System 500 may also include a data conduit 508 extending between first housing 502 and second housing 504. Data conduit 508 may be configured to enable transfer of control signals from the at least one processor to image capture device 506 and to enable collection of image data acquired by image capture device 506 for transmission by the network interface. Consistent with the present disclosure, the term "data conduit" may refer to a communications channel that may include either a physical transmission medium such as a wire or a logical connection over a multiplexed medium such as a radio channel In some embodiments, data conduit 508 may be used for conveying image data from image capture device 506 to at least one processor located in second housing 504. Consistent with one implementation of system 500, data conduit 508 may include flexible printed circuits and may have a length of at least about 5 cm, at least about 10 cm, at least about 15 cm, etc. The length of data conduit 508 may be adjustable to enable placement of first housing 502 separately from second housing 504. For example, in some embodiments, data conduit may be retractable within second housing 504 such that the length of data conduit exposed between first housing 502 and second housing 504 may be selectively adjusted.

In one embodiment, the length of data conduit 508 may enable first housing 502 to be mounted on a first side of a horizontal store shelf facing the aisle (e.g., store shelf 510 illustrated in FIG. 5B) and second housing 504 to be mounted on a second side of store shelf 510 that faces the direction of the ground (e.g., an underside of a store shelf). In this embodiment, data conduit 508 may be configured to bend around an edge of store shelf 510 or otherwise adhere/follow contours of the shelving unit. For example, a first portion of data conduit 508 may be configured for location on the first side of store shelf 510 (e.g., a side facing an opposing retail shelving unit across an aisle) and a second portion of data conduit 508 may be configured for location on a second side of store shelf 510 (e.g., an underside of the shelf, which in some cases may be orthogonal to the first side). The second portion of data conduit 508 may be longer than the first portion of data conduit 508. Consistent with another embodiment, data conduit 508 may be configured for location within an envelope of a store shelf. For example, the envelope may include the outer boundaries of a channel located within a store shelf, a region on an underside of an L-shaped store shelf, a region between two store shelves, etc. Consistent with another implementation of system 500 discussed below, data conduit 508 may include a virtual conduit associated with a wireless communications link between first housing 502 and second housing 504.

FIG. 5B illustrates an exemplary configuration for mounting first housing 502 on store shelf 510. Consistent with the present disclosure, first housing 502 may be placed on store shelf 510, next to or embedded in a plastic cover that may be used for displaying prices. Alternatively, first housing 502 may be placed or mounted on any other location in retail store 105. For example, first housing 502 may be placed or mounted on the walls, on the ceiling, on refrigerator units, on display units, and more. The location and/or orientation of first housing 502 may be selected such that a field of view of image capture device 506 may cover at least a portion of an opposing retail shelving unit. Consistent with the present disclosure, image capture device 506 may have a view angle of between 50 and 80 degrees, about 62 degrees, about 67 degrees, or about 75 degrees. Consistent with the present disclosure, image capture device 506 may include an image sensor having sufficient image resolution to enable detection of text associated with labels on an opposing retail shelving unit. In one embodiment, the image sensor may include m*n pixels. For example, image capture device 506 may have an 8 MP image sensor that includes an array of 3280*2464 pixels. Each pixel may include at least one photo-voltaic cell that converts the photons of the incident light to an electric signal. The electrical signal may be converted to digital data by an A/D converter and processed by the image processor (ISP). In one embodiment, the image sensor of image capture device 506 may be associated with a pixel size of between 1.1×1.1 um2 and 1.7×1.7 um2, for example, 1.4× 1.4 um2.

Figure 6A:
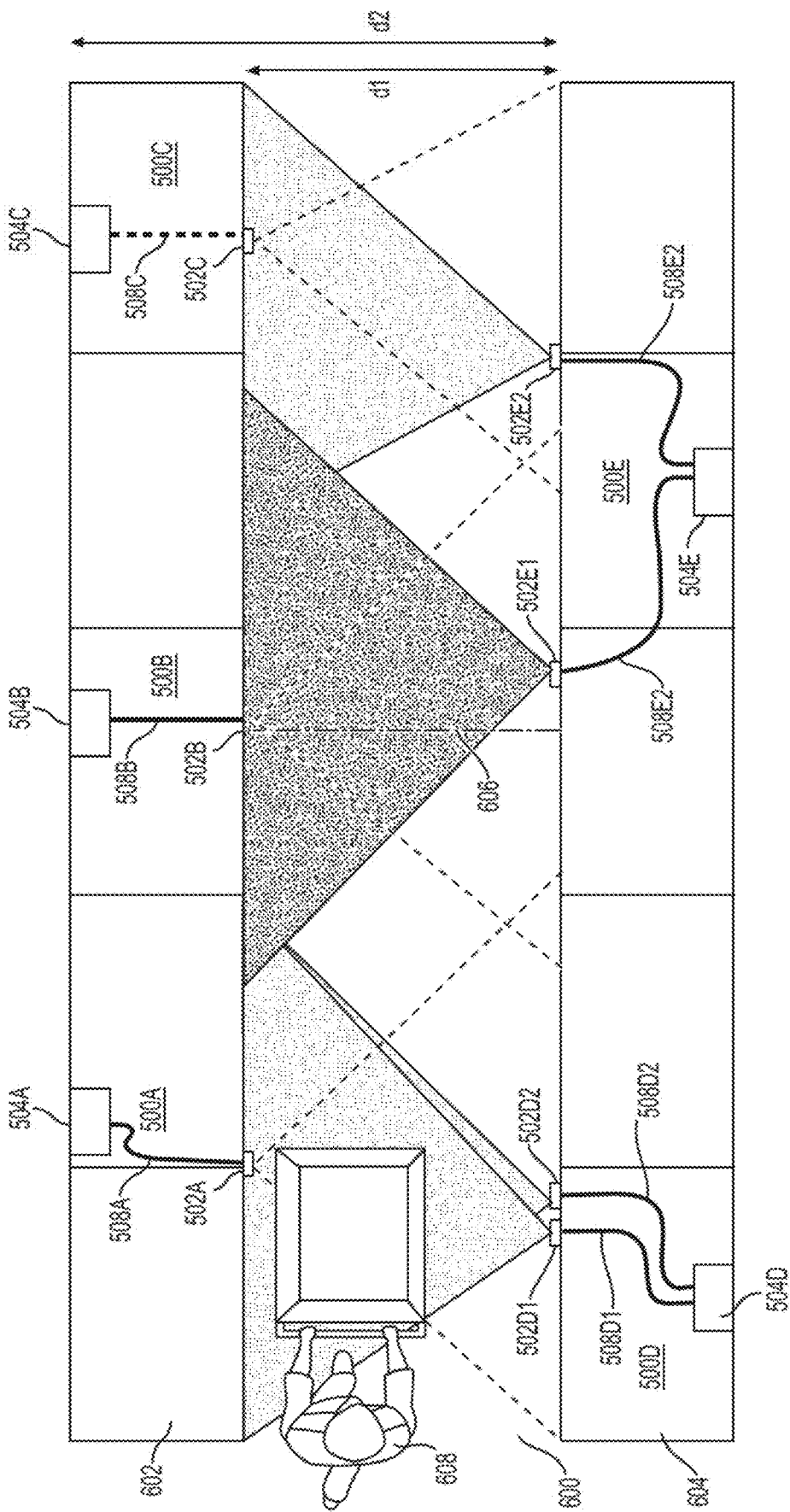
FIG. 6A is a top view representation of an aisle in a retail store with multiple image acquisition systems deployed thereon for acquiring images of products, consistent with the present disclosure.

Consistent with the present disclosure, image capture device 506 may be associated with a lens (e.g., lens 312) having a fixed focal length selected according to a distance expected to be encountered between retail shelving units on opposite sides of an aisle (e.g., distance d1 shown in FIG. 6A) and/or according to a distance expected to be encountered between a side of a shelving unit facing the aisle on one side of an aisle and a side of a shelving unit facing away of the aisle on the other side of the aisle (e.g., distance d2 shown in FIG. 6A). The focal length may also be based on any other expected distance between the image acquisition device and products to be imaged. As used herein, the term "focal length" refers to the distance from the optical center of the lens to a point where objects located at the point are substantially brought into focus. In contrast to zoom lenses, in fixed lenses the focus is not adjustable. The focus is typically set at the time of lens design and remains fixed. In one embodiment, the focal length of lens 312 may be selected based on the distance between two sides of aisles in the retail store (e.g., distance d1, distance d2, and so forth). In some embodiments, image capture device 506 may include a lens with a fixed focal length having a fixed value between 2.5 mm and 4.5 mm, such as about 3.1 mm, about 3.4 mm, about 3.7 mm. For example, when distance d1 between two opposing retail shelving units is about 2 meters, the focal length of the lens may be about 3.6 mm. Unless indicated otherwise, the term "about" with regards to a numeric value is defined as a variance of up to 5% with respect to the stated value. Of course, image capture devices having non-fixed focal lengths may also be used depending on the requirements of certain imaging environments, the power and space resources available, etc.

FIG. 5C illustrates an exploded view of second housing 504. In some embodiments, the network interface located in second housing 504 (e.g., network interface 306) may be configured to transmit to server 135 information associated with a plurality of images captured by image capture device 506. For example, the transmitted information may be used to determine if a disparity exists between at least one contractual obligation (e.g. planogram) and product placement. In one example, the network interface may support transmission speeds of 0.5 Mb/s, 1 Mb/s, 5 Mb/s, or more. Consistent with the present disclosure, the network interface may allow different modes of operations to be selected, such as: high-speed, slope-control, or standby. In high-speed mode, associated output drivers may have fast output rise and fall times to support high-speed bus rates; in slope-control, the electromagnetic interference may be reduced and the slope (i.e., the change of voltage per unit of time) may be proportional to the current output; and in standby mode, the transmitter may be switched off and the receiver may operate at a lower current.

Figure 6B:
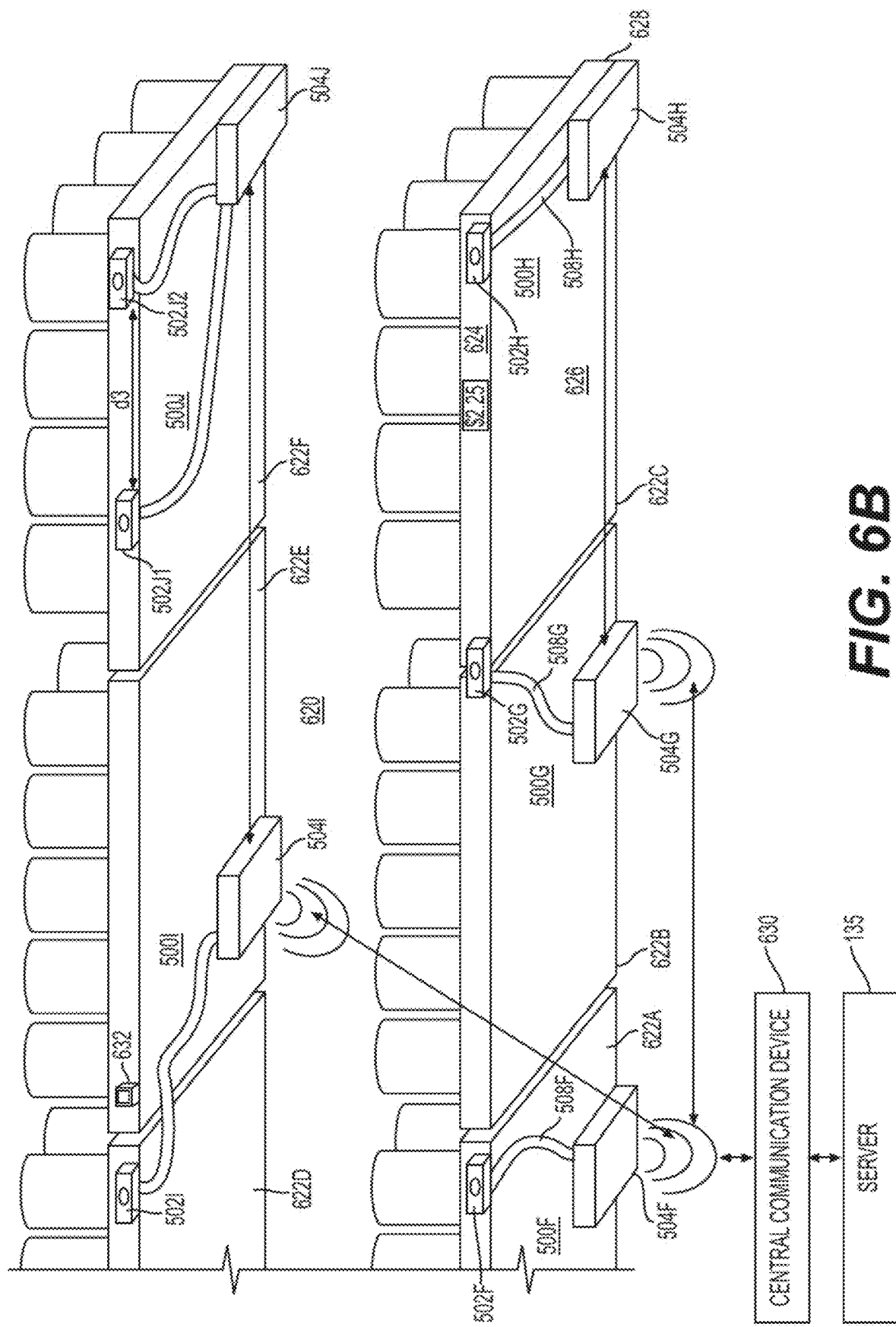
FIG. 6B is a perspective view representation of part of a retail shelving unit with multiple image acquisition systems deployed thereon for acquiring images of products, consistent with the present disclosure.

Consistent with the present disclosure, second housing 504 may include a power port 512 for conveying energy from a power source to first housing 502. In one embodiment, second housing 504 may include a section for at least one mobile power source 514 (e.g., in the depicted configuration the section is configured to house four batteries). The at least one mobile power source may provide sufficient power to enable image capture device 506 to acquire more than 1,000 pictures, more than 5,000 pictures, more than 10,000 pictures, or more than 15,000 pictures, and to transmit them to server 135. In one embodiment, mobile power source 514 located in a single second housing 504 may power two or more image capture devices 506 mounted on the store shelf. For example, as depicted in FIGS. 6A and 6B, a single second housing 504 may be connected to a plurality of first housings 502 with a plurality of image capture devices 506 covering different (overlapping or non-overlapping) fields of view. Accordingly, the two or more image capture devices 506 may be powered by a single mobile power source 514 and/or the data captured by two or more image capture devices 506 may be processed to generate a panoramic image by a single processing device located in second housing 504. In addition to mobile power source 514 or as an alternative to mobile power source 514, second housing 504 may also be connected to an external power source. For example, second housing 504 may be mounted to a store shelf and connected to an electric power grid. In this example, power port 512 may be connected to the store shelf through a wire for providing electrical power to image capture device 506. In another example, a retail shelving unit or retail store 105 may include a wireless power transmission system, and power port 512 may be connected to a device configured to obtain electrical power from the wireless power transmission system. In addition, as discussed below, system 500 may use power management policies to reduce the power consumption. For example, system 500 may use selective image capturing and/or selective transmission of images to reduce the power consumption or conserve power.

FIG. 6A illustrates a schematic diagram of a top view of aisle 600 in retail store 105 with multiple image acquisition systems 500 (e.g., 500A, 500B, 500C, 500D, and 500E) deployed thereon for acquiring images of products. Aisle 600 may include a first retail shelving unit 602 and a second retail shelving unit 604 that opposes first retail shelving unit 602. In some embodiments, different numbers of systems 500 may be mounted on opposing retail shelving units. For example, system 500A (including first housing 502A, second housing 504A, and data conduit 508A), system 500B

(including first housing 502B second housing 504B, and data conduit 508B), and system 500C (including first housing 502C, second housing 504C, and data conduit 508C) may be mounted on first retail shelving unit 602; and system 500D (including first housing 502D1, first housing 502D2, second housing 504D, and data conduits 508D1 and 508D2) and system 500E (including first housing 502E1, first housing 502E2, second housing 504E, and data conduits 508E1 and 508E2) may be mounted on second retail shelving unit 604. Consistent with the present disclosure, image capture device 506 may be configured relative to first housing 502 such that an optical axis of image capture device 506 is directed toward an opposing retail shelving unit when first housing 502 is fixedly mounted on a retail shelving unit. For example, optical axis 606 of the image capture device associated with first housing 502B may be directed towards second retail shelving unit 604 when first housing 502B is fixedly mounted on first retail shelving unit 602. A single retail shelving unit may hold a number of systems 500 that include a plurality of image capturing devices. Each of the image capturing devices may be associated with a different field of view directed toward the opposing retail shelving unit. Different vantage points of differently located image capture devices may enable image acquisition relative to different sections of a retail shelf. For example, at least some of the plurality of image capturing devices may be fixedly mounted on shelves at different heights. Examples of such a deployment are illustrated in FIGS. 4A and 6B.

As shown in FIG. 6A each first housing 502 may be associated with a data conduit 508 that enables exchanging of information (e.g., image data, control signals, etc.) between the at least one processor located in second housing 504 and image capture device 506 located in first housing 502. In some embodiments, data conduit 508 may include a wired connection that supports data-transfer and may be used to power image capture device 506 (e.g., data conduit 508A, data conduit 508B, data conduit 508D1, data conduit 508D2, data conduit 508E1, and data conduit 508E2). Consistent with these embodiments, data conduit 508 may comply with a wired standard such as USB, Micro-USB, HDMI, Micro-HDMI, Firewire, Apple, etc. In other embodiments, data conduit 508 may be a wireless connection, such as a dedicated communications channel between the at least one processor located in second housing 504 and image capture device 506 located in first housing 502 (e.g., data conduit 508C). In one example, the communications channel may be established by two Near Field Communication (NFC) transceivers. In other examples, first housing 502 and second housing 504 may include interface circuits that comply with other short-range wireless standards such as Bluetooth, WiFi, ZigBee, etc.

In some embodiments of the disclosure, the at least one processor of system 500 may cause at least one image capture device 506 to periodically capture images of products located on an opposing retail shelving unit (e.g., images of products located on a shelf across an aisle from the shelf on which first housing 502 is mounted). The term "periodically capturing images" includes capturing an image or images at predetermined time intervals (e.g., every minute, every 30 minutes, every 150 minutes, every 300 minutes, etc.), capturing video, capturing an image every time a status request is received, and/or capturing an image subsequent to receiving input from an additional sensor, for example, an associated proximity sensor. Images may also be captured based on various other triggers or in response to various other detected events. In some embodiments, system 500 may receive an output signal from at least one sensor located on an opposing retail shelving unit. For example, system 500B may receive output signals from a sensing system located on second retail shelving unit 604. The output signals may be indicative of a sensed lifting of a product from second retail shelving unit 604 or a sensed positioning of a product on second retail shelving unit 604. In response to receiving the output signal from the at least one sensor located on second retail shelving unit 604, system 500B may cause image capture device 506 to capture one or more images of second retail shelving unit 604. Additional details on a sensing system, including the at least one sensor that generates output signals indicative of a sensed lifting of a product from an opposing retail shelving unit, is discussed below with reference to FIGS. 8-10.

Consistent with embodiments of the disclosure, system 500 may detect an object 608 in a selected area between first retail shelving unit 602 and second retail shelving unit 604. Such detection may be based on the output of one or more dedicated sensors (e.g., motion detectors, etc.) and/or may be based on image analysis of one or more images acquired by an image acquisition device. Such images, for example, may include a representation of a person or other object recognizable through various image analysis techniques (e.g., trained neural networks, Fourier transform analysis, edge detection, filters, face recognition, and so forth). The selected area may be associated with distance d1 between first retail shelving unit 602 and second retail shelving unit 604. The selected area may be within the field of view of image capture device 506 or an area where the object causes an occlusion of a region of interest (such as a shelf, a portion of a shelf being monitored, and more). Upon detecting object 608, system 500 may cause image capture device 506 to forgo image acquisition while object 608 is within the selected area. In one example, object 608 may be an individual, such as a customer or a store employee. In another example, detected object 608 may be an inanimate object, such as a cart, box, carton, one or more products, cleaning robots, etc. In the example illustrated in FIG. 6A, system 500A may detect that object 608 has entered into its associated field of view (e.g., using a proximity sensor) and may instruct image capturing device 506 to forgo image acquisition. In alternative embodiments, system 500 may analyze a plurality of images acquired by image capture device 506 and identify at least one image of the plurality of images that includes a representation of object 608. Thereafter, system 500 may avoid transmission of at least part of the at least one identified image and/or information based on the at least one identified image to server 135.

As shown in FIG. 6A, the at least one processor contained in a second housing 504 may control a plurality of image capture devices 506 contained in a plurality of first housings 502 (e.g., systems 500D and 500E). Controlling image capturing device 506 may include instructing image capturing device 506 to capture an image and/or transmit captured images to a remote server (e.g., server 135). In some cases, each of the plurality of image capture devices 506 may have a field of view that at least partially overlaps with a field of view of at least one other image capture device 506 from among plurality of image capture devices 506. In one embodiment, the plurality of image capture devices 506 may be configured for location on one or more horizontal shelves and may be directed to substantially different areas of the opposing first retail shelving unit. In this embodiment, the at least one processor may control the plurality of image capture devices such that each of the plurality of image capture devices may capture an image at a different time. For example, system 500E may have a second housing 504E with at least one processor that may instruct a first image capturing device contained in first housing 502E1 to capture an image at a first time and may instruct a second image capturing device contained in first housing 502E2 to capture an image at a second time which differs from the first time. Capturing images in different times (or forwarding them to the at least one processor at different times) may assist in processing the images and writing the images in the memory associated with the at least one processor.

FIG. 6B illustrates a perspective view assembly diagram depicting a portion of a retail shelving unit 620 with multiple systems 500 (e.g., 500F, 500G, 500H, 500I, and 500J) deployed thereon for acquiring images of products. Retail shelving unit 620 may include horizontal shelves at different heights. For example, horizontal shelves 622A, 622B, and 622C are located below horizontal shelves 622D, 622E, and 622F. In some embodiments, a different number of systems 500 may be mounted on shelves at different heights. For example, system 500F (including first housing 502F and second housing 504F), system 500G (including first housing 502G and second housing 504G), and system 500H (including first housing 502H and second housing 504H) may be mounted on horizontal shelves associated with a first height; and system 500J (including first housing 502J, second housing 504J, and a projector 632) and system 500J (including first housing 502J1, first housing 502J2, and second housing 504J) may be mounted on horizontal shelves associated with a second height. In some embodiments, retail shelving unit 620 may include a horizontal shelf with at least one designated place (not shown) for mounting a housing of image capturing device 506. The at least one designated place may be associated with connectors such that first housing 502 may be fixedly mounted on a side of horizontal shelf 622 facing an opposing retail shelving unit using the connectors.

Consistent with the present disclosure, system 500 may be mounted on a retail shelving unit that includes at least two adjacent horizontal shelves (e.g., shelves 622A and 622B) forming a substantially continuous surface for product placement. The store shelves may include standard store shelves or customized store shelves. A length of each store shelf 622 may be at least 50 cm, less than 200 cm, or between 75 cm to 175 cm. In one embodiment, first housing 502 may be fixedly mounted on the retail shelving unit in a slit between two adjacent horizontal shelves. For example, first housing 502G may be fixedly mounted on retail shelving unit 620 in a slit between horizontal shelf 622B and horizontal shelf 622C. In another embodiment, first housing 502 may be fixedly mounted on a first shelf and second housing 504 may be fixedly mounted on a second shelf. For example, first housing 502J may be mounted on horizontal shelf 622D and second housing 504J may be mounted on horizontal shelf 622E. In another embodiment, first housing 502 may be fixedly mounted on a retail shelving unit on a first side of a horizontal shelf facing the opposing retail shelving unit and second housing 504 may be fixedly mounted on retail shelving unit 620 on a second side of the horizontal shelf orthogonal to the first side. For example, first housing 502H may mounted on a first side 624 of horizontal shelf 622C next to a label and second housing 504H may be mounted on a second side 626 of horizontal shelf 622C that faces down (e.g., towards the ground or towards a lower shelf). In another embodiment, second housing 504 may be mounted closer to the back of the horizontal shelf than to the front of the horizontal shelf. For example, second housing 504H may be fixedly mounted on horizontal shelf 622C on second side 626 closer to third side 628 of the horizontal shelf 622C than to first side 624. Third side 628 may be parallel to first side 624. As mentioned above, data conduit 508 (e.g., data conduit 508H) may have an adjustable or selectable length for extending between first housing 502 and second housing 504. In one embodiment, when first housing 502H is fixedly mounted on first side 624, the length of data conduit 508H may enable second housing 604H to be fixedly mounted on second side 626 closer to third side 628 than to first side 624.

As mentioned above, at least one processor contained in a single second housing 504 may control a plurality of image capture devices 506 contained in a plurality of first housings 502 (e.g., system 500J). In some embodiments, the plurality of image capture devices 506 may be configured for location on a single horizontal shelf and may be directed to substantially the same area of the opposing first retail shelving unit (e.g., system 500D in FIG. 6A). In these embodiments, the image data acquired by the first image capture device and the second image capture device may enable a calculation of depth information (e.g., based on image parallax information) associated with at least one product positioned on an opposing retail shelving unit. For example, system 500J may have single second housing 504J with at least one processor that may control a first image capturing device contained in first housing 502J1 and a second image capturing device contained in first housing 502J2. The distance d3 between the first image capture device contained in first housing 502J1 and the second image capture device contained in first housing 502J2 may be selected based on the distance between retail shelving unit 620 and the opposing retail shelving unit (e.g., similar to d1 and/or d2). For example, distance d3 may be at least 5 cm, at least 10 cm, at least 15 cm, less than 40 cm, less than 30 cm, between about 5 cm to about 20 cm, or between about 10 cm to about 15 cm. In another example, d3 may be a function of d1 and/or d2, a linear function of d1 and/or d2, a function of $d1*\log(d1)$ and/or $d2*\log(d2)$ such as $a1*d1*\log(d1)$ for some constant a1, and so forth. The data from the first image capturing device contained in first housing 502J1 and the second image capturing device contained in first housing 502J2 may be used to estimate the number of products on a store shelf of retail shelving unit 602. In related embodiments, system 500 may control a projector (e.g., projector 632) and image capture device 506 that are configured for location on a single store shelf or on two separate store shelves. For example, projector 632 may be mounted on horizontal shelf 622E and image capture device 506I may be mounted on horizontal shelf 622D. The image data acquired by image capture device 506 (e.g., included in first housing 502I) may include reflections of light patterns projected from projector 632 on the at least one product and/or the opposing retail shelving unit and may enable a calculation of depth information associated with at least one product positioned on the opposing retail shelving unit. The distance between projector 632 and the image capture device contained in first housing 502I may be selected based on the distance between retail shelving unit 620 and the opposing retail shelving unit (e.g., similar to d1 and/or d2). For example, the distance between the projector and the image capture device may be at least 5 cm, at least 10 cm, at least 15 cm, less than 40 cm, less than 30 cm, between about 5 cm to about 20 cm, or between about 10 cm to about 15 cm. In another example, the distance between the projector and the image capture device may be a function of d1 and/or d2, a linear function of d1 and/or d2, a function of $d1*\log(d1)$ and/or $d2*\log(d2)$ such as $a1*d1*\log(d1)$ for some constant a1, and so forth.

Consistent with the present disclosure, a central communication device 630 may be located in retail store 105 and may be configured to communicate with server 135 (e.g., via an Internet connection). The central communication device may also communicate with a plurality of systems 500 (for example, less than ten, ten, eleven, twelve, more than twelve, and so forth). In some cases, at least one system of the plurality of systems 500 may be located in proximity to central communication device 630. In the illustrated example, system 500F may be located in proximity to central communication device 630. In some embodiments, at least some of systems 500 may communicate directly with at least one other system 500. The communications between some of the plurality of systems 500 may happen via a wired connection, such as the communications between system 500J and system 500I and the communications between system 500H and system 500G. Additionally or alternatively, the communications between some of the plurality of systems 500 may occur via a wireless connection, such as the communications between system 500G and system 500F and the communications between system 500I and system 500F. In some examples, at least one system 500 may be configured to transmit captured image data (or information derived from the captured image data) to central communication device 630 via at least two mediating systems 500, at least three mediating systems 500, at least four mediating systems 500, or more. For example, system 500J may convey captured image data to central communication device 630 via system 500I and system 500F.

Consistent with the present disclosure, two (or more) systems 500 may share information to improve image acquisition. For example, system 500J may be configured to receive from a neighboring system 500I information associated with an event that system 500I had identified, and control image capture device 506 based on the received information. For example, system 500J may forgo image acquisition based on an indication from system 500I that an object has entered or is about to enter its field of view. Systems 500I and 500J may have overlapping fields of view or non-overlapping fields of view. In addition, system 500J may also receive (from system 500I) information that originates from central communication device 630 and control image capture device 506 based on the received information. For example, system 500I may receive instructions from central communication device 630 to capture an image when suppler 115 inquiries about a specific product that is placed in a retail unit opposing system 500I. In some embodiments, a plurality of systems 500 may communicate with central communication device 630. In order to reduce or avoid network congestion, each system 500 may identify an available transmission time slot. Thereafter, each system 500 may determine a default time slot for future transmissions based on the identified transmission time slot.

Figure 6C:
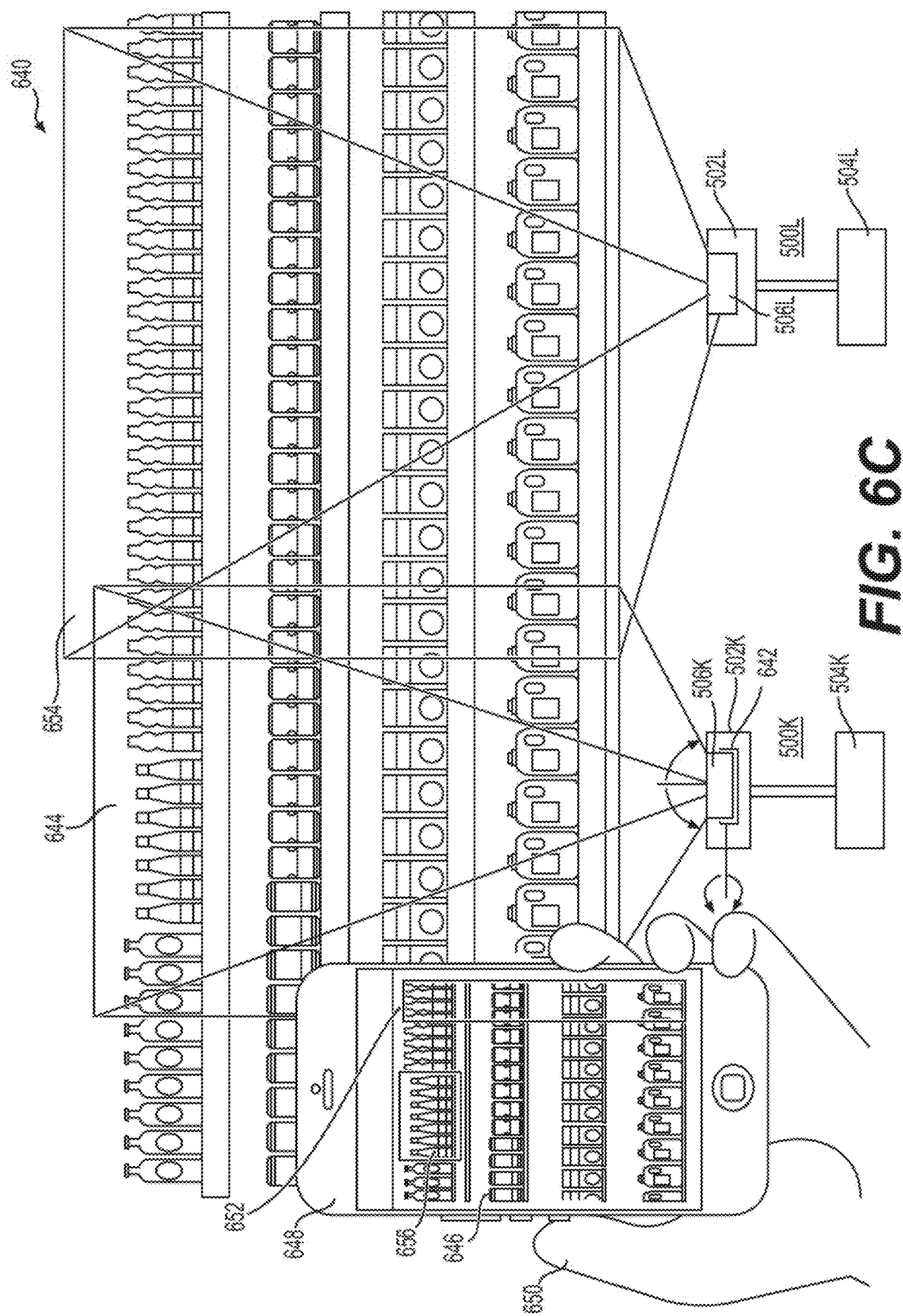
FIG. 6C provides a diagrammatic representation of how the exemplary disclosed image acquisition systems may be positioned relative to retail shelving to acquire product images, consistent with the present disclosure.

FIG. 6C provides a diagrammatic representation of a retail shelving unit 640 being captured by multiple systems 500 (e.g., system 500K and system 500L) deployed on an opposing retail shelving unit (not shown). FIG. 6C illustrates embodiments associated with the process of installing systems 500 in retail store 105. To facilitate the installation of system 500, each first housing 502 (e.g., first housing 502K) may include an adjustment mechanism 642 for setting a field of view 644 of image capture device 506K such that the field of view 644 will at least partially encompass products placed both on a bottom shelf of retail shelving unit 640 and on a top shelf of retail shelving unit 640. For example, adjustment mechanism 642 may enable setting the position of image capture device 506K relative to first housing 502K. Adjustment mechanism 642 may have at least two degrees of freedom to separately adjust manually (or automatically) the vertical field of view and the horizontal field of view of image capture device 506K. In one embodiment, the angle of image capture device 506K may be measured using position sensors associated with adjustment mechanism 642, and the measured orientation may be used to determine if image capture device 506K is positioned in the right direction. In one example, the output of the position sensors may be displayed on a handheld device of an employee installing image capturing device 506K. Such an arrangement may provide the employee/installer with real time visual feedback representative of the field of view of an image acquisition device being installed.

In addition to adjustment mechanism 642, first housing 502 may include a first physical adapter (not shown) configured to operate with multiple types of image capture device 506 and a second physical adapter (not shown) configured to operate with multiple types of lenses. During installation, the first physical adapter may be used to connect a suitable image capture device 506 to system 500 according to the level of recognition requested (e.g., detecting a barcode from products, detecting text and price from labels, detecting different categories of products, and so forth). Similarly, during installation, the second physical adapter may be used to associate a suitable lens to image capture device 506 according to the physical conditions at the store (e.g., the distance between the aisles, the horizontal field of view required from image capture device 506, and/or the vertical field of view required from image capture device 506). The second physical adapter provides the employee/installer the ability to select the focal length of lens 312 during installation according to the distance between retail shelving units on opposite sides of an aisle (e.g., distance d1 and/or distance d2 shown in FIG. 6A). In some embodiments, adjustment mechanism 642 may include a locking mechanism to reduce the likelihood of unintentional changes in the field of view of image capture device 506. Additionally or alternatively, the at least one processor contained in second housing 504 may detect changes in the field of view of image capture device 506 and issue a warning when a change is detected, when a change larger than a selected threshold is detected, when a change is detected for a duration longer than a selected threshold, and so forth.

In addition to adjustment mechanism 642 and the different physical adapters, system 500 may modify the image data acquired by image capture device 506 based on at least one attribute associated with opposing retail shelving unit 640. Consistent with the present disclosure, the at least one attribute associated with retail shelving unit 640 may include a lighting condition, the dimensions of opposing retail shelving unit 640, the size of products displayed on opposing retail shelving unit 640, the type of labels used on opposing retail shelving unit 640, and more. In some embodiments, the attribute may be determined, based on analysis of one or more acquired images, by at least one processor contained in second housing 504. Alternatively, the attribute may be automatically sensed and conveyed to the at least one processor contained in second housing 504. In one example, the at least one processor may change the brightness of captured images based on the detected light conditions. In another example, the at least one processor may modify the image data by cropping the image such that it will include only the products on retail shelving unit (e.g., not to include the floor or the ceiling), only area of the shelving unit relevant to a selected task (such as planogram compliance check), and so forth.

Consistent with the present disclosure, during installation, system 500 may enable real-time display 646 of field of view 644 on a handheld device 648 of a user 650 installing image capturing device 506K. In one embodiment, real-time display 646 of field of view 644 may include augmented markings 652 indicating a location of a field of view 654 of an adjacent image capture device 506L. In another embodiment, real-time display 646 of field of view 644 may include augmented markings 656 indicating a region of interest in opposing retail shelving unit 640. The region of interest may be determined based on a planogram, identified product type, and/or part of retail shelving unit 640. For example, the region of interest may include products with a greater likelihood of planogram incompliance. In addition, system 500K may analyze acquired images to determine if field of view 644 includes the area that image capturing device 506K is supposed to monitor (for example, from labels on opposing retail shelving unit 640, products on opposing retail shelving unit 640, images captured from other image capturing devices that may capture other parts of opposing retail shelving unit 640 or capture the same part of opposing retail shelving unit 640 but in a lower resolution or at a lower frequency, and so forth). In additional embodiments, system 500 may further comprise an indoor location sensor which may help determine if the system 500 is positioned at the right location in retail store 105.

In some embodiments, an anti-theft device may be located in at least one of first housing 502 and second housing 504. For example, the anti-theft device may include a specific RF label or a pin-tag radio-frequency identification device, which may be the same or similar to a type of anti-theft device that is used by retail store 105 in which system 500 is located. The RF label or the pin-tag may be incorporated within the body of first housing 502 and second housing 504 and may not be visible. In another example, the anti-theft device may include a motion sensor whose output may be used to trigger an alarm in the case of motion or disturbance, in case of motion that is above a selected threshold, and so forth.

Figure 7A:
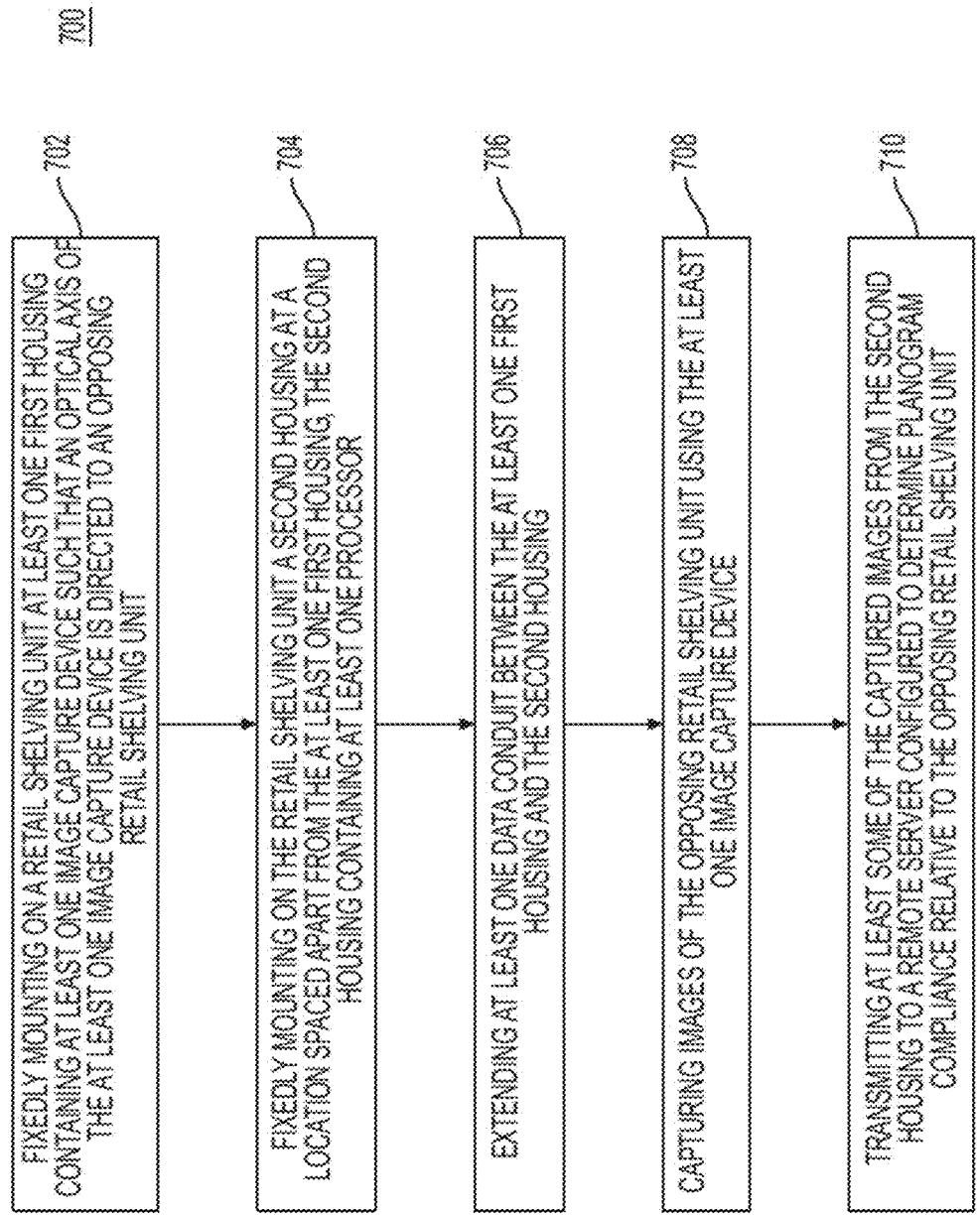
FIG. 7A provides a flowchart of an exemplary method for acquiring images of products in retail store, consistent with the present disclosure.

FIG. 7A includes a flowchart representing an exemplary method 700 for acquiring images of products in retail store 105 in accordance with example embodiments of the present disclosure. For purposes of illustration, in the following description, reference is made to certain components of system 500 as deployed in the configuration depicted in FIG. 6A. It will be appreciated, however, that other implementations are possible and that other configurations may be utilized to implement the exemplary method. It will also be readily appreciated that the illustrated method can be altered to modify the order of steps, delete steps, or further include additional steps.

At step 702, the method includes fixedly mounting on first retail shelving unit 602 at least one first housing 502 containing at least one image capture device 506 such that an optical axis (e.g., optical axis 606) of at least one image capture device 506 is directed to second retail shelving unit 604. In one embodiment, fixedly mounting first housing 502 on first retail shelving unit 602 may include placing first housing 502 on a side of store shelf 622 facing second retail shelving unit 604. In another embodiment, fixedly mounting first housing 502 on retail shelving unit 602 may include placing first housing 502 in a slit between two adjacent horizontal shelves. In some embodiments, the method may further include fixedly mounting on first retail shelving unit 602 at least one projector (such as projector 632) such that light patterns projected by the at least one projector are directed to second retail shelving unit 604. In one embodiment, the method may include mounting the at least one projector to first retail shelving unit 602 at a selected distance to first housing 502 with image capture device 506. In one embodiment, the selected distance may be at least 5 cm, at least 10 cm, at least 15 cm, less than 40 cm, less than 30 cm, between about 5 cm to about 20 cm, or between about 10 cm to about 15 cm. In one embodiment, the selected distance may be calculated according to a distance between to first retail shelving unit 602 and second retail shelving unit 604, such as d1 and/or d2, for example selecting the distance to be a function of d1 and/or d2, a linear function of d1 and/or d2, a function of d1*log(d1) and/or d2*log(d2) such as a1*d1*log(d1) for some constant a1, and so forth.

At step 704, the method includes fixedly mounting on first retail shelving unit 602 second housing 504 at a location spaced apart from the at least one first housing 502, second housing 504 may include at least one processor (e.g., processing device 302). In one embodiment, fixedly mounting second housing 504 on the retail shelving unit may include placing second housing 504 on a different side of store shelf 622 than the side first housing 502 is mounted on.

At step 706, the method includes extending at least one data conduit 508 between at least one first housing 502 and second housing 504. In one embodiment, extending at least one data conduit 508 between at least one first housing 502 and second housing 504 may include adjusting the length of data conduit 508 to enable first housing 502 to be mounted separately from second housing 504. At step 708, the method includes capturing images of second retail shelving unit 604 using at least one image capture device 506 contained in at least one first housing 502 (e.g., first housing 502A, first housing 502B, or first housing 502C). In one embodiment, the method further includes periodically capturing images of products located on second retail shelving unit 604. In another embodiment the method includes capturing images of second retail shelving unit 604 after receiving a trigger from at least one additional sensor in communication with system 500 (wireless or wired).

At step 710, the method includes transmitting at least some of the captured images from second housing 504 to a remote server (e.g., server 135) configured to determine planogram compliance relative to second retail shelving unit 604. In some embodiments, determining planogram compliance relative to second retail shelving unit 604 may include determining at least one characteristic of planogram compliance based on detected differences between the at least one planogram and the actual placement of the plurality of product types on second retail shelving unit 604. Consistent with the present disclosure, the characteristic of planogram compliance may include at least one of: product facing, product placement, planogram compatibility, price correlation, promotion execution, product homogeneity, restocking rate, and planogram compliance of adjacent products.

Figure 7B:
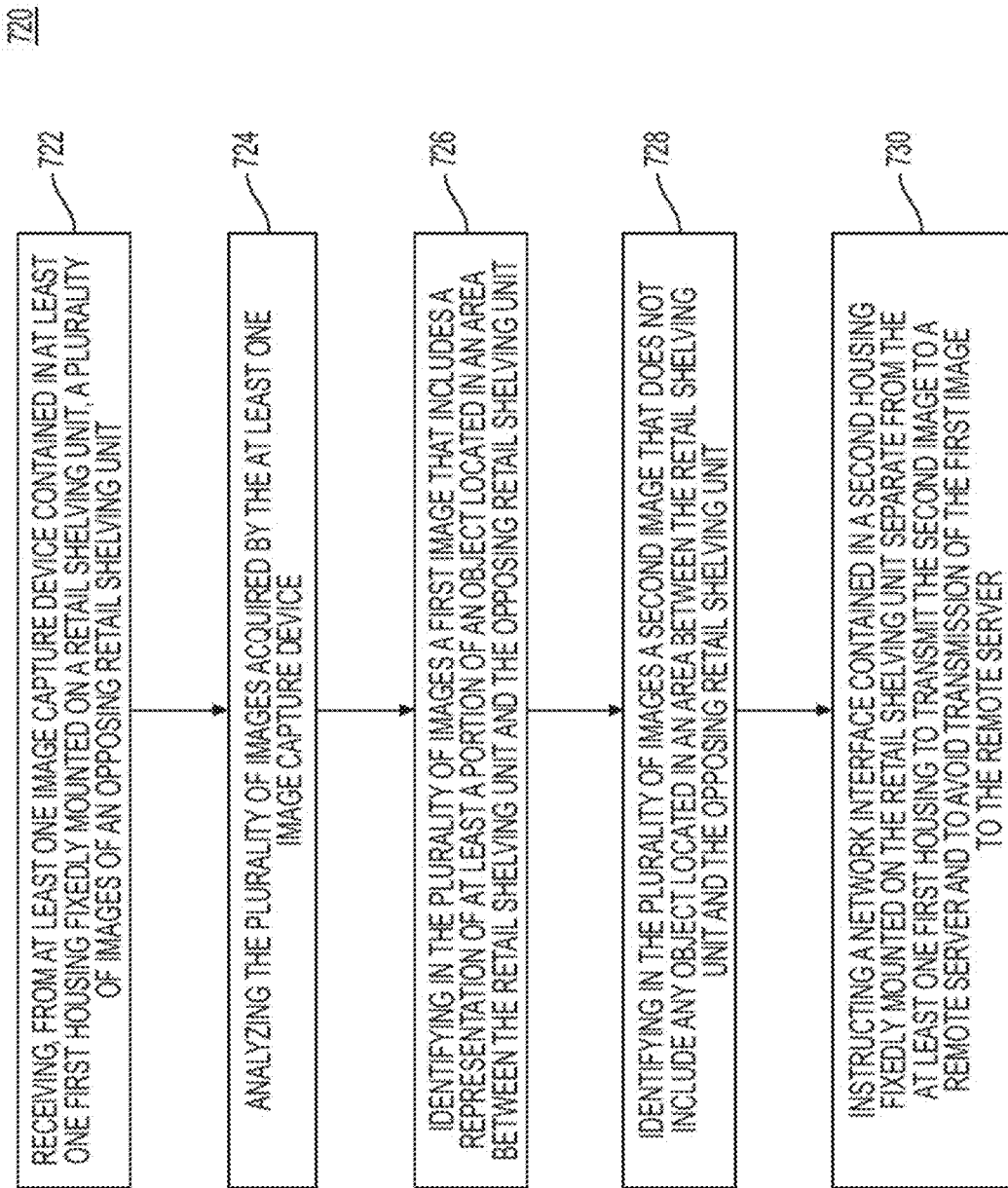
FIG. 7B provides a flowchart of a method for acquiring images of products in retail store, consistent with the present disclosure.

FIG. 7B provides a flowchart representing an exemplary method 720 for acquiring images of products in retail store 105, in accordance with example embodiments of the present disclosure. For purposes of illustration, in the following description, reference is made to certain components of system 500 as deployed in the configuration depicted in FIG. 6A. It will be appreciated, however, that other implementations are possible and that other configurations may be utilized to implement the exemplary method. It will also be readily appreciated that the illustrated method can be altered to modify the order of steps, delete steps, or further include additional steps.

At step 722, at least one processor contained in a second housing may receive from at least one image capture device contained in at least one first housing fixedly mounted on a retail shelving unit a plurality of images of an opposing retail shelving unit. For example, at least one processor contained in second housing 504A may receive from at least one image capture device 506 contained in first housing 502A (fixedly mounted on first retail shelving unit 602) a plurality of images of second retail shelving unit 604. The plurality of images may be captured and collected during a period of time (e.g., a minute, an hour, six hours, a day, a week, or more).

At step 724, the at least one processor contained in the second housing may analyze the plurality of images acquired by the at least one image capture device. In one embodiment, at least one processor contained in second housing 504A may use any suitable image analysis technique (for example, object recognition, object detection, image segmentation, feature extraction, optical character recognition (OCR), object-based image analysis, shape region techniques, edge detection techniques, pixel-based detection, artificial neural networks, convolutional neural networks, etc.) to identify objects in the plurality of images. In one example, the at least one processor contained in second housing 504A may determine the number of products located in second retail shelving unit 604. In another example, the at least one processor contained in second housing 504A may detect one or more objects in an area between first retail shelving unit 602 and second retail shelving unit 604.

At step 726, the at least one processor contained in the second housing may identify in the plurality of images a first image that includes a representation of at least a portion of an object located in an area between the retail shelving unit and the opposing retail shelving unit. In step 728, the at least one processor contained in the second housing may identify in the plurality of images a second image that does not include any object located in an area between the retail shelving unit and the opposing retail shelving unit. In one example, the object in the first image may be an individual, such as a customer or a store employee. In another example, the object in the first image may be an inanimate object, such as carts, boxes, products, etc.

At step 730, the at least one processor contained in the second housing may instruct a network interface contained in the second housing, fixedly mounted on the retail shelving unit separate from the at least one first housing, to transmit the second image to a remote server and to avoid transmission of the first image to the remote server. In addition, the at least one processor may issue a notification when an object blocks the field of view of the image capturing device for more than a predefined period of time (e.g., at least 30 minutes, at least 75 minutes, at least 150 minutes).

Embodiments of the present disclosure may automatically assess compliance of one or more store shelves with a planogram. For example, embodiments of the present disclosure may use signals from one or more sensors to determine placement of one or more products on store shelves. The disclosed embodiments may also use one or more sensors to determine empty spaces on the store shelves. The placements and empty spaces may be automatically assessed against a digitally encoded planogram. A planogram refers to any data structure or specification that defines at least one product characteristic relative to a display structure associated with a retail environment (such as store shelf or area of one or more shelves). Such product characteristics may include, among other things, quantities of products with respect to areas of the shelves, product configurations or product shapes with respect to areas of the shelves, product arrangements with respect to areas of the shelves, product density with respect to areas of the shelves, product combinations with respect to areas of the shelves, etc. Although described with reference to store shelves, embodiments of the present disclosure may also be applied to end caps or other displays; bins, shelves, or other organizers associated with a refrigerator or freezer units; or any other display structure associated with a retail environment.

The embodiments disclosed herein may use any sensors configured to detect one or more parameters associated with products (or a lack thereof). For example, embodiments may use one or more of pressure sensors, weight sensors, light sensors, resistive sensors, capacitive sensors, inductive sensors, vacuum pressure sensors, high pressure sensors, conductive pressure sensors, infrared sensors, photo-resistor sensors, photo-transistor sensors, photo-diodes sensors, ultrasonic sensors, or the like. Some embodiments may use a plurality of different kinds of sensors, for example, associated with the same or overlapping areas of the shelves and/or associated with different areas of the shelves. Some embodiments may use a plurality of sensors configured to be placed adjacent a store shelf, configured for location on the store shelf, configured to be attached to, or configured to be integrated with the store shelf. In some cases, at least part of the plurality of sensors may be configured to be placed next to a surface of a store shelf configured to hold products. For example, the at least part of the plurality of sensors may be configured to be placed relative to a part of a store shelf such that the at least part of the plurality of sensors may be positioned between the part of a store shelf and products placed on the part of the shelf. In another embodiment, the at least part of the plurality of sensors may be configured to be placed above and/or within and/or under the part of the shelf.

In one example, the plurality of sensors may include light detectors configured to be located such that a product placed on the part of the shelf may block at least some of the ambient light from reaching the light detectors. The data received from the light detectors may be analyzed to detect a product or to identify a product based on the shape of a product placed on the part of the shelf. In one example, the system may identify the product placed above the light detectors based on data received from the light detectors that may be indicative of at least part of the ambient light being blocked from reaching the light detectors. Further, the data received from the light detectors may be analyzed to detect vacant spaces on the store shelf. For example, the system may detect vacant spaces on the store shelf based on the received data that may be indicative of no product being placed on a part of the shelf. In another example, the plurality of sensors may include pressure sensors configured to be located such that a product placed on the part of the shelf may apply detectable pressure on the pressure sensors. Further, the data received from the pressure sensors may be analyzed to detect a product or to identify a product based on the shape of a product placed on the part of the shelf. In one example, the system may identify the product placed above the pressure sensors based on data received from the pressure sensors being indicative of pressure being applied on the pressure sensors. In addition, the data from the pressure sensors may be analyzed to detect vacant spaces on the store shelf, for example based on the readings being indicative of no product being placed on a part of the shelf, for example, when the pressure readings are below a selected threshold. Consistent with the present disclosure, inputs from different types of sensors (such as pressure sensors, light detectors, etc.) may be combined and analyzed together, for example to detect products placed on a store shelf, to identify shapes of products placed on a store shelf, to identify types of products placed on a store shelf, to identify vacant spaces on a store shelf, and so forth.

Figure 8A:
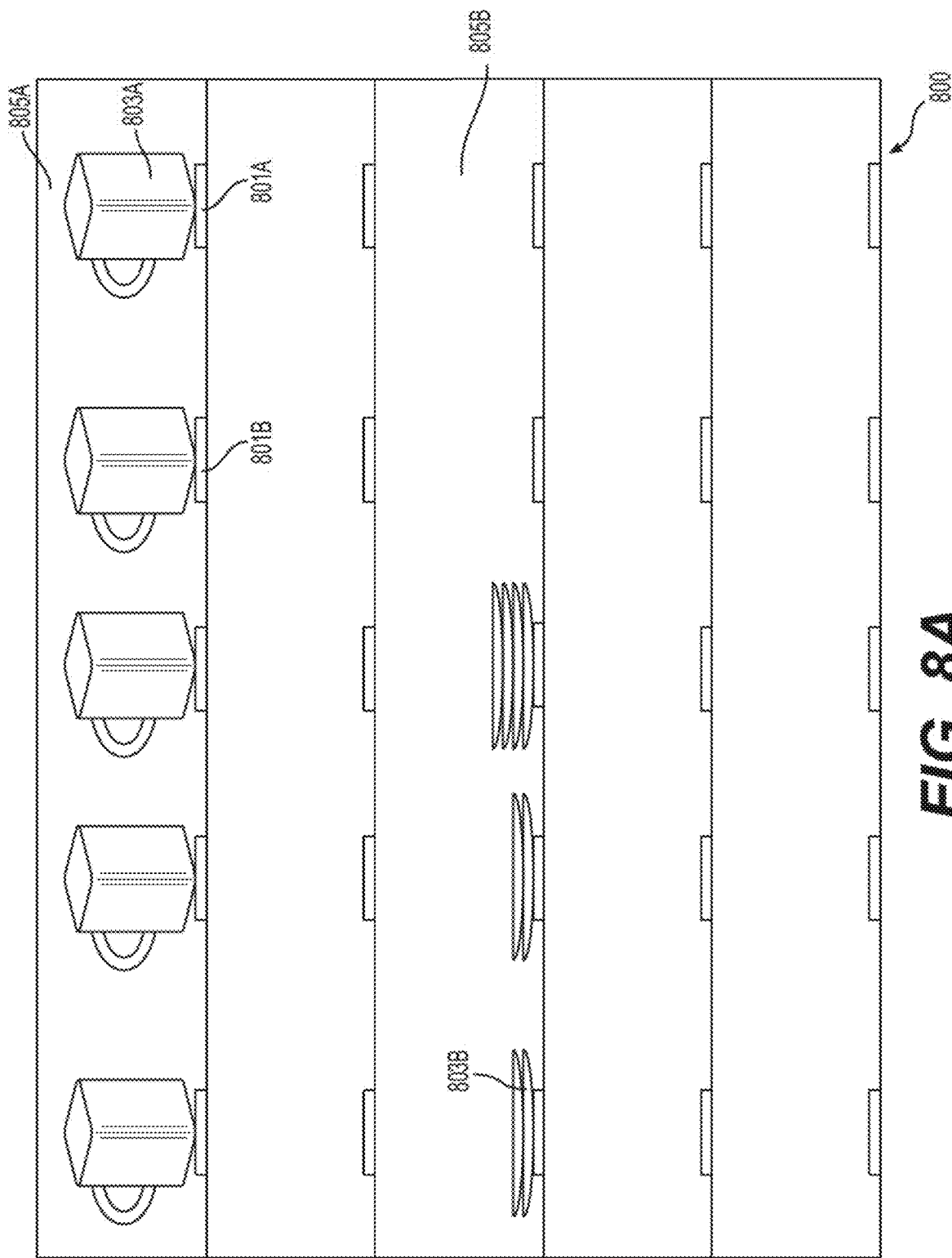
FIG. 8A is a schematic illustration of an example configuration for detecting products and empty spaces on a store shelf, consistent with the present disclosure.

With reference to FIG. 8A and consistent with the present disclosure, a store shelf 800 may include a plurality of detection elements, e.g., detection elements 801A and 801B. In the example of FIG. 8A, detection elements 801A and 801B may comprise pressure sensors and/or other type of sensors for measuring one or more parameters (such as resistance, capacitance, or the like) based on physical contact (or lack thereof) with products, e.g., product 803A and product 803B. Additionally or alternatively, detection elements configured to measure one or more parameters (such as current induction, magnetic induction, visual or other electromagnetic reflectance, visual or other electromagnetic emittance, or the like) may be included to detect products based on physical proximity (or lack thereof) to products. Consistent with the present disclosure, the plurality of detection elements may be configured for location on shelf 800. The plurality of detection elements may be configured to detect placement of products when the products are placed above at least part of the plurality of detection elements. Some embodiments of the disclosure, however, may be performed when at least some of the detection elements may be located next to shelf 800 (e.g., for magnetometers or the like), across from shelf 800 (e.g., for image sensors or other light sensors, light detection and ranging (LIDAR) sensors, radio detection and ranging (RADAR) sensors, or the like), above shelf 800 (e.g., for acoustic sensors or the like), below shelf 800 (e.g., for pressure sensors or the like), or any other appropriate spatial arrangement. Although depicted as standalone units in the example of FIG. 8A, the plurality of detection elements may form part of a fabric (e.g., a smart fabric or the like), and the fabric may be positioned on a shelf to take measurements. For example, two or more detection elements may be integrated together into a single structure (e.g., disposed within a common housing, integrated together within a fabric or mat, and so forth). In some examples, detection elements (such as detection elements 801A and 801B) may be placed adjacent to (or placed on) store shelves as described above. Some examples of detection elements may include pressure sensors and/or light detectors configured to be placed above and/or within and/or under a store shelf as described above.

Detection elements associated with shelf 800 may be associated with different areas of shelf 800. For example, detection elements 801A and 801B are associated with area 805A while other detection elements are associated with area 805B. Although depicted as rows, areas 805A and 805B may comprise any areas of shelf 800, whether contiguous (e.g., a square, a rectangular, or other regular or irregular shape) or not (e.g., a plurality of rectangles or other regular and/or irregular shapes). Such areas may also include horizontal regions between shelves (as shown in FIG. 8A) or may include vertical regions that include area of multiple different shelves (e.g., columnar regions spanning over several different horizontally arranged shelves). In some examples, the areas may be part of a single plane. In some examples, each area may be part of a different plane. In some examples, a single area may be part of a single plane or be divided across multiple planes.

One or more processors (e.g., processing device 202) configured to communicate with the detection elements (e.g., detection elements 801A and 801B) may detect first signals associated with a first area (e.g., areas 805A and/or 805B) and second signals associated with a second area. In some embodiments, the first area may, in part, overlap with the second area. For example, one or more detection elements may be associated with the first area as well as the second area and/or one or more detection elements of a first type may be associated with the first area while one or more detection elements of a second type may be associated with the second area overlapping, at least in part, the first area. In other embodiments, the first area and the second area may be spatially separate from each other.

The one or more processors may, using the first and second signals, determine that one or more products have been placed in the first area while the second area includes at least one empty area. For example, if the detection elements include pressure sensors, the first signals may include weight signals that match profiles of particular products (such as the mugs or plates depicted in the example of FIG. 8A), and the second signals may include weight signals indicative of the absence of products (e.g., by being equal to or within a threshold of a default value such as atmospheric pressure or the like). The disclosed weight signals may be representative of actual weight values associated with a particular product type or, alternatively, may be associated with a relative weight value sufficient to identify the product and/or to identify the presence of a product. In some cases, the weight signal may be suitable for verifying the presence of a product regardless of whether the signal is also sufficient for product identification. In another example, if the detection elements include light detectors (as described above), the first signals may include light signals that match profiles of particular products (such as the mugs or plates depicted in the example of FIG. 8A), and the second signals may include light signals indicative of the absence of products (e.g., by being equal to or within a threshold of a default value such as values corresponding to ambient light or the like). For example, the first light signals may be indicative of ambient light being blocked by particular products, while the second light signals may be indicative of no product blocking the ambient light. The disclosed light signals may be representative of actual light patterns associated with a particular product type or, alternatively, may be associated with light patterns sufficient to identify the product and/or to identify the presence of a product.

The one or more processors may similarly process signals from other types of sensors. For example, if the detection elements include resistive or inductive sensors, the first signals may include resistances, voltages, and/or currents that match profiles of particular products (such as the mugs or plates depicted in the example of FIG. 8A or elements associated with the products, such as tags, etc.), and the second signals may include resistances, voltages, and/or currents indicative of the absence of products (e.g., by being equal to or within a threshold of a default value such as atmospheric resistance, a default voltage, a default current, corresponding to ambient light, or the like). In another example, if the detection elements include acoustics, LIDAR, RADAR, or other reflective sensors, the first signals may include patterns of returning waves (whether sound, visible light, infrared light, radio, or the like) that match profiles of particular products (such as the mugs or plates depicted in the example of FIG. 8A), and the second signals may include patterns of returning waves (whether sound, visible light, infrared light, radio, or the like) indicative of the absence of products (e.g., by being equal to or within a threshold of a pattern associated with an empty shelf or the like).

Any of the profile matching described above may include direct matching of a subject to a threshold. For example, direct matching may include testing one or more measured values against the profile value(s) within a margin of error; mapping a received pattern onto a profile pattern with a residual having a maximum, minimum, integral, or the like within the margin of error; performing an autocorrelation, Fourier transform, convolution, or other operation on received measurements or a received pattern and comparing the resultant values or function against the profile within a margin of error; or the like. Additionally or alternatively, profile matching may include fuzzy matching between measured values and/or patterns and a database of profiles such that a profile with a highest level of confidence according to the fuzzy search. Moreover, as depicted in the example of FIG. 8A, products, such as product 803B, may be stacked and thus associated with a different profile when stacked than when standalone.

Any of the profile matching described above may include use of one or more machine learning techniques. For example, one or more artificial neural networks, random forest models, or other models trained on measurements annotated with product identifiers may process the measurements from the detection elements and identify products therefrom. In such embodiments, the one or more models may use additional or alternative input, such as images of the shelf (e.g., from capturing devices 125 of FIG. 4A-4C explained above) or the like.

Based on detected products and/or empty spaces, determined using the first signals and second signals, the one or more processors may determine one or more aspects of planogram compliance. For example, the one or more processors may identify products and their locations on the shelves, determine quantities of products within particular areas (e.g., identifying stacked or clustered products), identify facing directions associated with the products (e.g., whether a product is outward facing, inward facing, askew, or the like), or the like. Identification of the products may include identifying a product type (e.g., a bottle of soda, a loaf of broad, a notepad, or the like) and/or a product brand (e.g., a Coca-Cola® bottle instead of a Sprite® bottle, a Starbucks® coffee tumbler instead of a Tervis® coffee tumbler, or the like). Product facing direction and/or orientation, for example, may be determined based on a detected orientation of an asymmetric shape of a product base using pressure sensitive pads, detected density of products, etc. For example, the product facing may be determined based on locations of detected product bases relative to certain areas of a shelf (e.g., along a front edge of a shelf), etc. Product facing may also be determined using image sensors, light sensors, or any other sensor suitable for detecting product orientation.

The one or more processors may generate one or more indicators of the one or more aspects of planogram compliance. For example, an indicator may comprise a data packet, a data file, or any other data structure indicating any variations from a planogram, e.g., with respect to product placement such as encoding intended coordinates of a product and actual coordinates on the shelf, with respect to product facing direction and/or orientation such as encoding indicators of locations that have products not facing a correct direction and/or in an undesired orientation, or the like.

In addition to or as an alternative to determining planogram compliance, the one or more processors may detect a change in measurements from one or more detection elements. Such measurement changes may trigger a response. For example, a change of a first type may trigger capture of at least one image of the shelf (e.g., using capturing devices 125 of FIGS. 4A-4C explained above) while a detected change of a second type may cause the at least one processor to forgo such capture. A first type of change may, for example, indicate the moving of a product from one location on the shelf to another location such that planogram compliance may be implicated. In such cases, it may be desired to capture an image of the product rearrangement in order to assess or reassess product planogram compliance. In another example, a first type of change may indicate the removal of a product from the shelf, e.g., by an employee due to damage, by a customer to purchase, or the like. On the other hand, a second type of change may, for example, indicate the removal and replacement of a product to the same (within a margin of error) location on the shelf, e.g., by a customer to inspect the item. In cases where products are removed from a shelf, but then replaced on the shelf (e.g., within a particular time window), the system may forgo a new image capture, especially if the replaced product is detected in a location similar to or the same as its recent, original position.

Figure 8B:
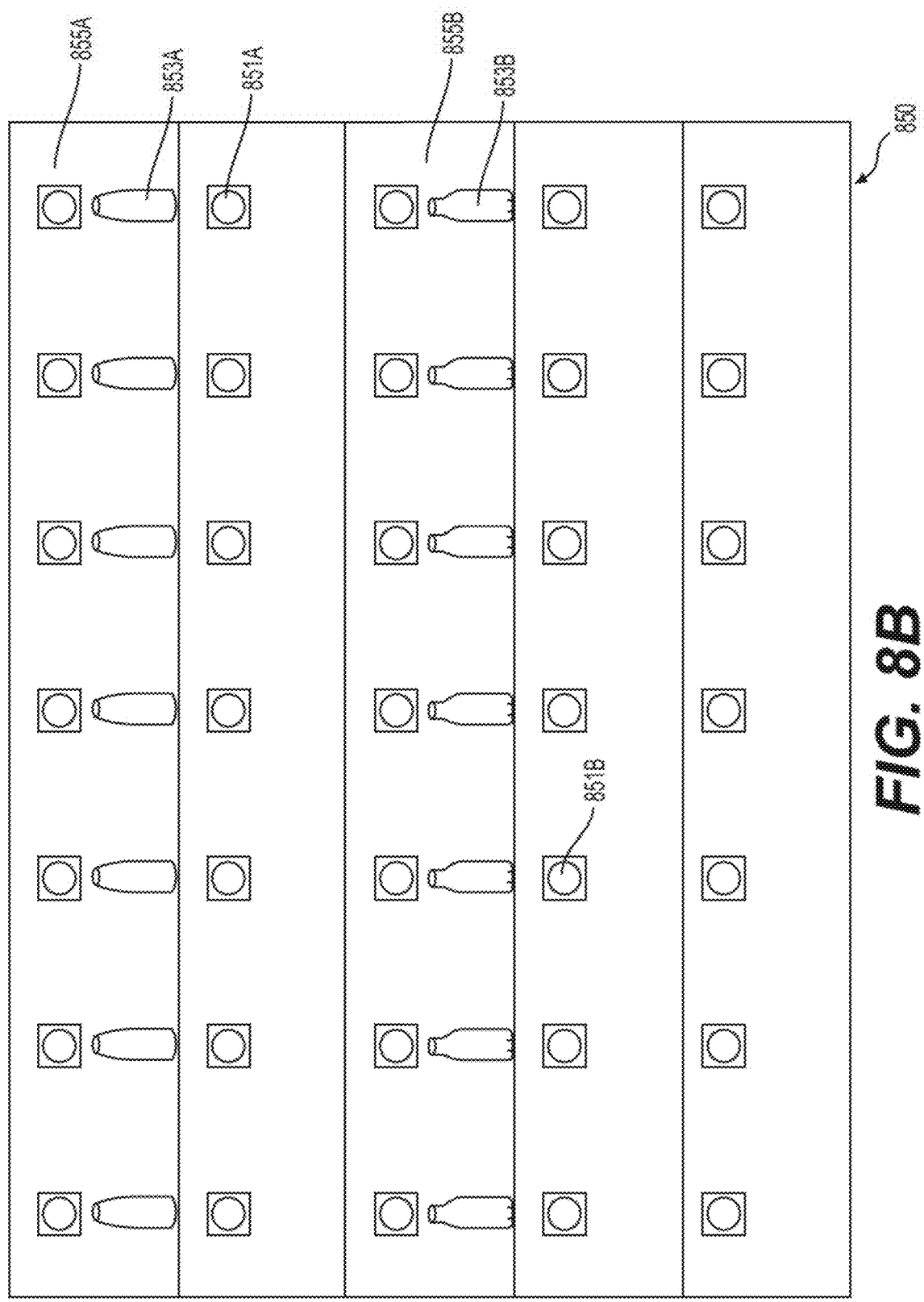
FIG. 8B is a schematic illustration of another example configuration for detecting products and empty spaces on a store shelf, consistent with the present disclosure.

With reference to FIG. 8B and consistent with the present disclosure, a store shelf 850 may include a plurality of detection elements, e.g., detection elements 851A and 851B. In the example of FIG. 8B, detection elements 851A and 851B may comprise light sensors and/or other sensors measuring one or more parameters (such as visual or other electromagnetic reflectance, visual or other electromagnetic emittance, or the like) based on electromagnetic waves from products, e.g., product 853A and product 853B. Additionally or alternatively, as explained above with respect to FIG. 8B, detection elements 851A and 851B may comprise pressure sensors, other sensors measuring one or more parameters (such as resistance, capacitance, or the like) based on physical contact (or lack thereof) with the products, and/or other sensors that measure one or more parameters (such as current induction, magnetic induction, visual or other electromagnetic reflectance, visual or other electromagnetic emittance, or the like) based on physical proximity (or lack thereof) to products.

Moreover, although depicted as located on shelf 850, some detection elements may be located next to shelf 850 (e.g., for magnetometers or the like), across from shelf 850 (e.g., for image sensors or other light sensors, light detection and ranging (LIDAR) sensors, radio detection and ranging (RADAR) sensors, or the like), above shelf 850 (e.g., for acoustic sensors or the like), below shelf 850 (e.g., for pressure sensors, light detectors, or the like), or any other appropriate spatial arrangement. Further, although depicted as standalone in the example of FIG. 8B, the plurality of detection elements may form part of a fabric (e.g., a smart fabric or the like), and the fabric may be positioned on a shelf to take measurements.

Detection elements associated with shelf 850 may be associated with different areas of shelf 850, e.g., area 855A, area 855B, or the like. Although depicted as rows, areas 855A and 855B may comprise any areas of shelf 850, whether contiguous (e.g., a square, a rectangular, or other regular or irregular shape) or not (e.g., a plurality of rectangles or other regular and/or irregular shapes).

One or more processors (e.g., processing device 202) in communication with the detection elements (e.g., detection elements 851A and 851B) may detect first signals associated with a first area and second signals associated with a second area. Any of the processing of the first and second signals described above with respect to FIG. 8A may similarly be performed for the configuration of FIG. 8B.

In both FIGS. 8A and 8B, the detection elements may be integral to the shelf, part of a fabric or other surface configured for positioning on the shelf, or the like. Power and/or data cables may form part of the shelf, the fabric, the surface, or be otherwise connected to the detection elements. Additionally or alternatively, as depicted in FIGS. 8A and 8B, individual sensors may be positioned on the shelf. For example, the power and/or data cables may be positioned under the shelf and connected through the shelf to the detection elements. In another example, power and/or data may be transmitted wirelessly to the detection elements (e.g., to wireless network interface controllers forming part of the detection elements). In yet another example, the detection elements may include internal power sources (such as batteries or fuel cells).

Figure 9:
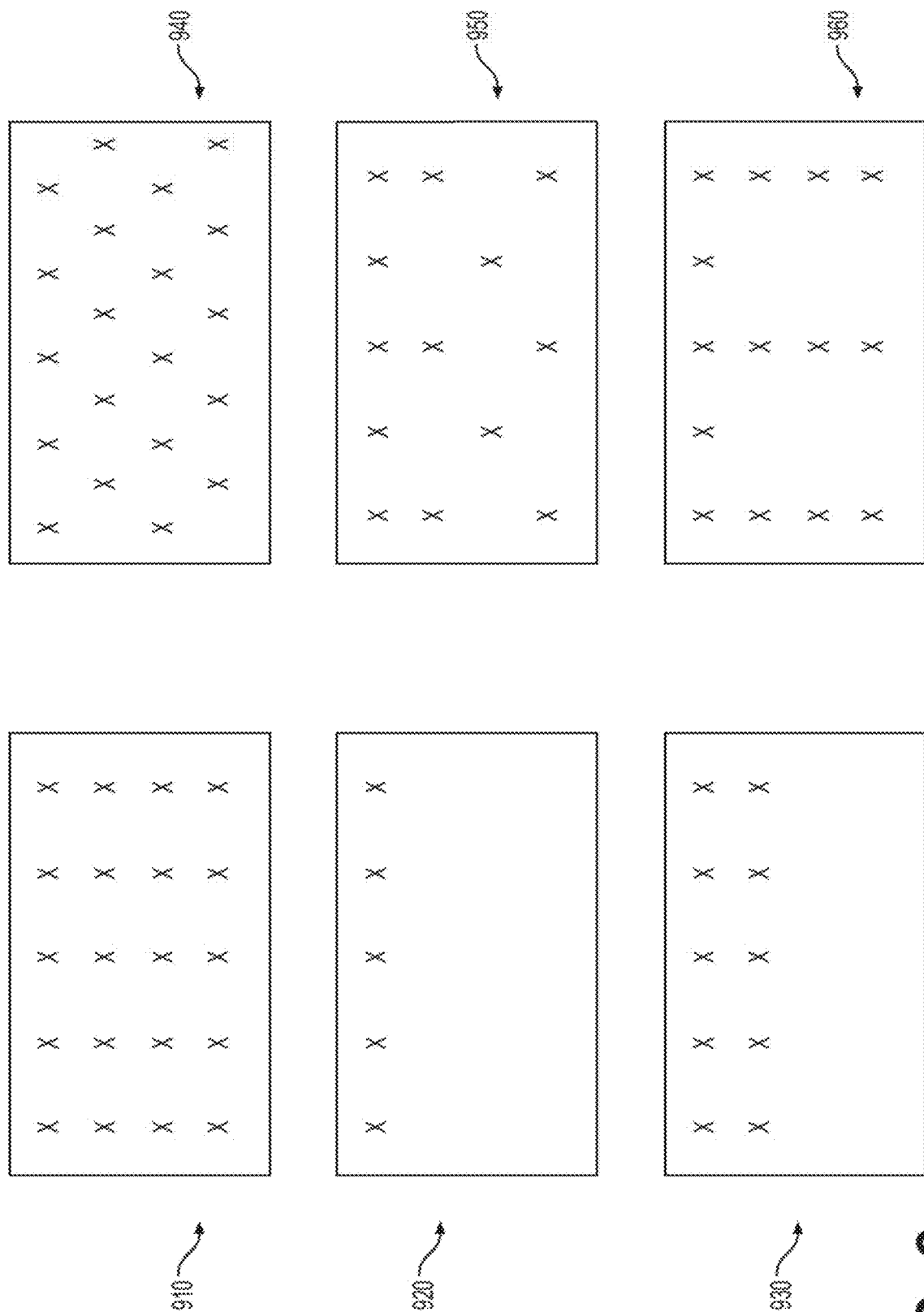
FIG. 9 is a schematic illustration of example configurations for detection elements on store shelves, consistent with the present disclosure.

With reference to FIG. 9 and consistent with the present disclosure, the detection elements described above with reference to FIGS. 8A and 8B may be arranged on rows of the shelf in any appropriate configuration. All of the arrangements of FIG. 9 are shown as a top-down view of a row (e.g., area 805A, area 805B, area 855A, area 855B, or the like) on the shelf. For example, arrangements 910 and 940 are both uniform distributions of detection elements within a row. However, arrangement 910 is also uniform throughout the depth of the row while arrangement 940 is staggered. Both arrangements may provide signals that represent products on the shelf in accordance with spatially uniform measurement locations. As further shown in FIG. 9, arrangements 920, 930, 950, and 960 cluster detection elements near the front (e.g., a facing portion) of the row. Arrangement 920 includes detection elements at a front portion while arrangement 930 includes defection elements in a larger portion of the front of the shelf. Such arrangements may save power and processing cycles by having fewer detection elements on a back portion of the shelf Arrangements 950 and 960 include some detection elements in a back portion of the shelf but these elements are arranged less dense than detection elements in the front. Such arrangements may allow for detections in the back of the shelf (e.g., a need to restock products, a disruption to products in the back by a customer or employee, or the like) while still using less power and fewer processing cycles than arrangements 910 and 940. And, such arrangements may include a higher density of detection elements in regions of the shelf (e.g., a front edge of the shelf) where product turnover rates may be higher than in other regions (e.g., at areas deeper into a shelf), and/or in regions of the shelf where planogram compliance is especially important.

Figure 10A:
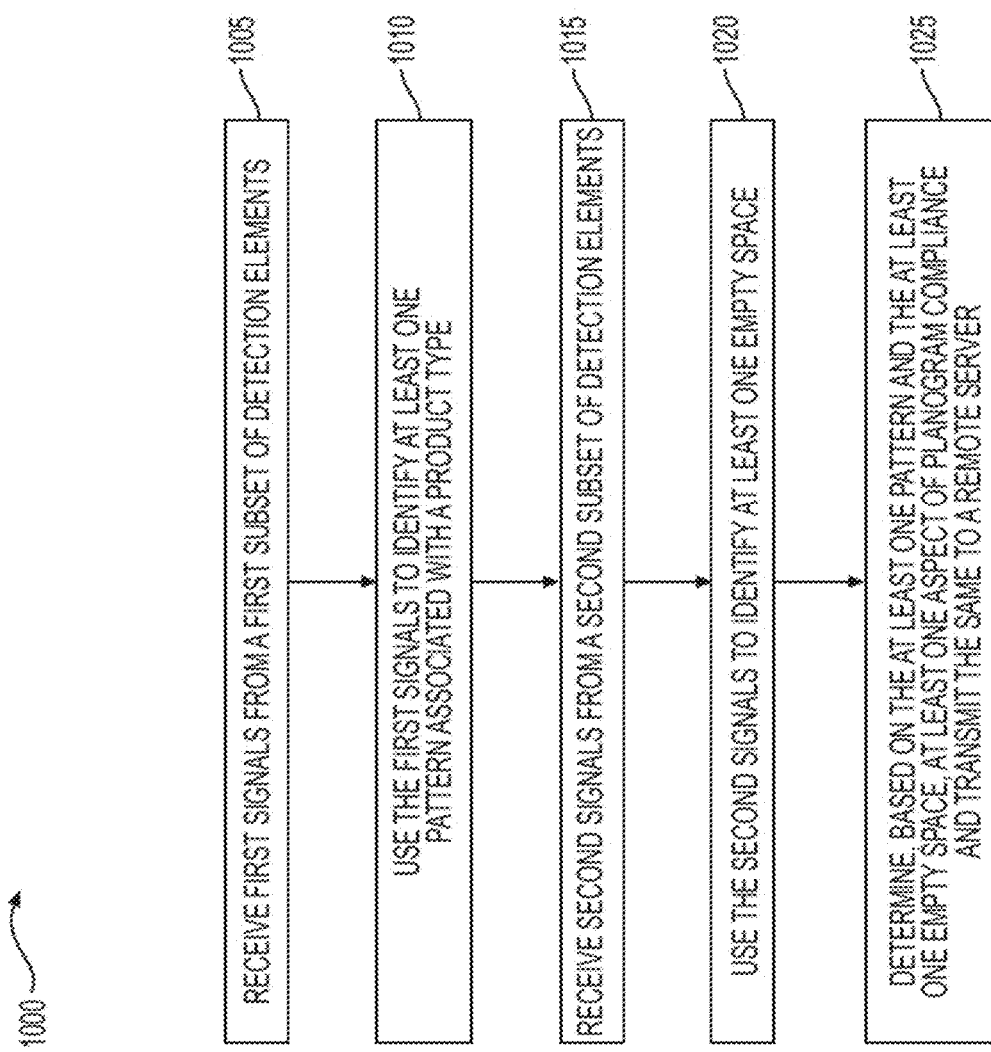
FIG. 10A illustrates an exemplary method for monitoring planogram compliance on a store shelf, consistent with the present disclosure.

FIG. 10A is a flow chart, illustrating an exemplary method 1000 for monitoring planogram compliance on a store shelf, in accordance with the presently disclosed subject matter. It is contemplated that method 1000 may be used with any of the detection element arrays discussed above with reference to, for example, FIGS. 8A, 8B and 9. The order and arrangement of steps in method 1000 is provided for purposes of illustration. As will be appreciated from this disclosure, modifications may be made to process 1000, for example, adding, combining, removing, and/or rearranging one or more steps of process 1000.

Method 1000 may include a step 1005 of receiving first signals from a first subset of detection elements (e.g., detection elements 801A and 801B of FIG. 8A) from among the plurality of detection elements after one or more of a plurality of products (e.g., products 803A and 803B) are placed on at least one area of the store shelf associated with the first subset of detection elements. As explained above with respect to FIGS. 8A and 8B, the plurality of detection elements may be embedded into a fabric configured to be positioned on the store shelf Additionally or alternatively, the plurality of detection elements may be configured to be integrated with the store shelf. For example, an array of pressure sensitive elements (or any other type of detector) may be fabricated as part of the store shelf. In some examples, the plurality of detection elements may be configured to placed adjacent to (or located on) store shelves, as described above.

As described above with respect to arrangements 910 and 940 of FIG. 9, the plurality of detection elements may be substantially uniformly distributed across the store shelf. Alternatively, as described above with respect to arrangements 920, 930, 950, and 960 of FIG. 9, the plurality of detection elements may be distributed relative to the store shelf such that a first area of the store shelf has a higher density of detection elements than a second area of the store shelf. For example, the first area may comprise a front portion of the shelf, and the second area may comprise a back portion of the shelf.

In some embodiments, such as those including pressure sensors or other contact sensors as depicted in the example of FIG. 8A, step 1005 may include receiving the first signals from the first subset of detection elements as the plurality of products are placed above the first subset of detection elements. In some embodiments where the plurality of detection elements includes pressure detectors, the first signals may be indicative of pressure levels detected by pressure detectors corresponding to the first subset of detection elements after one or more of the plurality of products are placed on the at least one area of the store shelf associated with the first subset of detection elements. For example, the first signals may be indicative of pressure levels detected by pressure detectors corresponding to the first subset of detection elements after stocking at least one additional product above a product previously positioned on the shelf, removal of a product from the shelf, or the like. In other embodiments where the plurality of detection elements includes light detectors, the first signals may be indicative of light measurements made with respect to one or more of the plurality of products placed on the at least one area of the store shelf associated with the first subset of detection elements. Specifically, the first signals may be indicative of at least part of the ambient light being blocked from reaching the light detectors by the one or of the plurality of products.

In embodiments including proximity sensors as depicted in the example of FIG. 8B, step 1005 may include receiving the first signals from the first subset of detection elements as the plurality of products are placed below the first subset of detection elements. In embodiments where the plurality of detection elements include proximity detectors, the first signals may be indicative of proximity measurements made with respect to one or more of the plurality of products placed on the at least one area of the store shelf associated with the first subset of detection elements.

Method 1000 may include step 1010 of using the first signals to identify at least one pattern associated with a product type of the plurality of products. For example, any of the pattern matching techniques described above with respect to FIGS. 8A and 8B may be used for identification. A pattern associated with a product type may include a pattern (e.g., a continuous ring, a discontinuous ring of a certain number of points, a certain shape, etc.) associated with a base of a single product. The pattern associated with a product type may also be formed by a group of products. For example, a six pack of soda cans may be associated with a pattern including a 2×3 array of continuous rings associated with the six cans of that product type. Additionally, a grouping of two liter bottles may form a detectable pattern including an array (whether uniform, irregular, or random) of discontinuous rings of pressure points, where the rings have a diameter associated with a particular 2-liter product. Various other types of patterns may also be detected (e.g., patterns associated with different product types arranged adjacent to one another, patterns associated with solid shapes (such as a rectangle of a boxed product), and so forth). In another example, an artificial neural network configured to recognize product types may be used to analyze the signals received by step 1005 (such as signals from pressure sensors, from light detectors, from contact sensors, and so forth) to determine product types associated with products placed on an area of a shelf (such as an area of a shelf associated with the first subset of detection elements). In yet another example, a machine learning algorithm trained using training examples to recognize product types may be used to analyze the signals received by step 1005 (such as signals from pressure sensors, from light detectors, from contact sensors, and so forth) to determine product types associated with products placed on an area of a shelf (such as an area of a shelf associated with the first subset of detection elements).

In some embodiments, step 1010 may further include accessing a memory storing data (e.g., memory device 226 of FIG. 2 and/or memory device 314 of FIG. 3A) associated with patterns of different types of products. In such embodiments, step 1010 may include using the first signals to identify at least one product of a first type using a first pattern (or a first product model) and at least one product of a second type using a second pattern (or a second product model). For example, the first type may include one brand (such as Coca-Cola® or Folgers®) while the second type may include another brand (such as Pepsi® or Maxwell House®). In this example, a size, shape, point spacing, weight, resistance or other property of the first brand may be different from that of the second brand such that the detection elements may differentiate the brands. Such characteristics may also be used to differentiate like-branded, but different products from one another (e.g., a 12-ounce can of Coca Cola, versus a 16 oz bottle of Coca Cola, versus a 2-liter bottle of Coca Cola). For example, a soda may have a base detectable by a pressure sensitive pad as a continuous ring. Further, the can of soda may be associated with a first weight signal having a value recognizable as associated with such a product. A 16 ounce bottle of soda may be associated with a base having four or five pressure points, which a pressure sensitive pad may detect as arranged in a pattern associated with a diameter typical of such a product. The 16 ounce bottle of soda may also be associated with a second weight signal having a value higher than the weight signal associated with the 12 ounce can of soda. Further still, a 2 liter bottle of soda may be associated with a base having a ring, four or five pressure points, etc. that a pressure sensitive pad may detect as arranged in a pattern associated with a diameter typical of such a product. The 2 liter bottle of soda may be associated with a weight signal having a value higher than the weight signal associated with the 12 ounce can of soda and 16 ounce bottle of soda.

In the example of FIG. 8B, the different bottoms of product 853A and product 853B may be used to differentiate the products from each other. For example, detection elements such as pressure sensitive pads may be used to detect a product base shape and size (e.g., ring, pattern of points, asymmetric shape, base dimensions, and so forth). Such a base shape and size may be used (optionally, together with one or more weight signals) to identify a particular product. The signals may also be used to identify and/or distinguish product types from one another. For example, a first type may include one category of product (such as soda cans) while a second type may include a different category of product (such as notepads). In another example, detection elements such as light detectors may be used to detect a product based on a pattern of light readings indicative of a product blocking at least part of the ambient light from reaching the light detectors. Such pattern of light readings may be used to identify product type and/or product category and/or product shape. For example, products of a first type may block a first subset of light frequencies of the ambient light from reaching the light detectors, while products of a second type may block a second subset of light frequencies of the ambient light from reaching the light detectors (the first subset and second subset may differ). In this case the type of the products may be determined based on the light frequencies reaching the light detectors. In another example, products of a first type may have a first shape of shades and therefore may block ambient light from reaching light detectors arranged in one shape, while products of a second type may have a second shape of shades and therefore may block ambient light from reaching light detectors arranged in another shape. In this case the type of the products may be determined based on the shape of blocked ambient light. Any of the pattern matching techniques described above may be used for the identification.

Additionally or alternatively, step 1010 may include using the at least one pattern to determine a number of products placed on the at least one area of the store shelf associated with the first subset of detection elements. For example, any of the pattern matching techniques described above may be used to identify the presence of one or more product types and then to determine the number of products of each product type (e.g., by detecting a number of similarly sized and shaped product bases and optionally by detecting weight signals associated with each detected base). In another example, an artificial neural network configured to determine the number of products of selected product types may be used to analyze the signals received by step 1005 (such as signals from pressure sensors, from light detectors, from contact sensors, and so forth) to determine the number of products of selected product types placed on an area of a shelf (such as an area of a shelf associated with the first subset of detection elements). In yet another example, a machine learning algorithm trained using training examples to determine the number of products of selected product types may be used to analyze the signals received by step 1005 (such as signals from pressure sensors, from light detectors, from contact sensors, and so forth) to determine the number of products of selected product types placed on an area of a shelf (such as an area of a shelf associated with the first subset of detection elements). Additionally or alternatively, step 1010 may include extrapolating from a stored pattern associated with a single product (or type of product) to determine the number of products matching the first signals. In such embodiments, step 1010 may further include determining, for example based on product dimension data stored in a memory, a number of additional products that can be placed on the at least one area of the store shelf associated with the second subset of detection elements. For example, step 1010 may include extrapolating based on stored dimensions of each product and stored dimensions of the shelf area to determine an area and/or volume available for additional products. Step 1010 may further include extrapolation of the number of additional products based on the stored dimensions of each product and determined available area and/or volume.

Method 1000 may include step 1015 of receiving second signals from a second subset of detection elements (e.g., detection elements 851A and 851B of FIG. 8B) from among the plurality of detection elements, the second signals being indicative of no products being placed on at least one area of the store shelf associated with the second subset of detection elements. Using this information, method 1000 may include step 1020 of using the second signals to determine at least one empty space on the store shelf. For example, any of the pattern matching techniques described above may be used to determine that the second signals include default values or other values indicative of a lack of product in certain areas associated with a retail store shelf. A default value may be include, for example, a pressure signal associated with an un-loaded pressure sensor or pressure sensitive mat, indicating that no product is located in a certain region of a shelf In another example, a default value may include signals from light detectors corresponding to ambient light, indicating that no product is located in a certain region of a shelf.

Method 1000 may include step 1025 of determining, based on the at least one pattern associated with a detected product and the at least one empty space, at least one aspect of planogram compliance. As explained above with respect to FIGS. 8A and 8B, the aspect of planogram compliance may include the presence or absence of particular products (or brands), locations of products on the shelves, quantities of products within particular areas (e.g., identifying stacked or clustered products), facing directions associated with the products (e.g., whether a product is outward facing, inward facing, askew, or the like), or the like. A planogram compliance determination may be made, for example, by determining a number of empty spaces on a shelf and determining a location of the empty spaces on a shelf. The planogram determination may also include determining weight signal magnitudes associated with detected products at the various detected non-empty locations. This information may be used by the one or more processors in determining whether a product facing specification has been satisfied (e.g., whether a front edge of a shelf has a suitable number of products or suitable density of products), whether a specified stacking density has been achieved (e.g., by determining a pattern of detected products and weight signals of the detected products to determine how many products are stacked at each location), whether a product density specification has been achieved (e.g., by determining a ratio of empty locations to product-present locations), whether products of a selected product type are located in a selected area of the shelf, whether all products located in a selected area of the shelf are of a selected product type, whether a selected number of products (or a selected number of products of a selected product type) are located in a selected area of the shelf, whether products located in a selected area of a shelf are positioned in a selected orientation, or whether any other aspect of one or more planograms has been achieved.

For example, the at least one aspect may include product homogeneity, and step 1025 may further include counting occurrences where a product of the second type is placed on an area of the store shelf associated with the first type of product. For example, by accessing a memory including base patterns (or any other type of pattern associated with product types, such as product models), the at least one processor may detect different products and product types. A product of a first type may be recognized based on a first pattern, and product of a second type may be recognized based on a second, different pattern (optionally also based on weight signal information to aid in differentiating between products). Such information may be used, for example, to monitor whether a certain region of a shelf includes an appropriate or intended product or product type. Such information may also be useful in determining whether products or product types have been mixed (e.g., product homogeneity). Regarding planogram compliance, detection of different products and their relative locations on a shelf may aid in determining whether a product homogeneity value, ratio, etc. has been achieved. For example, the at least one processor may count occurrences where a product of a second type is placed on an area of the store shelf associated with a product of a first type.

Additionally or alternatively, the at least one aspect of planogram compliance may include a restocking rate, and step 1025 may further include determining the restocking rate based on a sensed rate at which products are added to the at least one area of the store shelf associated with the second subset of detection elements. Restocking rate may be determined, for example, by monitoring a rate at which detection element signals change as products are added to a shelf (e.g., when areas of a pressure sensitive pad change from a default value to a product-present value).

Additionally or alternatively, the at least one aspect of planogram compliance may include product facing, and step 1025 may further include determining the product facing based on a number of products determined to be placed on a selected area of the store shelf at a front of the store shelf. Such product facing may be determined by determining a number of products along a certain length of a front edge of a store shelf and determining whether the number of products complies with, for example, a specified density of products, a specified number of products, and so forth.

Step 1025 may further include transmitting an indicator of the at least one aspect of planogram compliance to a remote server. For example, as explained above with respect to FIGS. 8A and 8B, the indicator may comprise a data packet, a data file, or any other data structure indicating any variations from a planogram, e.g., with respect to product (or brand) placement, product facing direction, or the like. The remote server may include one or more computers associated with a retail store (e.g., so planogram compliance may be determined on a local basis within a particular store), one or more computers associated with a retail store evaluation body (e.g., so planogram compliance may be determined across a plurality of retail stores), one or more computers associated with a product manufacturer, one or more computers associated with a supplier (such as supplier 115), one or more computers associated with a market research entity (such as market research entity 110), etc.

Method 1000 may further include additional steps. For example, method 1000 may include identifying a change in at least one characteristic associated with one or more of the first signals (e.g., signals from a first group or type of detection elements), and in response to the identified change, triggering an acquisition of at least one image of the store shelf. The acquisition may be implemented by activating one or more of capturing devices 125 of FIGS. 4A-4C, as explained above. For example, the change in at least one characteristic associated with one or more of the first signals may be indicative of removal of at least one product from a location associated with the at least one area of the store shelf associated with the first subset of detection elements.

Accordingly, method 1000 may include triggering the acquisition to determine whether restocking, reorganizing, or other intervention is required, e.g., to improve planogram compliance. Thus, method 1000 may include identifying a change in at least one characteristic associated with one or more of the first signals; and in response to the identified change, trigger a product-related task for an employee of the retail store.

Additionally or alternatively, method 1000 may be combined with method 1050 of FIG. 10B, described below, such that step 1055 is performed any time after step 1005.

FIG. 10B is a flow chart, illustrating an exemplary method 1050 for triggering image capture of a store shelf, in accordance with the presently disclosed subject matter. It is contemplated that method 1050 may be used in conjunction with any of the detection element arrays discussed above with reference to, for example, FIGS. 8A, 8B and 9. The order and arrangement of steps in method 1050 is provided for purposes of illustration. As will be appreciated from this disclosure, modifications may be made to process 1050, for example, adding, combining, removing, and/or rearranging one or more steps of process 1050.

Method 1050 may include a step 1055 of determining a change in at least one characteristic associated with one or more first signals. For example, the first signals may have been captured as part of method 1000 of FIG. 10A, described above. For example, the first signals may include pressure readings when the plurality of detection elements includes pressure sensors, contact information when the plurality of detection elements includes contact sensors, light readings when the plurality of detection elements includes light detectors (for example, from light detectors configured to be placed adjacent to (or located on) a surface of a store shelf configured to hold products, as described above), and so forth.

Method 1050 may include step 1060 of using the first signals to identify at least one pattern associated with a product type of the plurality of products. For example, any of the pattern matching techniques described above with respect to FIGS. 8A, 8B, and step 1010 may be used for identification.

Method 1050 may include step 1065 of determining a type of event associated with the change. For example, a type of event may include a product removal, a product placement, movement of a product, or the like.

Method 1050 may include step 1070 of triggering an acquisition of at least one image of the store shelf when the change is associated with a first event type. For example, a first event type may include removal of a product, moving of a product, or the like, such that the first event type may trigger a product-related task for an employee of the retail store depending on analysis of the at least one image. The acquisition may be implemented by activating one or more of capturing devices 125 of FIGS. 4A-4C, as explained above. In some examples, the triggered acquisition may include an activation of at least one projector (such as projector 632). In some examples, the triggered acquisition may include acquisition of color images, depth images, stereo images, active stereo images, time of flight images, LIDAR images, RADAR images, and so forth.

Method 1050 may include a step (not shown) of forgoing the acquisition of at least one image of the store shelf when the change is associated with a second event type. For example, a second event type may include replacement of a removed product by a customer, stocking of a shelf by an employee, or the like. As another example, a second event type may include removal, placement, or movement of a product that is detected within a margin of error of the detection elements and/or detected within a threshold (e.g., removal of only one or two products; movement of a product by less than 5 cm, 20 cm, or the like; moving of a facing direction by less than 10 degrees; or the like), such that no image acquisition is required.

Figure 11A:
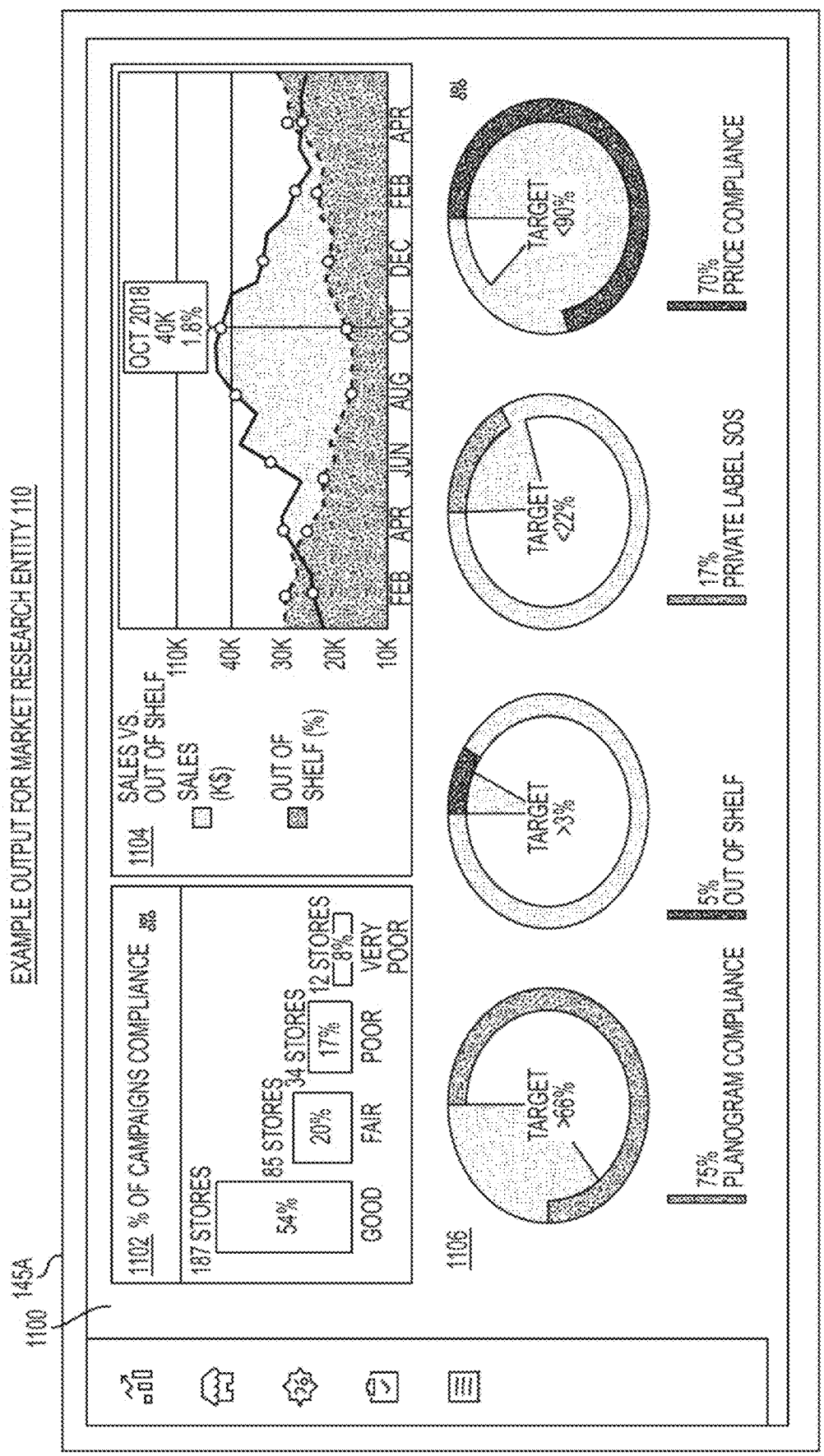
FIG. 11A is a schematic illustration of an example output for a market research entity associated with the retail store, consistent with the present disclosure.
Figure 11B:
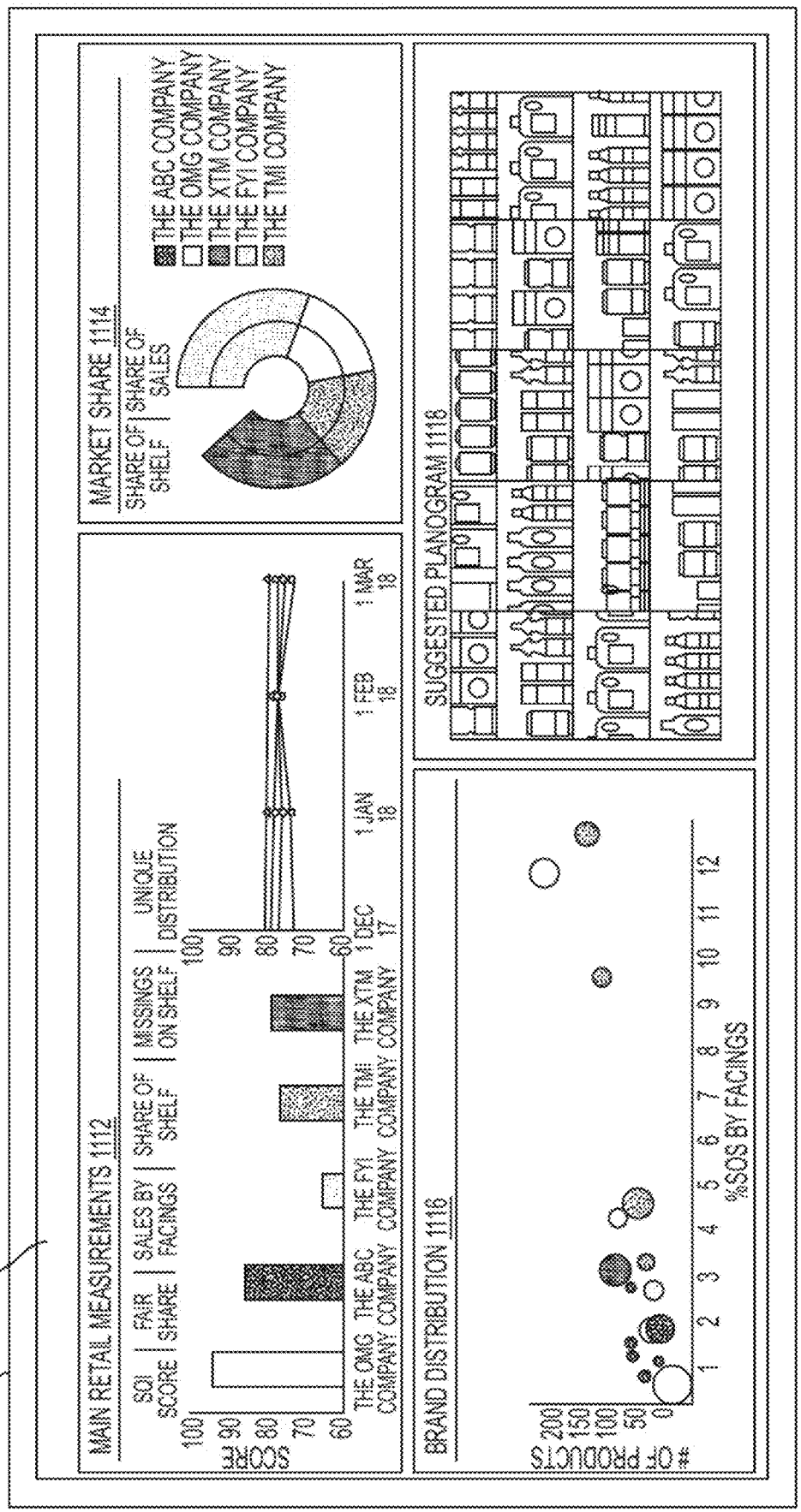
FIG. 11B is a schematic illustration of an example output for a supplier of the retail store, consistent with the present disclosure.
Figure 11C:
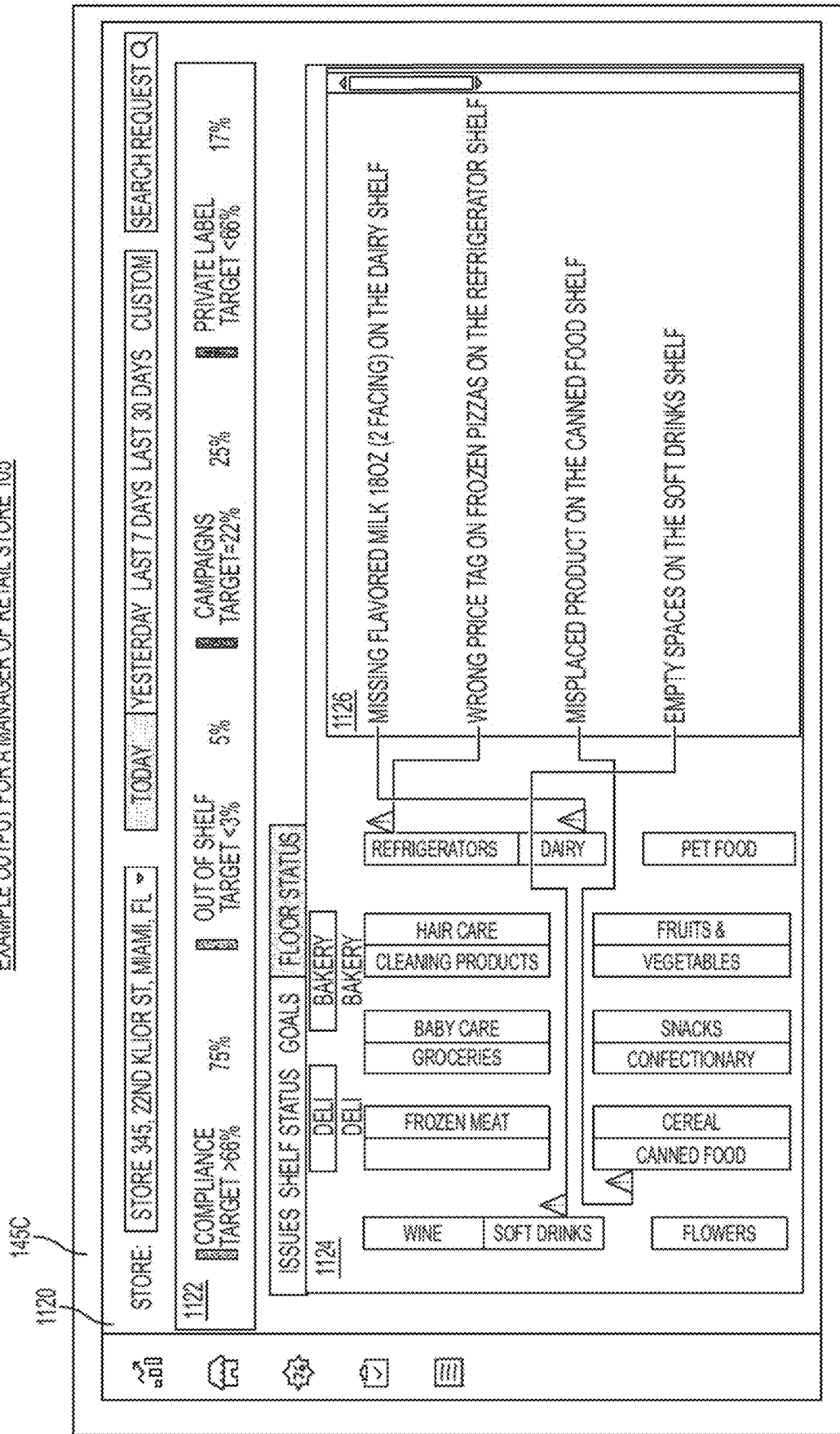
FIG. 11C is a schematic illustration of an example output for a manager of the retail store, consistent with the present disclosure.
Figure 11E:
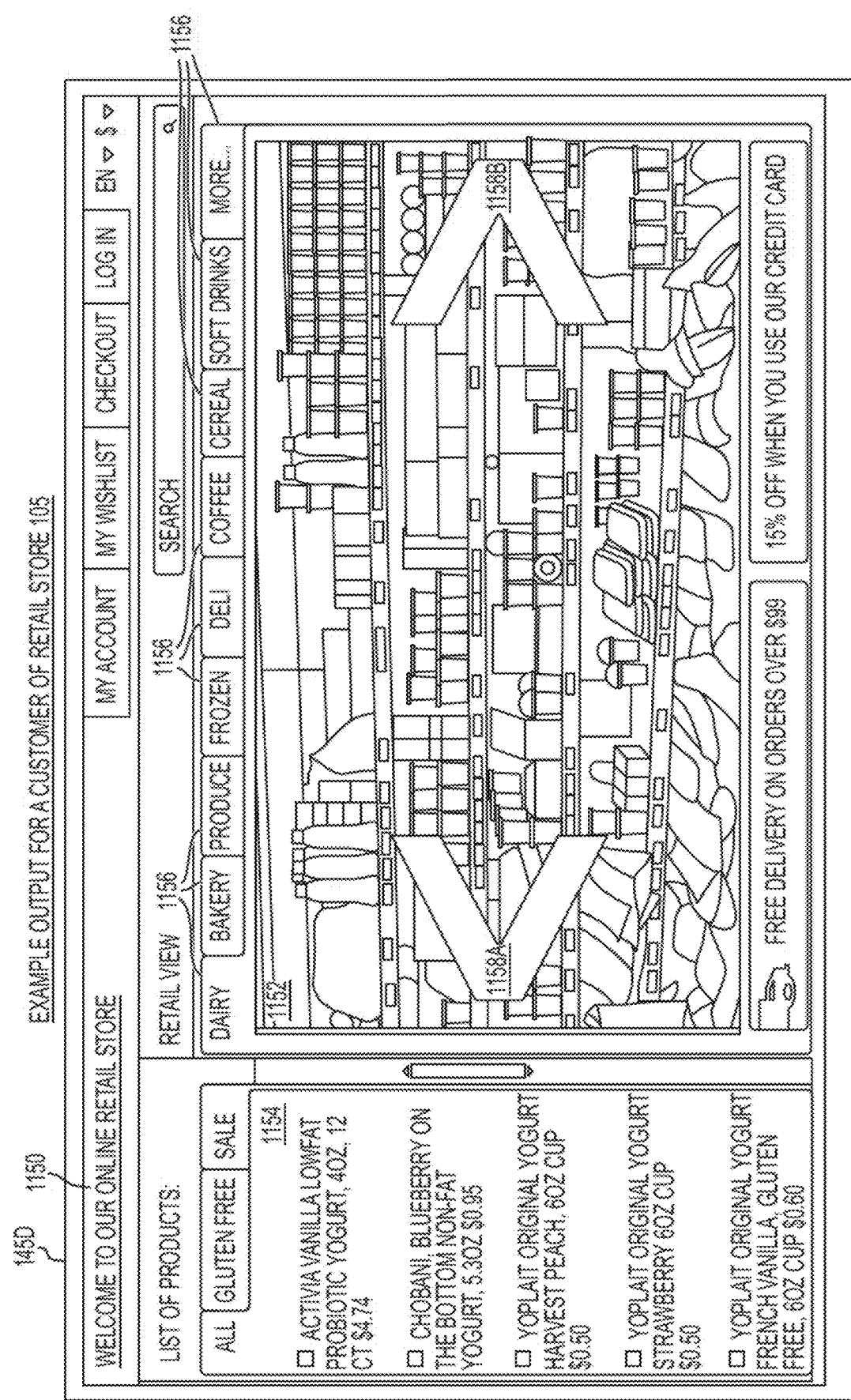
FIG. 11E is a schematic illustration of an example output for an online customer of the retail store, consistent with the present disclosure.

FIGS. 11A-11E illustrate example outputs based on data automatically derived from machine processing and analysis of images captured in retail store 105 according to disclosed embodiments. FIG. 11A illustrates an optional output for market research entity 110. FIG. 11B illustrates an optional output for supplier 115. FIGS. 11C and 11D illustrate optional outputs for employees of retail store 105. And FIG. 11E illustrates optional outputs for user 120.

FIG. 11A illustrates an example graphical user interface (GUI) 500 for output device 145A, representative of a GUI that may be used by market research entity 110. Consistent with the present disclosure, market research entity 110 may assist supplier 115 and other stakeholders in identifying emerging trends, launching new products, and/or developing merchandising and distribution plans across a large number of retail stores 105. By doing so, market research entity 110 may assist supplier 115 in growing product presence and maximizing or increasing new product sales. As mentioned above, market research entity 110 may be separated from or part of supplier 115. To successfully launch a new product, supplier 115 may use information about what really happens in retail store 105. For example, supplier 115 may want to monitor how marketing plans are being executed and to learn what other competitors are doing relative to certain products or product types. Embodiments of the present disclosure may allow market research entity 110 and suppliers 115 to continuously monitor product-related activities at retail stores 105 (e.g., using system 100 to generate various metrics or information based on automated analysis of actual, timely images acquired from the retail stores). For example, in some embodiments, market research entity 110 may track how quickly or at what rate new products are introduced to retail store shelves, identify new products introduced by various entities, assess a supplier's brand presence across different retail stores 105, among many other potential metrics.

In some embodiments, server 135 may provide market research entity 110 with information including shelf organization, analysis of skew productivity trends, and various reports aggregating information on products appearing across large numbers of retail stores 105. For example, as shown in FIG. 11A, GUI 1100 may include a first display area 1102 for showing a percentage of promotion campaign compliance in different retail stores 105. GUI 1100 may also include a second display area 1104 showing a graph illustrating sales of a certain product relative to the percentage of out of shelf. GUI 1100 may also include a third display area 1106 showing actual measurements of different factors relative to target goals (e.g., planogram compliance, restocking rate, price compliance, and other metrics). The provided information may enable market research entity 110 to give supplier 115 informed shelving recommendations and fine-tune promotional strategies according to in-store marketing trends, to provide store managers with a comparison of store performances in comparison to a group of retail stores 105 or industry wide performances, and so forth.

FIG. 11B illustrates an example GUI 1110 for output device 145B used by supplier 115. Consistent with the present disclosure, server 135 may use data derived from images captured in a plurality of retail stores 105 to recommend a planogram, which often determines sales success of different products. Using various analytics and planogram productivity measures, server 135 may help supplier 115 to determine an effective planogram with assurances that most if not all retail stores 105 can execute the plan. For example, the determined planogram may increase the probability that inventory is available for each retail store 105 and may be designed to decrease costs or to keep costs within a budget (such as inventory costs, restocking costs, shelf space costs, and so forth). Server 135 may also provide pricing recommendations based on the goals of supplier 115 and other factors. In other words, server 135 may help supplier 115 understand how much room to reserve for different products and how to make them available for favorable sales and profit impact (for example, by choosing the size of the shelf dedicated to a selected product, the location of the shelf, the height of the shelf, the neighboring products, and so forth). In addition, server 135 may monitor near real-time data from retail stores 105 to determine or confirm that retail stores 105 are compliant with the determined planogram of supplier 115. As used herein, the term "near real-time data," in the context of this disclosure, refers to data acquired or generated, etc., based on sensor readings and other inputs (such as data from image sensors, audio sensors, pressure sensors, checkout stations, etc.) from retail store 105 received by system 100 within a predefined period of time (such as time periods having durations of less than a second, less than a minute, less than an hour, less than a day, less than a week, and so forth).

In some embodiments, server 135 may generate reports that summarize performance of the current assortment and the planogram compliance. These reports may advise supplier 115 of the category and the item performance based on individual SKU, sub segments of the category, vendor, and region. In addition, server 135 may provide suggestions or information upon which decisions may be made regarding how or when to remove markdowns and when to replace underperforming products. For example, as shown in FIG. 11B, GUI 1110 may include a first display area 1112 for showing different scores of supplier 115 relative to scores associated with its competitors. GUI 1110 may also include a second display area 1114 showing the market share of each competitor. GUI 1110 may also include a third display area 1116 showing retail measurements and distribution of brands. GUI 1110 may also include a fourth display area 1118 showing a suggested planogram. The provided information may help supplier 115 to select preferred planograms based on projected or observed profitability, etc., and to ensure that retail stores 105 are following the determined planogram.

FIGS. 11C and 11D illustrate example GUIs for output devices 145C, which may be used by employees of retail store 105. FIG. 11C depicts a GUI 1120 for a manager of retail store 105 designed for a desktop computer, and FIG. 11D depicts GUI 1130 and 1140 for store staff designed for a handheld device. In-store execution is one of the challenges retail stores 105 have in creating a positive customer experience. Typical in-store execution may involve dealing with ongoing service events, such as a cleaning event, a restocking event, a rearrangement event, and more. In some embodiments, system 100 may improve in-store execution by providing adequate visibility to ensure that the right products are located at preferred locations on the shelf. For example, using near real-time data (e.g., captured images of store shelves) server 135 may generate customized online reports. Store managers and regional managers, as well as other stakeholders, may access custom dashboards and online reports to see how in-store conditions (such as, planogram compliance, promotion compliance, price compliance, etc.) are affecting sales. This way, system 100 may enable managers of retail stores 105 to stay on top of burning issues across the floor and assign employees to address issues that may negatively impact the customer experience.

In some embodiments, server 135 may cause real-time automated alerts when products are out of shelf (or near out of shelf), when pricing is inaccurate, when intended promotions are absent, and/or when there are issues with planogram compliance, among others. In the example shown in FIG. 11C, GUI 1120 may include a first display area 1122 for showing the average scores (for certain metrics) of a specific retail store 105 over a selected period of time. GUI 1120 may also include a second display area 1124 for showing a map of the specific retail store 105 with real-time indications of selected in-store execution events that require attention, and a third display area 1126 for showing a list of the selected in-store execution events that require attention. In another example, shown in FIG. 11D, GUI 1130 may include a first display area 1132 for showing a list of notifications or text messages indicating selected in-store execution events that require attention. The notifications or text messages may include a link to an image (or the image itself) of the specific aisle with the in-store execution event. In another example, shown in FIG. 11D, GUI 1140 may include a first display area 1142 for showing a display of a video stream captured by output device 145C (e.g., a real-time display or a near real-time display) with augmented markings indicting a status of planogram compliance for each product (e.g., correct place, misplaced, not in planogram, empty, and so forth). GUI 1140 may also include a second display area 1144 for showing a summary of the planogram compliance for all the products identified in the video stream captured by output device 145C. Consistent with the present disclosure, server 135 may generate within minutes actionable tasks to improve store execution. These tasks may help employees of retail store 105 to quickly address situations that can negatively impact revenue and customer experience in the retail store 105.

FIG. 11E illustrates an example GUI 1150 for output device 145D used by an online customer of retail store 105. Traditional online shopping systems present online customers with a list of products. Products selected for purchase may be placed into a virtual shopping cart until the customers complete their virtual shopping trip. Virtual shopping carts may be examined at any time, and their contents can be edited or deleted. However, common problems of traditional online shopping systems arise when the list of products on the website does not correspond with the actual products on the shelf. For example, an online customer may order a favorite cookie brand without knowing that the cookie brand is out-of-stock. Consistent with some embodiments, system 100 may use image data acquired by capturing devices 125 to provide the online customer with a near real-time display of the retail store and a list of the actual products on the shelf based on near real-time data. In one embodiment, server 135 may select images without occlusions in the field of view (e.g., without other customers, carts, etc.) for the near real-time display. In one embodiment, server 135 may blur or erase depictions of customers and other people from the near real-time display. As used herein, the term "near real-time display," in the context of this disclosure, refers to image data captured in retail store 105 that was obtained by system 100 within a predefined period of time (such as less than a second, less than a minute, less than about 30 minutes, less than an hour, less than 3 hours, or less than 12 hours) from the time the image data was captured.

Consistent with the present disclosure, the near real-time display of retail store 105 may be presented to the online customer in a manner enabling easy virtual navigation in retail store 105. For example, as shown in FIG. 11E, GUI 1150 may include a first display area 1152 for showing the near real-time display and a second display area 1154 for showing a product list including products identified in the near real-time display. In some embodiments, first display area 1152 may include different GUI features (e.g., tabs 1156) associated with different locations or departments of retail store 105. By selecting each of the GUI features, the online customer can virtually jump to different locations or departments in retail store 105. For example, upon selecting the "bakery" tab, GUI 1150 may present a near real-time display of the bakery of retail store 105. In addition, first display area 1152 may include one or more navigational features (e.g., arrows 1158A and 1158B) for enabling the online customer to virtually move within a selected department and/or virtually walk through retail store 105. Server 135 may be configured to update the near real-time display and the product list upon determining that the online customer wants to virtually move within retail store 105. For example, after identifying a selection of arrow 1158B, server 135 may present a different section of the dairy department and may update the product list accordingly. In another example, server 135 may update the near-real time display and the product list in response to new captured images and new information received from retail store 105. Using GUI 1150, the online customer may have the closest shopping experience without actually being in retail store 105. For example, an online customer can visit the vegetable department and decide not to buy tomatoes after seeing that they are not ripe enough.

In some retail stores, selecting which information to present, as well as where and how to present it, may increase productivity, among other potential benefits. Consist with the present disclosure, such selection may be based on actual current and past inventory and condition of products in selected parts of a retail store (such as aisle, shelf, retail storage container, and so forth).

Figure 12:
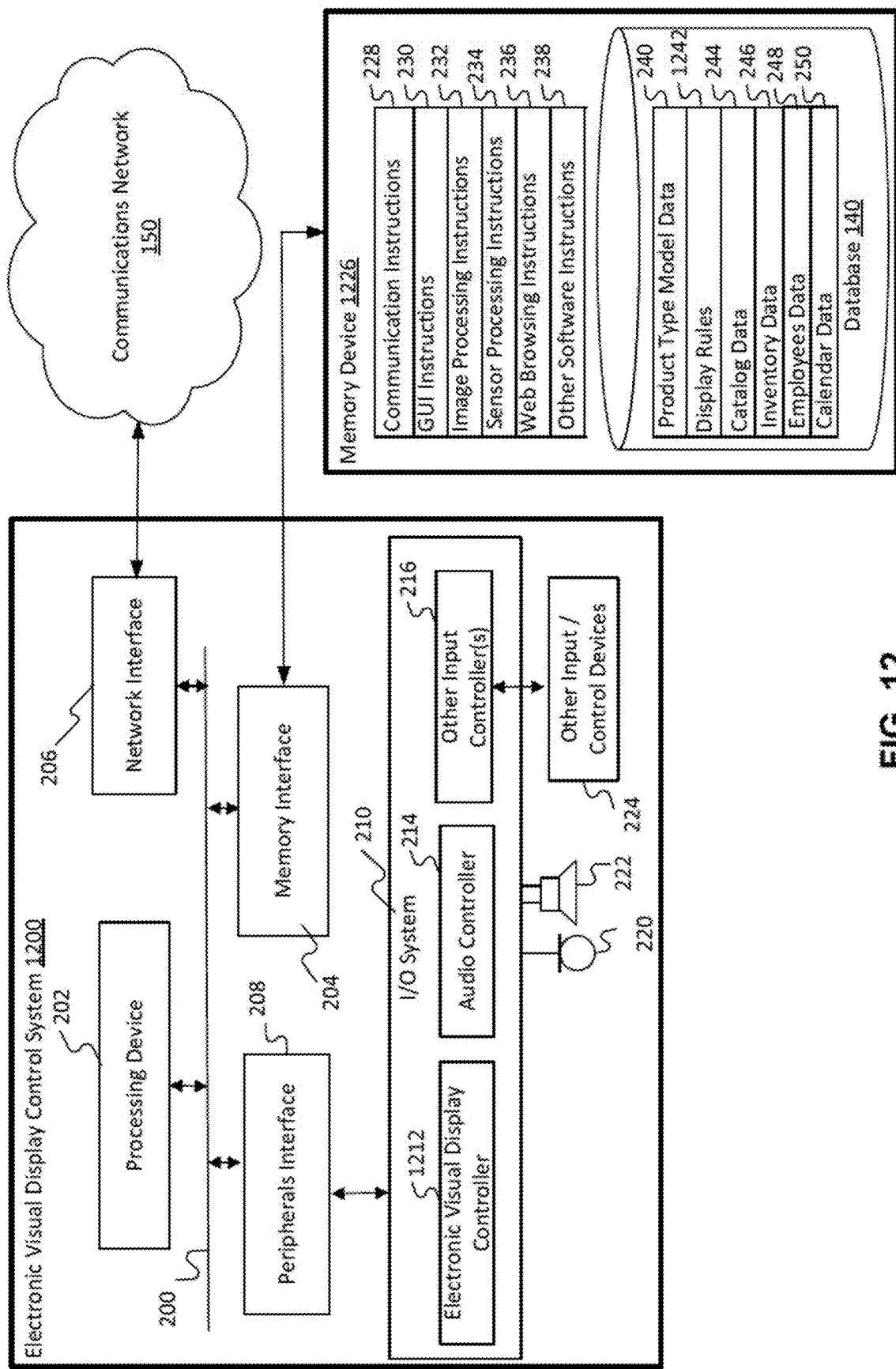
FIG. 12 is a block diagram that illustrates some of the components of an electronic visual display control system, consistent with the present disclosure.

FIG. 12 is a block diagram representative of an example configuration of electronic visual display control system 1200. In one embodiment, electronic visual display control system 1200 may include a bus 200 (or any other communication mechanism) that interconnects subsystems and components for transferring information within electronic visual display control system 1200. For example, bus 200 may interconnect a processing device 202, a memory interface 204, a network interface 206, and a peripherals interface 208 connected to an I/O system 210.

In one implementation of electronic visual display control system 1200, I/O system 210 may include an electronic visual display controller 1212, an audio controller 214, and/or other input controller(s) 216. Electronic visual display controller 1212 may be coupled to one or more electronic visual displays (such as touch screen 218, electronic visual display 1306, electronic visual display 1322, electronic visual display 1324, electronic visual display 1342, and so forth). In one example, electronic visual display controller 1212 may include touch screen controller 212.

In one implementation of electronic visual display control system 1200, processing device 202 may use memory interface 204 to access data and a software product stored on a memory device 1226. Memory device 1226 may include operating system programs for electronic visual display control system 1200 that perform operating system functions when executed by the processing device.

Memory device 1226 may also store communication instructions 228, graphical user interface instructions 230, image processing instructions 232, sensor processing instructions 234, web browsing instructions 236, and other software instructions 238 to facilitate other processes and functions. Memory device 1226 may also store product type model data 240, catalog data 244, inventory data 246, employee data 248, and calendar data 250.

In one embodiment, memory device 1226 may also store display rules 1242 that may be used to determine which information to present, as well as where and how to present it, for example based on actual current and past inventory and condition of products in selected parts of a retail store (such as aisle, shelf, retail storage container, and so forth).

The components and arrangements shown in FIG. 12 are not intended to limit the disclosed embodiments. As will be appreciated by a person skilled in the art having the benefit of this disclosure, numerous variations and/or modifications may be made to the depicted configuration of electronic visual display control system 1200 and to the content of memory device 1226. For example, components may be removed, modified and/or added to electronic visual display control system 1200 and/or to memory device 1200. In another example, components of electronic visual display control system 1200 may be distributed across different systems. In yet another example, each component of electronic visual display control system 1200, including memory device 1226 may be distributed across different systems. For example, not all components may be essential for the operation of electronic visual display control system 1200 in all cases. Any component may be located in any appropriate part of electronic visual display control system 1200, and the components may be rearranged into a variety of configurations while providing the functionality of the disclosed embodiments.

FIG. 13A is a schematic cross-sectional side view illustration of an exemplary door 1300 for a retail storage container, consistent with the present disclosure. In this example, door 1300 may comprise an outer surface 1304, a connector 1302 to an electronic visual display controller, and an electronic visual display 1306. The components and arrangements shown in FIG. 13A are not intended to limit the disclosed embodiments. As will be appreciated by a person skilled in the art having the benefit of this disclosure, numerous variations and/or modifications may be made to the depicted configuration of door 1300. For example, connector 1302 may further include or be replaced by an electronic visual display control system (such as electronic visual display control system 1200). In another example, door 1300 may further include a power source and/or a connector to an external power source.

FIG. 13B is a schematic cross-sectional side view illustration of an exemplary door 1320 for a retail storage container, consistent with the present disclosure. In this example, door 1320 may comprise an outer surface 1304, a connector 1302 to an electronic visual display controller, an electronic visual display 1322, an electronic visual display 1324, and thermal insulation 1326. The components and arrangements shown in FIG. 13B are not intended to limit the disclosed embodiments. As will be appreciated by a person skilled in the art having the benefit of this disclosure, numerous variations and/or modifications may be made to the depicted configuration of door 1320. For example, connector 1302 may further include or be replaced by an electronic visual display control system (such as electronic visual display control system 1200). In another example, door 1320 may further include a power source and/or a connector to an external power source. In yet another example, at least one of electronic visual display 1322, electronic visual display 1324 and insulation 1326 may be removed from door 1320.

In some examples, side 1310 of doors 1300 and 1320 may be configured to face the internal side of the retail storage container when the door is closed. In some examples, side 1312 of doors 1300 and 1320 may be configured to face customers when the door is closed (i.e., to face outwards from the retail storage container when the door is closed).

FIG. 13C is a schematic cross-sectional view illustration of an exemplary door 1340 for a retail storage container, consistent with the present disclosure. In this example, door 1340 may comprise an outer surface 1304, a connector 1302 to an electronic visual display controller, and an electronic visual display 1342. The components and arrangements shown in FIG. 13B are not intended to limit the disclosed embodiments. As will be appreciated by a person skilled in the art having the benefit of this disclosure, numerous variations and/or modifications may be made to the depicted configuration of door 1340. For example, connector 1302 may further include or be replaced by an electronic visual display control system (such as electronic visual display control system 1200). In another example, door 1340 may further include a power source and/or a connector to an external power source.

In one example, any one of doors 1300, 1320 and 1340 may be a sliding door, may be a hinged door, and so forth. In one example, parts of outer surface 1304 may be opaque, may be transparent, may be partly transparent, may be covered by a mirror, may comprise an electronic visual display, and so forth. For example, in door 1300, outer surface 1304 may include transparent or partly transparent portions that enable a person to see electronic visual display 1306 through outer surface 1304.

In another example, in door 1300, outer surface 1304 may include opaque portions that hide at least part of connector 1302 from a person looking at the door. In one example, parts of outer surface 1304 may include one or more holes or niches. For example, in door 1320, outer surface 1304 may include a hole or a niche for electronic visual display 1322, may include a hole or a niche for electronic visual display 1324, and so forth. In one example, connector 1302 may be configured to connect to an electronic visual display control system (such as electronic visual display control system 1200). In one example, connector 1302 may further include or be replaced by at least parts of an electronic visual display control system (such as electronic visual display control system 1200).

In one example, an electronic visual display (such as electronic visual displays 1306, 1322, 1324 and 1342) may include any electronic device for visually displaying visual information, such as text, images, videos, and so forth. Some non-limiting examples of such electronic devices may include touch screens, flat panel displays, non-flat panel displays, electroluminescent displays, liquid-crystal displays (LCD), light-emitting diode (LED) displays, active-matrix organic light-emitting diode (AMOLED) displays, organic light-emitting diode (OLED) displays, plasma displays, quantum displays, micro-LED displays, and so forth. In some examples, an electronic visual display consistent with the present disclosure may be part of or connected to at least one of a door of a retail storage container, a retail shelf, a fixed window of a retail storage container, a fixed insulated glass end-window of a retail storage container, a fixed window of a walk-in retail storage container, a mobile device, a personal device, and so forth.

In one example, causing an electronic visual display (such as electronic visual displays 1306, 1322, 1324 and 1342) to display information (for example by steps 1810, 1812, 1910 and 2010) may include providing data (for example, by transmitting the data, by storing the data in a shared memory, etc.) that is configured to cause the electronic visual display to display the information. In another example, causing an electronic visual display (such as electronic visual displays 1306, 1322, 1324 and 1342) to display information may include using electronic visual display control system and/or electronic visual display controller 1212, for example by providing instructions, to cause the electronic visual display to display the information. In some examples, causing an electronic visual display (such as electronic visual displays 1306, 1322, 1324 and 1342) to display information (for example by step 2010) may include causing the electronic visual display to display information according to a selected at least one display parameter. For example, data (for example, by transmitting the data, by storing the data in a shared memory, etc.) that is configured to cause the electronic visual display to display information using the at least one display parameter may be provided to the electronic visual display, to a system controlling the electronic visual display (such as electronic visual display control system 1200, electronic visual display controller 1212, and so forth). In another example, a visual (such as image, video, 2D visual, 3D visual, etc.) may be generated based on the using the at least one display parameter, and the electronic visual display may be caused to display the generated visual as described above.

In some examples, causing an adjustment to a power scheme of an electronic visual display (such as electronic visual displays 1306, 1322, 1324 and 1342) may comprise changing the brightness of the electronic visual display, turning the electronic visual display on, turning the electronic visual display off, and so forth. In one example, causing an adjustment to a power scheme of an electronic visual display (such as electronic visual displays 1306, 1322, 1324 and 1342) may comprise providing data that is configured to cause the adjustment to the power scheme of the electronic visual display. In another example, causing an adjustment to a power scheme of an electronic visual display (such as electronic visual displays 1306, 1322, 1324 and 1342) may comprise using electronic visual display control system and/or electronic visual display controller 1212, for example by providing instructions, to cause the electronic visual display to adjust the power scheme of the electronic visual display.

Each one of FIG. 14A-14F illustrates an example of a retail storage container with an open hinged door, and each one of FIG. 15A-15H illustrates an example of a retail storage container with a closed hinged door. The illustrated retail storage containers may comprise shelves that hold products. While FIG. 14A-14F and FIG. 15A-15H depict a specific type of retail storage containers for purposes of illustration, as will be appreciated from this disclosure, other types of retail storage containers that include doors may be used. Some non-limiting examples of such retail storage container may include a cooler (such as a reach-in cooler, walk-in cooler, display cooler, countertop cooler, under-counter cooler, worktop cooler, chest cooler, merchandising cooler, etc.), a refrigerator (such as a reach-in refrigerator, display refrigerator, walk-in refrigerator, countertop refrigerator, under-counter refrigerator, worktop refrigerator, chest refrigerator, merchandising refrigerator, etc.), a freezer (such as a reach-in freezer, walk-in freezer, display freezer, countertop freezer, under-counter freezer, worktop freezer, chest freezer, merchandising freezer, etc.), a closet, enclosed storage unit with a door, shelving unit with a door, or any other unit configured to include at least one door and is configured to hold one or more products for sale in a retail establishment. Some examples of doors of retail storage containers may include a sliding door, a hinged door, and so forth. In some examples, the door may be an integral door of the retail storage container. In some examples, such door of a retail storage container may comprise at least an external part that is configured to face customers when the door is closed and an internal part configured to face the internal side of the retail storage container when the door is closed (for example in a hinged door).

FIG. 14A-14F are schematic illustrations of exemplary retail storage containers, consistent with the present disclosure.

Figure 14A:
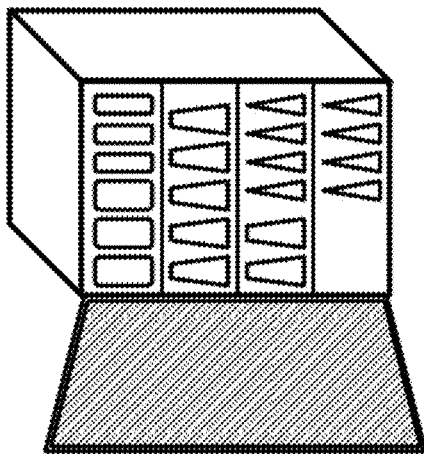
FIG. 14A-14F are schematic illustrations of exemplary retail storage containers, consistent with the present disclosure.

In FIG. 14A, at least a portion of the internal part of the door may be opaque, may be transparent, may be partly transparent, may be covered by a mirror, may comprise an electronic visual display, and so forth.

Figure 14B:
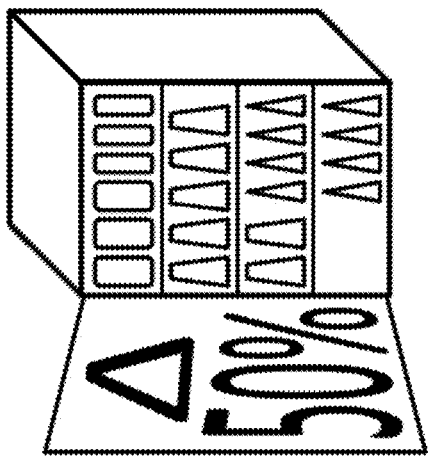

In FIG. 14B, the internal part of the door may comprise an electronic visual display, and the electronic visual display may be configured to display promotional information (such as '50% off', 'special price', 'limited offer', 'buy one get one free', image of a product being promoted, name of product being promoted, and so forth). In some examples, the displayed promotional information may be selected and/or controlled as described herein.

Figure 14C:
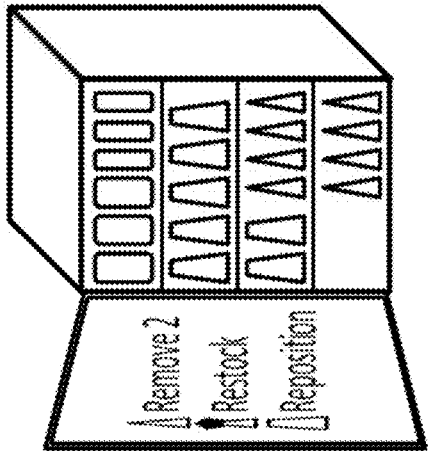

In FIG. 14C, the internal part of the door may comprise an electronic visual display, and the electronic visual display may display one or more instructions for store associates (such as 'remove X items of product Y', 'restock product Y', 'reposition product Y', and so forth), for example as described herein. In some examples, the displayed one or more instructions for the store associates may be selected and/or controlled as described herein. In some examples, the electronic visual display may include a touch screen, and clicking on an instruction may cause a change in the displayed information, for example as described herein.

Figure 14D:
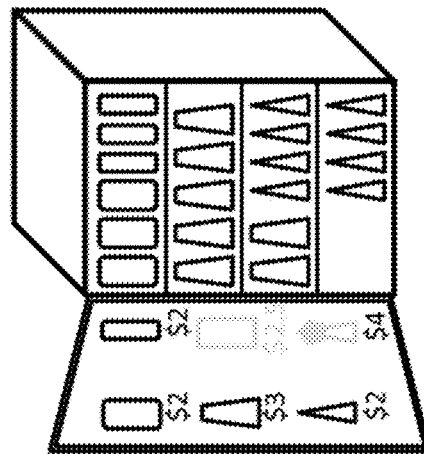
Figure 14E:
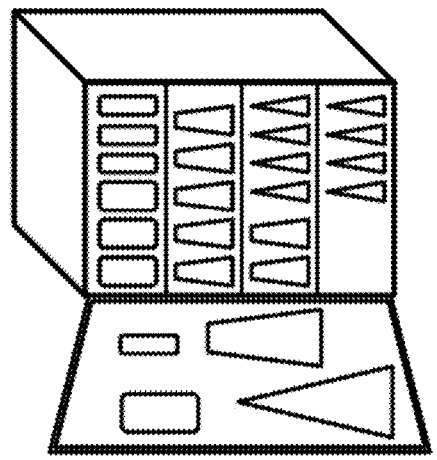

In FIG. 14D and in FIG. 14E, the internal part of the door may comprise an electronic visual display, and the electronic visual display may display information about products associated with the retail storage container (such as products in the retail storage container, product missing from the retail storage container, and so forth), for example as described herein.

Figure 14F:
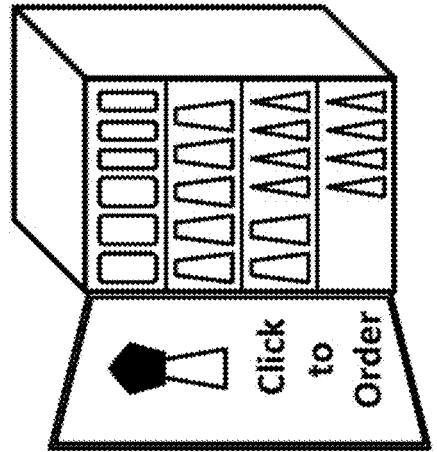

In FIG. 14F, the internal part of the door may comprise a touch screen, and the touch screen may display a user interface that enables a user (such as a customer, a shop associate, and so forth) to interact with the system. In this example, the touch screen may display an image of a product missing from the retail storage container, for example with a text 'Click to Order', and clicking on the image and/or clicking on the text may trigger an action associate with ordering the missing product.

Figure 15A:
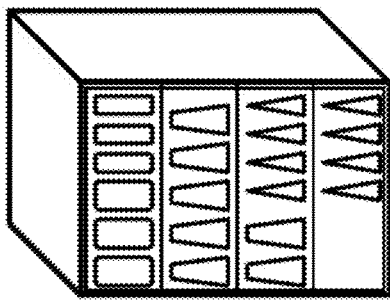
FIG. 15A-15H are schematic illustrations of exemplary retail storage containers, consistent with the present disclosure.

In FIG. 15A, at least a portion of the door may be transparent and/or partly transparent, and shelves and/or products in the retail storage container may be visible and/or partly visible to a person facing the retail storage container through the door (for example, through a closed door, through a partly closed door, and so forth).

Figure 15B:
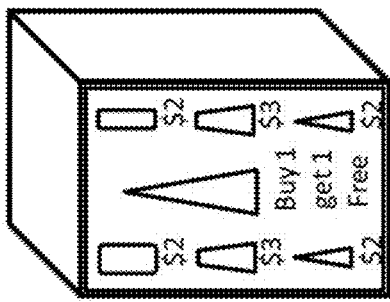

In FIG. 15B, the external part of the door may comprise an electronic visual display. In this example, the electronic visual display may display information about products associated with the retail storage container (such as products in the retail storage container, product missing from the retail storage container, and so forth), for example as described herein. Further, in this example, the electronic visual display may display promotional information (such as '50% off', 'special price', 'limited offer', 'buy one get one free', image of a product being promoted, name of product being promoted, and so forth), for example as described herein. In some examples, the displayed promotional information may be selected and/or controlled as described herein.

Figure 15C:
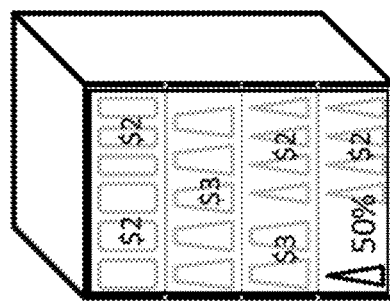

In FIG. 15C, at least a portion of the door may comprise a transparent electronic visual display and/or partly transparent electronic visual display, and shelves and/or products in the retail storage container may be visible and/or partly visible to a person facing the retail storage container through the electronic visual display (for example, through a closed door, through a partly closed door, and so forth). Further, in this example, the transparent electronic visual display and/or the partly transparent electronic visual display may display information about products associated with the retail storage container (such as products in the retail storage container, product missing from the retail storage container, and so forth), for example as described herein. For example, an overlay displayed over the products and/or shelves in the retail storage container may present information related to the overlaid products and/or shelves, for example as described herein. In another example, an overlay displayed over empty spaces in the retail storage container may present information related to missing products, for example as described herein. In yet another example, an overlay displayed over empty spaces in the retail storage container may present promotional information (such as '50% off', 'special price', 'limited offer', 'buy one get one free', image of a product being promoted, name of product being promoted, and so forth), for example as described herein. In some examples, the displayed promotional information may be selected and/or controlled as described herein.

Figure 15D:
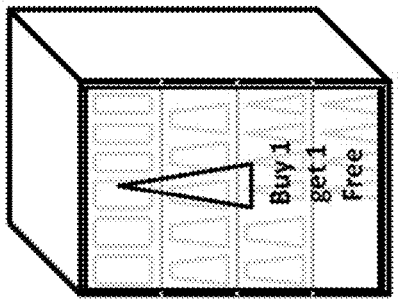

In FIG. 15D, at least a portion of the door may comprise a transparent electronic visual display and/or partly transparent electronic visual display, and shelves and/or products in the retail storage container may be visible and/or partly visible to a person facing the retail storage container through the electronic visual display (for example, through a closed door, through a partly closed door, and so forth). Further, in this example, the transparent electronic visual display and/or the partly transparent electronic visual display may display promotional information (such as '50% off', 'special price', 'limited offer', 'buy one get one free', image of a product being promoted, name of product being promoted, and so forth), for example as described herein. In some examples, the displayed promotional information may be selected and/or controlled as described herein.

Figure 15E:
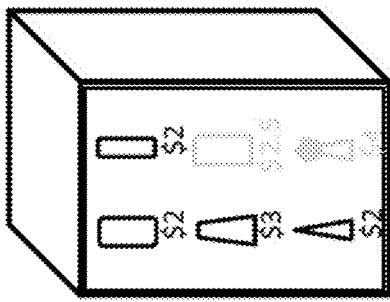
Figure 15F:
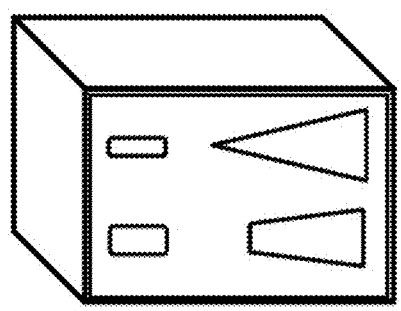
Figure 15G:
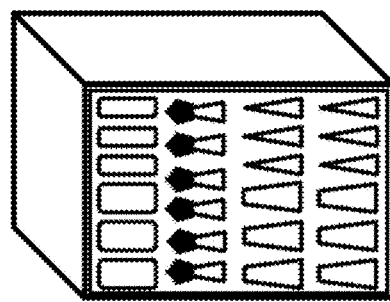

In FIG. 15E, 15F and 15G, the external part of the door may comprise an electronic visual display. In this example, the electronic visual display may display information about products associated with the retail storage container (such as products in the retail storage container, product missing from the retail storage container, and so forth), for example as described herein.

Figure 15H:
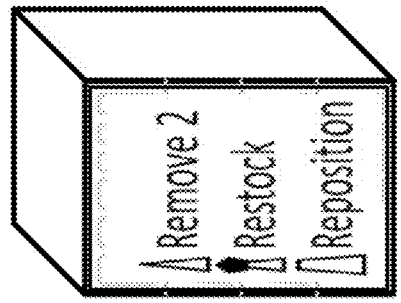

In FIG. 15H, at least a portion of the door may comprise an electronic visual display and/or a transparent electronic visual display and/or partly transparent electronic visual display, and in some implementations shelves and/or products in the retail storage container may be visible and/or partly visible to a person facing the retail storage container through the electronic visual display (for example, through a closed door, through a partly closed door, and so forth). Further, in this example, the electronic visual display and/or the transparent electronic visual display and/or the partly transparent electronic visual display may display one or more instructions for store associates (such as 'remove X items of product Y', 'restock product Y', 'reposition product Y', and so forth), for example as described herein. In some examples, the displayed one or more instructions for the store associates may be selected and/or controlled as described herein. In some examples, the electronic visual display may include a touch screen, and clicking on an instruction may cause a change in the displayed information, for example as described herein.

FIG. 16A-16F are schematic illustrations of exemplary retail shelves, consistent with the present disclosure. Each one of FIG. 16A-16F illustrates an example of a retail shelf 1602 that holds one or more products in a retail store, and an associated electronic visual display 1604. While FIG. 16A-16F depict a specific type of retail shelf 1602 for purposes of illustration, as will be appreciated from this disclosure, other types of units for holding products in a retail store may be used. Some non-limiting examples of such units may include any type of shelve, any type of shelving unit, a display, any type of retail storage container, and so forth. Moreover, while FIG. 16A-16F depict electronic visual display 1604 physically connected to retail shelf 1602 for purposes of illustration, as will be appreciated from this disclosure, electronic visual display 1604 may be physically disconnected from retail shelf 1602. For example, electronic visual display 1604 may be connected to another retail shelf or another retail unit, may be placed on a stand, may be part of a mobile device, and so forth.

Figure 16A:
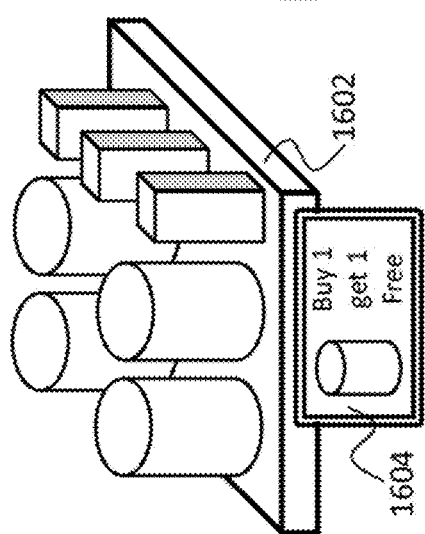
FIG. 16A-16F are schematic illustrations of exemplary retail shelves, consistent with the present disclosure.

In FIG. 16A, electronic visual display 1604 may display promotional information (such as '50% off', 'special price', 'limited offer', 'buy one get one free', image of a product being promoted, name of product being promoted, and so forth), for example as described herein. In some examples, the displayed promotional information may be selected and/or controlled as described herein.

Figure 16B:
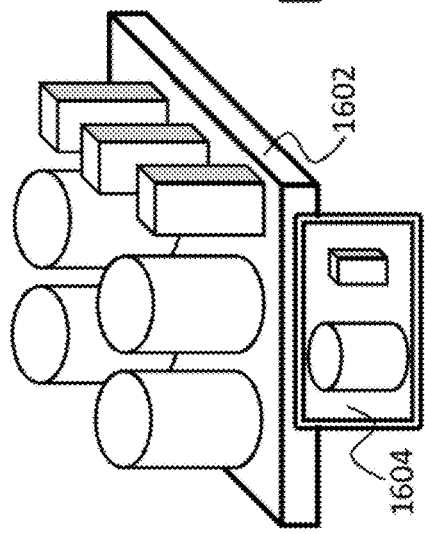
Figure 16C:
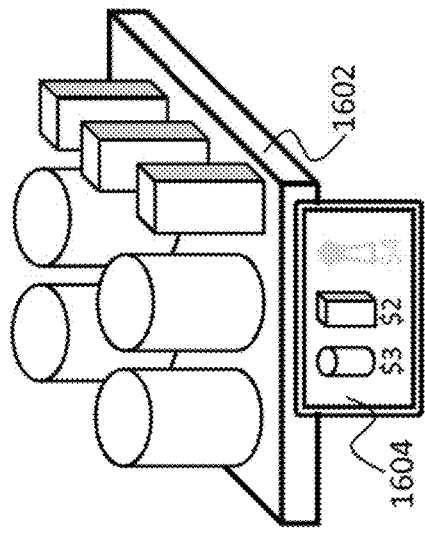
Figure 16D:
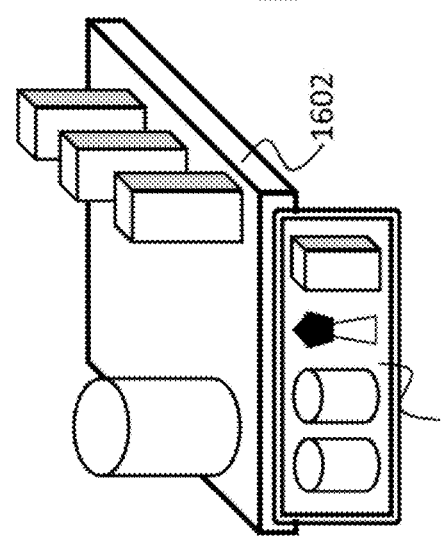

In FIGS. 16B, 16C and 16D, electronic visual display 1604 may display information about products associated with shelf 1602 (such as products on shelf 1602, product missing from shelf 1602, and so forth), for example as described herein.

Figure 16E:
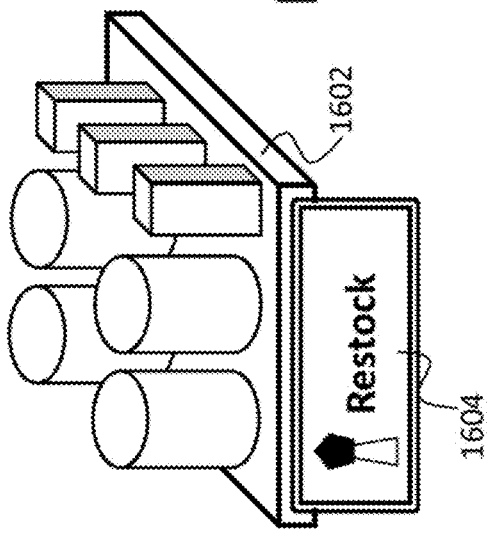

In FIG. 16E, electronic visual display 1604 may display one or more instructions for store associates (such as 'remove X items of product Y', 'restock product Y', 'reposition product Y', and so forth), for example as described herein. In some examples, the displayed one or more instructions for the store associates may be selected and/or controlled as described herein. In some examples, electronic visual display 1604 may include a touch screen, and clicking on an instruction may cause a change in the displayed information, for example as described herein.

Figure 16F:
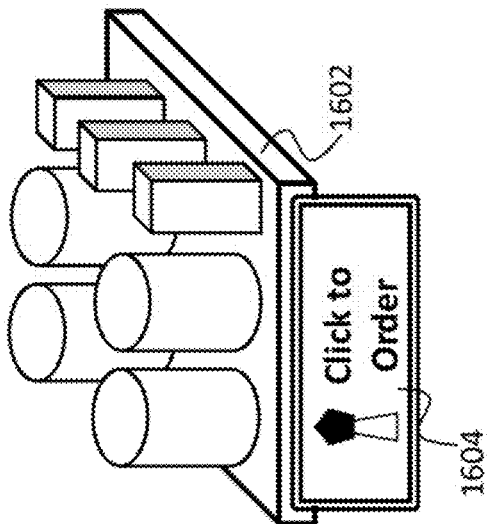

In FIG. 16F, electronic visual display 1604 may comprise a touch screen, and the touch screen may display a user interface that enables a user (such as a customer, a shop associate, and so forth) to interact with the system. In this example, the touch screen may display an image of a product missing from the retail storage container, for example with a text 'Click to Order', and clicking on the image and/or clicking on the text may trigger an action associate with ordering the missing product.

In some embodiments, a method (such as methods 700, 720, 1000, 1050, 1700, 1800, 1900, 2000, 2100, 2200, etc.) may comprise of one or more steps. In some examples, a method, as well as all individual steps therein, may be performed by various aspects of server 135, capturing device 125, electronic visual display control system 1200, and so forth. For example, the method may be performed by processing units (such as processors 202) executing software instructions stored within memory units (such as memory device 226, memory device 1226, and so forth). In some examples, a method, as well as all individual steps therein, may be performed by a dedicated hardware. In some examples, computer readable medium (such as a non-transitory computer readable medium) may store data and/or computer implementable instructions for carrying out a method, such as instructions that when executed by a processor may cause the processor to perform the method. Some non-limiting examples of possible execution manners of a method may include continuous execution (for example, returning to the beginning of the method once the method normal execution ends), periodically execution, executing the method at selected times, execution upon the detection of a trigger (some non-limiting examples of such trigger may include a trigger from a user, a trigger from another method, a trigger from an external device, etc.), and so forth.

In some embodiments, machine learning algorithms (also referred to as machine learning models in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recurrent neural network algorithms, linear algorithms, non-linear algorithms, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by an process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some embodiments, trained machine learning algorithms (also referred to as trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may comprise shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the an artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

In some embodiments, analyzing one or more images (for example, by the methods, steps and modules described herein) may comprise analyzing the one or more images to obtain a preprocessed image data, and subsequently analyzing the one or more images and/or the preprocessed image data to obtain the desired outcome. One of ordinary skill in the art will recognize that the followings are examples, and that the one or more images may be preprocessed using other kinds of preprocessing methods. In some examples, the one or more images may be preprocessed by transforming the one or more images using a transformation function to obtain a transformed image data, and the preprocessed image data may comprise the transformed image data. For example, the transformed image data may comprise one or more convolutions of the one or more images. For example, the transformation function may comprise one or more image filters, such as low-pass filters, high-pass filters, band-pass filters, all-pass filters, and so forth. In some examples, the transformation function may comprise a non-linear function. In some examples, the one or more images may be preprocessed by smoothing at least parts of the one or more images, for example using Gaussian convolution, using a median filter, and so forth. In some examples, the one or more images may be preprocessed to obtain a different representation of the one or more images. For example, the preprocessed image data may comprise: a representation of at least part of the one or more images in a frequency domain; a Discrete Fourier Transform of at least part of the one or more images; a Discrete Wavelet Transform of at least part of the one or more images; a time/frequency representation of at least part of the one or more images; a representation of at least part of the one or more images in a lower dimension; a lossy representation of at least part of the one or more images; a lossless representation of at least part of the one or more images; a time ordered series of any of the above; any combination of the above; and so forth. In some examples, the one or more images may be preprocessed to extract edges, and the preprocessed image data may comprise information based on and/or related to the extracted edges. In some examples, the one or more images may be preprocessed to extract image features from the one or more images. Some non-limiting examples of such image features may comprise information based on and/or related to: edges; corners; blobs; ridges; Scale Invariant Feature Transform (SIFT) features; temporal features; and so forth.

In some embodiments, analyzing one or more images (for example, by the methods, steps and modules described herein) may comprise analyzing the one or more images and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth.

In some embodiments, analyzing one or more images (for example, by the methods, steps and modules described herein) may comprise analyzing pixels, voxels, point cloud, range data, etc. included in the one or more images.

Figure 17:
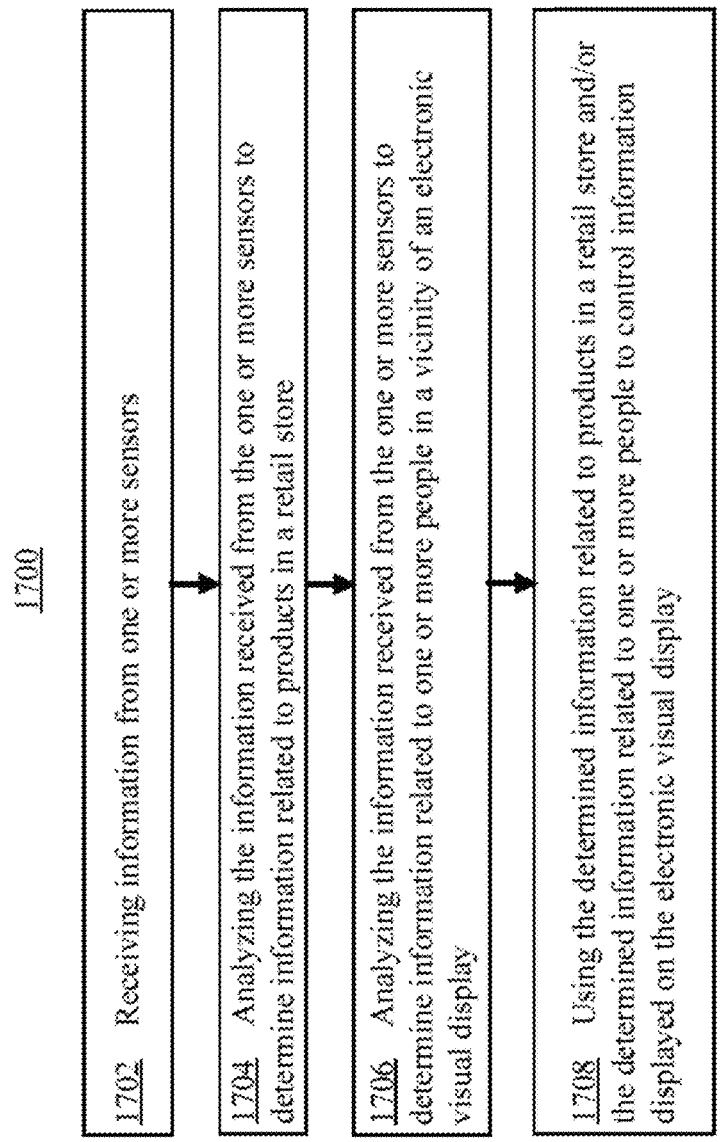
FIG. 17 provides a flowchart of an exemplary method for controlling information displayed on an electronic visual display in a retail store, consistent with the present disclosure.

FIG. 17 provides a flowchart of an exemplary method 1700 for controlling information displayed on an electronic visual display in a retail store, consistent with the present disclosure. In this example, method 1700 may comprise: receiving information from one or more sensors (step 1702); analyzing the information received from the one or more sensors to determine information related to products in a retail store (step 1704); analyzing the information received from the one or more sensors to determine information related to one or more people in a vicinity of an electronic visual display (step 1706); and using the determined information related to products in a retail store and/or the determined information related to one or more people to control information displayed on the electronic visual display (step 1708). In one example, step 1704 may be omitted from method 1700, and step 1708 may use the determined information related to one or more people to control information displayed on the electronic visual display. In another example, step 1706 may be omitted from method 1700, and step 1708 may use the determined information related to products in a retail store to control information displayed on the electronic visual display. Some non-limiting examples of such electronic visual display may include touch screen, electronic visual display 1306, electronic visual display 1322, electronic visual display 1324, electronic visual display 1342, any one of the electronic visual display in FIG. 14A-14F, any one of the electronic visual display in FIG. 15A-15H, any one of the electronic visual display in FIG. 16A-16F, and so forth.

In some embodiments, step 1702 may comprise receiving information from one or more sensors. For example, step 1702 may use one or more of steps 708, 722, 1005, 1015, 1802, 1804, 1902 and 2102 to obtain the information from one or more sensors. In one example, step 1702 may obtain one or more images captured using one or more capturing devices 125. In another example, step 1702 may obtain one or more images captured as described in relation to FIG. 4A and/or in relation to FIG. 4B and/or in relation to FIG. 4C and/or in relation to FIG. 5A and/or in relation to FIG. 5B and/or in relation to FIG. 5C and/or in relation to FIG. 6A and/or in relation to FIG. 6B and/or in relation to FIG. 6C may be obtained. In yet another example, step 1702 may obtain one or more readings from sensors configured to be positioned between a retail shelf and products placed on the retail shelf, for example as described in relation to FIG. 8A and/or in relation to FIG. 8B and/or in relation to FIG. 9. Some non-limiting examples of such sensors may include pressure sensors, touch sensors, weight sensors, light sensors, resistive sensors, capacitive sensors, inductive sensors, vacuum pressure sensors, high pressure sensors, conductive pressure sensors, infrared sensors, photo-resistor sensors, photo-transistor sensors, photo-diodes sensors, ultrasonic sensors, and so forth. For example, step 1702 may comprise receiving pressure data captured using pressure sensors configured to be positioned between a retail shelf and products placed on the retail shelf. In another example, step 1702 may comprise receiving touch data captured using touch sensors configured to be positioned between a retail shelf and products placed on the retail shelf. In yet another example, step 1702 may comprise receiving weight data captured using weight sensors configured to be positioned between a retail shelf and products placed on the retail shelf. In an additional example, step 1702 may comprise receiving light data captured using light sensors configured to be positioned between a retail shelf and products placed on the retail shelf.

In some embodiments, step 1704 may comprise analyzing the information received from the one or more sensors by step 1702 to determine information related to products in a retail store (for example, to determine information related to products in retail storage container, to determine information related to products placed on a retail shelf, and so forth). In some examples, step 1704 may use the analysis of the information received by step 1702 to determine the types of the products, the placement of the products, the amount of the products, the condition and/or state of the products, and so forth. For example, step 1704 may use one or more of steps 724, 1010, 1020, 1025, 1055, 1060, 1904, 1906 and 2104 to analyze the information received by step 1702 and determine the information related to products in the retail store. In another example, a machine learning algorithm may be trained using training examples to determine information about products from such information, and step 1704 may use the trained machine learning model to analyze the information received by step 1702 and determine the information related to products in the retail store. An example of such training example may include a sample of a received input data together with desired determined information related to products. In another example, an artificial neural network (such as a deep neural network, a convolutional neural network, etc.) may be configured to determine information related to products from such received information, and step 1704 may use the artificial neural network to analyze the information received by step 1702 and determine the information related to products in the retail store.

In some embodiments, step 1706 may comprise analyzing the information received from the one or more sensors by step 1702 to determine information related to one or more people in a vicinity of an electronic visual display. For example, step 1706 may obtain a location of a person through a localization of a personalized device associated with the person (such as a smartphone, wearable device, etc.) within the retail store, through person and/or face detection in images captured from the environment surrounding the electronic visual display, and so forth. In another example, step 1706 may obtain the identity and/or other personal information of a person in the vicinity of the electronic visual display from the personalized device associated with the person, through face recognition, from a loyalty plan of a customer, from past purchases of the customer, from an employee record of a store associate, and so forth. In yet another example, step 1706 may obtain information about a state and/or actions of the person (such as emotional state, interaction with at least part of the electronic visual display, picking of a product, returning of a product, etc.) by analyzing images captured from the environment surrounding the electronic visual display. For example, step 1706 may use face recognition algorithms to recognize a person in an image captured from the environment of the electronic visual display, and use the recognition of the person to access a record corresponding to the person that contains at least part of the information related to the person. In another example, step 1706 may use age and/or gender estimation algorithms to estimate an age and/or a gender of a person in an image captured from the environment of the electronic visual display. In yet another example, step 1706 may receive from a personal device of a person a wireless communication including a unique identifier (such as a MAC address, a loyalty card number, an employee number, etc.) corresponding to the personal device and/or to the person, and step 1706 may use the unique identifier to access a database including a record with at least part of the information related to the person. In an additional information, step 1706 may use tracking algorithms to determine past behavior of the person. In yet another example, step 1706 may use image analysis algorithm to determine sentiment and/or emotional state of the person.

In some embodiments, step 1708 may comprise using the information related to products in a retail store determined by step 1704 and/or the information related to one or more people determined by step 1706 to control information displayed on the electronic visual display. For example, step 1708 may use one or more of methods 1800, 1900, 2000, 2100 and 2200 to control information displayed on the electronic visual display.

In some embodiments, step 1708 may select and/or modify promotional information displayed on an electronic visual display (such as the displayed promotional information in FIG. 14B, FIG. 15C, FIG. 15D and FIG. 16A) in response to external triggers, in response to actual inventory (in a retail storage container, on a retail shelf, etc.), in response to a planogram (of a retail storage container, of a retail shelf, etc.), in response to a realogram (of a retail storage container, of a retail shelf, etc.), in response to a state of at least one product (in a retail storage container, on a retail shelf, etc.), in response to supply chain information, in response to an action (such as looking at a product, clicking at a touch screen and/or a key, picking a product, returning a product, etc.) of a person (such as a customer, a store associate, etc.), in response to information (such as identity of the person, age of the person, gender of the person, past behavior of the person, sentiment and/or emotional state of the person, etc.) on a person (such as a customer, a store associate, etc.), and so forth. Some non-limiting examples of such promotional information may include an indication of a discount (for example, a percentage discount, a flat amount discount, etc.), an indication of a multi-buy promotion (such as a buy-one-get-one promotion, a "two for the price of one" promotion, etc.), an indication of a multi-save promotion, an indication of a conditional promotion, a free-shipping promotion, a try-before-you-buy promotion, and so forth. For example, in response to a first external trigger, step 1708 may cause first promotional information to be displayed on the electronic visual display, and in response to a second external trigger, step 1708 may cause second promotional information to be displayed on the electronic visual display. In another example, in response to a first external trigger, step 1708 may cause first promotional information to be displayed on the electronic visual display, and in response to a second external trigger, step 1708 may forgo and/or withhold causing the display of the first promotional information. For example, in response to a first actual inventory (in the retail storage container, on the shelf, etc.), step 1708 may cause first promotional information to be displayed on the electronic visual display, and in response to a second actual inventory, step 1708 may cause second promotional information to be displayed on the electronic visual display. In another example, in response to a first actual inventory (in the retail storage container, on the shelf, etc.), step 1708 may cause first promotional information to be displayed on the electronic visual display, and in response to a second actual inventory, step 1708 may forgo and/or withhold causing the display of the first promotional information. For example, in response to a first planogram (of the retail storage container, of the shelf, etc.), step 1708 may cause first promotional information to be displayed on the electronic visual display, and in response to a second planogram, step 1708 may cause second promotional information to be displayed on the electronic visual display. In another example, in response to a first planogram (of the retail storage container, of the shelf, etc.), step 1708 may cause first promotional information to be displayed on the electronic visual display, and in response to a second planogram, step 1708 may forgo and/or withhold causing the display of the first promotional information. For example, in response to a first realogram (of the retail storage container, of the shelf, etc.), step 1708 may cause first promotional information to be displayed on the electronic visual display, and in response to a second realogram, step 1708 may cause second promotional information to be displayed on the electronic visual display. In another example, in response to a first realogram (of the retail storage container, of the shelf, etc.), step 1708 may cause first promotional information to be displayed on the electronic visual display, and in response to a second realogram, step 1708 may forgo and/or withhold causing the display of the first promotional information. For example, in response to a first state of the at least one product (in the retail storage container, on the shelf, etc.), step 1708 may cause first promotional information to be displayed on the electronic visual display, and in response to a second state of the at least one product, step 1708 may cause second promotional information to be displayed on the electronic visual display. In another example, in response to a first state of the at least one product (in the retail storage container, on the shelf, etc.), step 1708 may cause first promotional information to be displayed on the electronic visual display, and in response to a second state of the at least one product, step 1708 may forgo and/or withhold causing the display of the first promotional information. For example, in response to first supply chain information, step 1708 may cause first promotional information to be displayed on the electronic visual display, and in response to second supply chain information, step 1708 may cause second promotional information to be displayed on the electronic visual display. In another example, in response to first supply chain information, step 1708 may cause first promotional information to be displayed on the electronic visual display, and in response to second supply chain information, step 1708 may forgo and/or withhold causing the display of the first promotional information. For example, in response to a first action (such as looking at a product, clicking at a touch screen and/or a key, picking a product, returning a product, etc.) of a person (such as a customer, a store associate, etc.), step 1708 may cause first promotional information to be displayed on the electronic visual display, and in response to a second action of the person, step 1708 may cause second promotional information to be displayed on the electronic visual display. In another example, in response to a first action (such as looking at a product, clicking at a touch screen and/or a key, picking a product, returning a product, etc.) of a person (such as a customer, a store associate, etc.), step 1708 may cause first promotional information to be displayed on the electronic visual display, and in response to a second action of the person, step 1708 may forgo and/or withhold causing the display of the first promotional information. For example, in response to first information (such as identity, age, gender, past behavior, sentiment and/or emotional state, etc.) on a person (such as a customer, a store associate, etc.), step 1708 may cause first promotional information to be displayed on the electronic visual display, and in response to second information on the person, step 1708 may cause second promotional information to be displayed on the electronic visual display. In another example, in response to first information (such as identity, age, gender, past behavior, sentiment and/or emotional state, etc.) of a person (such as a customer, a store associate, etc.), step 1708 may cause first promotional information to be displayed on the electronic visual display, and in response to second information on the person, step 1708 may forgo and/or withhold causing the display of the first promotional information. The second promotional information may differ from the first promotional information. In some examples, the electronic visual display may be a touch screen, and clicking on the promotional information may cause the electronic visual display to display additional information, may cause transmission of information to an external system, and so forth.

In some embodiments, step 1708 may select and/or modify one or more instructions to one or more store associates displayed on an electronic visual display (such as displayed instructions in FIG. 14C, FIG. 15H and FIG. 16E) in response to external triggers, in response to actual inventory (in a retail storage container, on a retail shelf, etc.), in response to a planogram (of a retail storage container, of a retail shelf, etc.), in response to a realogram (of a retail storage container, of a retail shelf, etc.), in response to a state of at least one product (in a retail storage container, on a retail shelf, etc.), in response to supply chain information, in response to an action (such as looking at a product, clicking at a touch screen and/or a key, picking a product, returning a product, etc.) of a person (such as a customer, a store associate, etc.), in response to information (such as identity of the person, age of the person, gender of the person, past behavior of the person, sentiment and/or emotional state of the person, etc.) on a person (such as a customer, a store associate, etc.), and so forth. Some non-limiting examples of such instructions for the store associates may include an instruction to restock products, an instruction to rearrange products, an instruction to remove products, an instruction to clean, an instruction to modify a label, an instruction to place a label, an instruction to remove a label, and so forth. For example, in response to a first external trigger, step 1708 may cause a first instruction for the store associates to be displayed on the electronic visual display, and in response to a second external trigger, step 1708 may cause a second instruction for the store associates to be displayed on the electronic visual display. In another example, in response to a first external trigger, step 1708 may cause a first instruction for the store associates to be displayed on the electronic visual display, and in response to a second external trigger, step 1708 may forgo and/or withhold causing the display of the first instruction for the store associates. For example, in response to a first actual inventory (in the retail storage container, on the shelf, etc.), step 1708 may cause a first instruction for the store associates to be displayed on the electronic visual display, and in response to a second actual inventory, step 1708 may cause a second instruction for the store associates to be displayed on the electronic visual display. In another example, in response to a first actual inventory (in the retail storage container, on the shelf, etc.), step 1708 may cause a first instruction for the store associates to be displayed on the electronic visual display, and in response to a second actual inventory, step 1708 may forgo and/or withhold causing the display of the first instruction for the store associates. For example, in response to a first planogram (of the retail storage container, of the shelf, etc.), step 1708 may cause a first instruction for the store associates to be displayed on the electronic visual display, and in response to a second planogram, step 1708 may cause a second instruction for the store associates to be displayed on the electronic visual display. In another example, in response to a first planogram (of the retail storage container, of the shelf, etc.), step 1708 may cause a first instruction for the store associates to be displayed on the electronic visual display, and in response to a second planogram, step 1708 may forgo and/or withhold causing the display of the first instruction for the store associates. For example, in response to a first realogram (of the retail storage container, of the shelf, etc.), step 1708 may cause a first instruction for the store associates to be displayed on the electronic visual display, and in response to a second realogram, step 1708 may cause a second instruction for the store associates to be displayed on the electronic visual display. In another example, in response to a first realogram (of the retail storage container, of the shelf, etc.), step 1708 may cause a first instruction for the store associates to be displayed on the electronic visual display, and in response to a second realogram, step 1708 may forgo and/or withhold causing the display of the first instruction for the store associates. For example, in response to a first state of the at least one product (in the retail storage container, on the shelf, etc.), step 1708 may cause a first instruction for the store associates to be displayed on the electronic visual display, and in response to a second state of the at least one product, step 1708 may cause a second instruction for the store associates to be displayed on the electronic visual display. In another example, in response to a first state of the at least one product (in the retail storage container, on the shelf, etc.), step 1708 may cause a first instruction for the store associates to be displayed on the electronic visual display, and in response to a second state of the at least one product, step 1708 may forgo and/or withhold causing the display of the first instruction for the store associates. For example, in response to first supply chain information, step 1708 may cause a first instruction for the store associates to be displayed on the electronic visual display, and in response to second supply chain information, step 1708 may cause a second instruction for the store associates to be displayed on the electronic visual display. In another example, in response to first supply chain information, step 1708 may cause a first instruction for the store associates to be displayed on the electronic visual display, and in response to second supply chain information, step 1708 may forgo and/or withhold causing the display of the first instruction for the store associates. For example, in response to a first action (such as looking at a product, clicking at a touch screen and/or a key, picking a product, returning a product, etc.) of a person (such as a customer, a store associate, etc.), step 1708 may cause a first instruction for the store associates to be displayed on the electronic visual display, and in response to a second action of the person, step 1708 may cause a second instruction for the store associates to be displayed on the electronic visual display. In another example, in response to a first action (such as looking at a product, clicking at a touch screen and/or a key, picking a product, returning a product, etc.) of a person (such as a customer, a store associate, etc.), step 1708 may cause a first instruction for the store associates to be displayed on the electronic visual display, and in response to second action of the person, step 1708 may forgo and/or withhold causing the display of the first instruction for the store associates. For example, in response to first information (such as identity, age, gender, past behavior, sentiment and/or emotional state, etc.) on a person (such as a customer, a store associate, etc.), step 1708 may cause a first instruction for the store associates to be displayed on the electronic visual display, and in response to second information on the person, step 1708 may cause a second instruction for the store associates to be displayed on the electronic visual display. In another example, in response to first information (such as identity, age, gender, past behavior, sentiment and/or emotional state, etc.) of a person (such as a customer, a store associate, etc.), step 1708 may cause a first instruction for the store associates to be displayed on the electronic visual display, and in response to second information on the person, step 1708 may forgo and/or withhold causing the display of the first instruction for the store associates. The second instruction for the store associates may differ from the first instruction for the store associates. In some examples, the electronic visual display may be a touch screen, and clicking on an instruction may cause the electronic visual display to display additional information, may transmit information to an external system, may remove the instruction from the displayed information, and so forth.

In some embodiments, step 1708 may select and/or modify elements of a user interface displayed on an electronic visual display (such as elements of the user interface in FIG. 14F and FIG. 16F) in response to external triggers, in response to actual inventory (in a retail storage container, on a retail shelf, etc.), in response to a planogram (of a retail storage container, of a retail shelf, etc.), in response to a realogram (of a retail storage container, of a retail shelf, etc.), in response to a state of at least one product (in a retail storage container, on a retail shelf, etc.), in response to supply chain information, in response to an action (such as looking at a product, clicking at a touch screen and/or a key, picking a product, returning a product, etc.) of a person (such as a customer, a store associate, etc.), in response to information (such as identity of the person, age of the person, gender of the person, past behavior of the person, sentiment and/or emotional state of the person, etc.) on a person (such as a customer, a store associate, etc.), and so forth. Some non-limiting examples of such elements of a user interface may include a clickable element, an icon, a textual element, a graphical element, a background, and so forth. For example, in response to a first external trigger, step 1708 may cause a first user interface element to be displayed on the electronic visual display, and in response to a second external trigger, step 1708 may cause a second user interface element to be displayed on the electronic visual display. In another example, in response to a first external trigger, step 1708 may cause a first user interface element to be displayed on the electronic visual display, and in response to a second external trigger, step 1708 may forgo and/or withhold causing the display of the first user interface element. For example, in response to a first actual inventory (in the retail storage container, on the shelf, etc.), step 1708 may cause a first user interface element to be displayed on the electronic visual display, and in response to a second actual inventory, step 1708 may cause a second user interface element to be displayed on the electronic visual display. In another example, in response to a first actual inventory (in the retail storage container, on the shelf, etc.), step 1708 may cause a first user interface element to be displayed on the electronic visual display, and in response to a second actual inventory, step 1708 may forgo and/or withhold causing the display of the first user interface element. For example, in response to a first planogram (of the retail storage container, of the shelf, etc.), step 1708 may cause a first user interface element to be displayed on the electronic visual display, and in response to a second planogram, step 1708 may cause a second user interface element to be displayed on the electronic visual display. In another example, in response to a first planogram (of the retail storage container, of the shelf, etc.), step 1708 may cause a first user interface element to be displayed on the electronic visual display, and in response to a second planogram, step 1708 may forgo and/or withhold causing the display of the first user interface element. For example, in response to a first realogram (of the retail storage container, of the shelf, etc.), step 1708 may cause a first user interface element to be displayed on the electronic visual display, and in response to a second realogram, step 1708 may cause a second user interface element to be displayed on the electronic visual display. In another example, in response to a first realogram (of the retail storage container, of the shelf, etc.), step 1708 may cause a first user interface element to be displayed on the electronic visual display, and in response to a second realogram, step 1708 may forgo and/or withhold causing the display of the first user interface element. For example, in response to a first state of the at least one product (in the retail storage container, on the shelf, etc.), step 1708 may cause a first user interface element to be displayed on the electronic visual display, and in response to a second state of the at least one product, step 1708 may cause a second user interface element to be displayed on the electronic visual display. In another example, in response to a first state of the at least one product (in the retail storage container, on the shelf, etc.), step 1708 may cause a first user interface element to be displayed on the electronic visual display, and in response to a second state of the at least one product, step 1708 may forgo and/or withhold causing the display of the first user interface element. For example, in response to first supply chain information, step 1708 may cause a first user interface element to be displayed on the electronic visual display, and in response to second supply chain information, step 1708 may cause a second user interface element to be displayed on the electronic visual display. In another example, in response to first supply chain information, step 1708 may cause a first user interface element to be displayed on the electronic visual display, and in response to second supply chain information, step 1708 may forgo and/or withhold causing the display of the first user interface element. For example, in response to a first action (such as looking at a product, clicking at a touch screen and/or a key, picking a product, returning a product, etc.) of a person (such as a customer, a store associate, etc.), step 1708 may cause a first user interface element to be displayed on the electronic visual display, and in response to a second action of the person, step 1708 may cause a second user interface element to be displayed on the electronic visual display. In another example, in response to a first action (such as looking at a product, clicking at a touch screen and/or a key, picking a product, returning a product, etc.) of a person (such as a customer, a store associate, etc.), step 1708 may cause a first user interface element to be displayed on the electronic visual display, and in response to a second action of the person, step 1708 may forgo and/or withhold causing the display of the first user interface element. For example, in response to first information (such as identity, age, gender, past behavior, sentiment and/or emotional state, etc.) on a person (such as a customer, a store associate, etc.), step 1708 may cause a first user interface element to be displayed on the electronic visual display, and in response to second information on the person, step 1708 may cause a second user interface element to be displayed on the electronic visual display. In another example, in response to first information (such as identity, age, gender, past behavior, sentiment and/or emotional state, etc.) of a person (such as a customer, a store associate, etc.), step 1708 may cause a first user interface element to be displayed on the electronic visual display, and in response to second information on the person, step 1708 may forgo and/or withhold causing the display of the first user interface element. The second user interface element may differ from the first user interface element. In some examples, the electronic visual display may be a touch screen, and clicking on the user interface may cause the electronic visual display to display additional information, may cause transmission of information to an external system, may trigger a response to the user, and so forth.

In some embodiments, information related to products may be displayed on an electronic visual display (for example as in FIG. 14D, FIG. 14E, FIG. 15B, FIG. 15C, FIG. 15E, FIG. 15F, FIG. 15G, FIG. 16B, FIG. 16C and FIG. 16D), for example about products associated with a retail storage container (such as products in the retail storage container, product missing from the retail storage container, and so forth) and/or with a retail shelf (such as products on the shelf, product missing from the shelf, and so forth). In some examples, the displayed information related to products may include images of the products, prices of the products, quantity of the products (for example in the retail storage container, on the retail shelf, and so forth), information about ingredients of the products (such as 'contains gluten', 'gluten free', list of allergens, calories, fats, sugars, and so forth), Kosher information, brand information related to the products, and so forth. In some examples, step 1708 may select and/or modify the information related to products displayed on the electronic visual display, for example in response to external triggers, in response to actual inventory (in a retail storage container, on a retail shelf, etc.), in response to a planogram (of a retail storage container, of a retail shelf, etc.), in response to a realogram (of a retail storage container, of a retail shelf, etc.), in response to a state of at least one product (in a retail storage container, on a retail shelf, etc.), in response to supply chain information, in response to an action (such as looking at a product, clicking at a touch screen and/or a key, picking a product, returning a product, etc.) of a person (such as a customer, a store associate, etc.), in response to information (such as identity of the person, age of the person, gender of the person, past behavior of the person, sentiment and/or emotional state of the person, etc.) on a person (such as a customer, a store associate, etc.), and so forth. For example, in response to a first external trigger, step 1708 may cause first information related to products to be displayed on the electronic visual display, and in response to a second external trigger, step 1708 may cause second information related to products to be displayed on the electronic visual display. In another example, in response to a first external trigger, step 1708 may cause first information related to products to be displayed on the electronic visual display, and in response to a second external trigger, step 1708 may forgo and/or withhold causing the display of the first information related to products. For example, in response to a first actual inventory (in the retail storage container, on the shelf, etc.), step 1708 may cause first information related to products to be displayed on the electronic visual display, and in response to a second actual inventory, step 1708 may cause second information related to products to be displayed on the electronic visual display. In another example, in response to a first actual inventory (in the retail storage container, on the shelf, etc.), step 1708 may cause first information related to products to be displayed on the electronic visual display, and in response to a second actual inventory, step 1708 may forgo and/or withhold causing the display of the first information related to products. For example, in response to a first planogram (of the retail storage container, of the shelf, etc.), step 1708 may cause first information related to products to be displayed on the electronic visual display, and in response to a second planogram, step 1708 may cause second information related to products to be displayed on the electronic visual display. In another example, in response to a first planogram (of the retail storage container, of the shelf, etc.), step 1708 may cause first information related to products to be displayed on the electronic visual display, and in response to a second planogram, step 1708 may forgo and/or withhold causing the display of the first information related to products. For example, in response to a first realogram (of the retail storage container, of the shelf, etc.), step 1708 may cause first information related to products to be displayed on the electronic visual display, and in response to a second realogram, step 1708 may cause second information related to products to be displayed on the electronic visual display. In another example, in response to a first realogram (of the retail storage container, of the shelf, etc.), step 1708 may cause first information related to products to be displayed on the electronic visual display, and in response to a second realogram, step 1708 may forgo and/or withhold causing the display of the first information related to products. For example, in response to a first state of the at least one product (in the retail storage container, on the shelf, etc.), step 1708 may cause first information related to products to be displayed on the electronic visual display, and in response to a second state of the at least one product, step 1708 may cause second information related to products to be displayed on the electronic visual display. In another example, in response to a first state of the at least one product (in the retail storage container, on the shelf, etc.), step 1708 may cause first information related to products to be displayed on the electronic visual display, and in response to a second state of the at least one product, step 1708 may forgo and/or withhold causing the display of the first information related to products. For example, in response to first supply chain information, step 1708 may cause first information related to products to be displayed on the electronic visual display, and in response to second supply chain information, step 1708 may cause second information related to products to be displayed on the electronic visual display. In another example, in response to first supply chain information, step 1708 may cause first information related to products to be displayed on the electronic visual display, and in response to second supply chain information, step 1708 may forgo and/or withhold causing the display of the first information related to products. For example, in response to a first action (such as looking at a product, clicking at a touch screen and/or a key, picking a product, returning a product, etc.) of a person (such as a customer, a store associate, etc.), step 1708 may cause first information related to products to be displayed on the electronic visual display, and in response to a second action of the person, step 1708 may cause second information related to products to be displayed on the electronic visual display. In another example, in response to a first action (such as looking at a product, clicking at a touch screen and/or a key, picking a product, returning a product, etc.) of a person (such as a customer, a store associate, etc.), step 1708 may cause first information related to products to be displayed on the electronic visual display, and in response to a second action of the person, step 1708 may forgo and/or withhold causing the display of the first information related to products. For example, in response to first information (such as identity, age, gender, past behavior, sentiment and/or emotional state, etc.) on a person (such as a customer, a store associate, etc.), step 1708 may cause first information related to products to be displayed on the electronic visual display, and in response to second information on the person, step 1708 may cause second information related to products to be displayed on the electronic visual display. In another example, in response to first information (such as identity, age, gender, past behavior, sentiment and/or emotional state, etc.) of a person (such as a customer, a store associate, etc.), step 1708 may cause first information related to products to be displayed on the electronic visual display, and in response to second information on the person, step 1708 may forgo and/or withhold causing the display of the first information related to products. The second information related to products may differ from the first information related to products. In some examples, the electronic visual display may be a touch screen, and clicking on the information related to products may cause the electronic visual display to display additional information, may cause transmission of information to an external system, and so forth.

In some examples, step 1708 may present information related to available products (for example, available in the retail storage container, available on the retail shelf, etc.) using first display parameters (such as color scheme, size, location, fonts, motion pattern on the electronic visual display, presentation time, etc.), and may present information related to missing products (for example, missing from the retail storage container, missing from the retail shelf, missing according to a planogram, missing according to a realogram, missing in comparison to past inventory, missing in comparison to a shelf label, etc.) using second display parameters. For example, in FIG. 14D and in FIG. 15E and in FIG. 16C, step 1708 may use such display parameters to control the color scheme, and in FIG. 14E and in FIG. 15F and in FIG. 16B, may use such display parameters to control the display size and/or the display location on the electronic visual display, and so forth. In another example, such display parameters may control a motion of the information related to the products in an animation presented on the electronic visual display. In yet another example, such display parameters may control fonts used to display the information. In an additional example, such display parameters may control the presentation time of the information.

In some embodiments, step 1708 may use display parameters to present information (for example, to present promotional information, to present one or more instructions for store associates, to present user interface items, to present information related to products, and so forth). In some examples, step 1708 may select and/or modify the display parameters in response to external triggers, in response to actual inventory (in a retail storage container, on a retail shelf, etc.), in response to a planogram (of a retail storage container, of a retail shelf, etc.), in response to a realogram (of a retail storage container, of a retail shelf, etc.), in response to a state of at least one product (in a retail storage container, on a retail shelf, etc.), in response to supply chain information, in response to an action (such as looking at a product, clicking at a touch screen and/or a key, picking a product, returning a product, etc.) of a person (such as a customer, a store associate, etc.), in response to information (such as identity of the person, age of the person, gender of the person, past behavior of the person, sentiment and/or emotional state of the person, etc.) on a person (such as a customer, a store associate, etc.), and so forth. Some non-limiting examples of such display parameters may include color scheme of a displayed item, texture of a displayed item, size of a displayed item, display location on the electronic visual display of a displayed item, fonts, motion pattern on the electronic visual display of a displayed item, presentation time for an item, and so forth. For example, in response to a first external trigger, step 1708 may select first display parameters, and in response to a second external trigger, step 1708 may select second display parameters. For example, in response to a first actual inventory (in the retail storage container, on the shelf, etc.), step 1708 may select first display parameters, and in response to a second actual inventory, step 1708 may select second display parameters. For example, in response to a first planogram (of the retail storage container, of the shelf, etc.), step 1708 may select first display parameters, and in response to a second planogram, step 1708 may select second display parameters. For example, in response to a first realogram (of the retail storage container, of the shelf, etc.), step 1708 may select first display parameters, and in response to a second realogram, step 1708 may select second display parameters. For example, in response to a first state of the at least one product (in the retail storage container, on the shelf, etc.), step 1708 may select first display parameters, and in response to a second state of the at least one product, step 1708 may select second display parameters. For example, in response to first supply chain information, step 1708 may select first display parameters, and in response to second supply chain information, step 1708 may select second display parameters. For example, in response to a first action (such as looking at a product, clicking at a touch screen and/or a key, picking a product, returning a product, etc.) of a person (such as a customer, a store associate, etc.), step 1708 may select first display parameters, and in response to a second action of the person, step 1708 may select second display parameters. For example, in response to first information (such as identity, age, gender, past behavior, sentiment and/or emotional state, etc.) on a person (such as a customer, a store associate, etc.), step 1708 may select first display parameters, and in response to second information on the person, step 1708 may select second display parameters. The second display parameters may differ from the first display parameters. In some examples, the electronic visual display may be a touch screen (for example as described above), and clicking on a portion of the touch screen may cause step 1708 to select different display parameters.

In some examples, in response to first display parameters, step 1708 may present a first visual representation of a particular information, and in response to second display parameters, step 1708 may present a second visual representation of the particular information. The second visual representation may differ from the first visual representation, for example in font, in size, in orientation, in color scheme, in texture, in visual content, in location, in motion pattern, and so forth. For example, in response to first display parameters, step 1708 may use a first font to present a visual representation of the particular information, and in response to second display parameters, step 1708 may use a second font to present a visual representation of the particular information, the second font may differ from the first font. In another example, in response to first display parameters, step 1708 may present a visual representation of the particular information of a first size, and in response to second display parameters, step 1708 may present a visual representation of the particular information of a second size, the second size may differ from the first size. In yet another example, in response to first display parameters, step 1708 may present a visual representation of the particular information at a first spatial orientation, and in response to second display parameters, step 1708 may present a visual representation of the particular information of a second spatial orientation, the second spatial orientation may differ from the first spatial orientation. In an additional example, in response to first display parameters, step 1708 may use a first color scheme to present a visual representation of the particular information, and in response to second display parameters, step 1708 may use a second color scheme to present a visual representation of the particular information, the second color scheme may differ from the first color scheme. In another example, in response to first display parameters, step 1708 may present a visual representation of the particular information with a first texture, and in response to second display parameters, step 1708 may present a visual representation of the particular information with a second texture, the second texture may differ from the first texture. In yet another example, in response to first display parameters, step 1708 may present a visual representation of the particular information at a first location, and in response to second display parameters, step 1708 may present a visual representation of the particular information at a second location, the second location may differ from the first location. In an additional example, in response to first display parameters, step 1708 may present a visual representation of the particular information moving at a first motion pattern, and in response to second display parameters, step 1708 may present a visual representation of the particular information moving at a second motion pattern, the second motion pattern may differ from the first motion pattern.

In some examples, an electronic visual display (such as the electronic visual display of method 1700, of method 1900, of method 2000, of method 2100, of method 2200, etc.) may be part of a personal device of a store associate, may be part of a personal device of a customer, may be connected to a shelf in the retail store, may be connected to a door of a retail storage container in the retail store, and so forth.

A hinged door for a retail storage container with an electronic visual display in the internal part of the door (the part that faces the internal side of the retail storage container when the door is closed) may enable providence of information to a person (such as a customer, a store associate, etc.) standing in front of the retail storage container with the door open. The provided information may be used to drive higher sales, to improve customers' experience, and to enhance in-store execution.

In some embodiments, a door (such as a hinged door) for a retail storage container is provided. In some examples, the door may comprise at least a first part that is configured to face customers when the door is closed and a second part configured to face the internal side of the retail storage container when the door is closed. Some examples of such door may include doors 1300, 1320 and 1340. In one example, the first part may comprise at least part of side 1312, and the second part may comprise at least part of side 1310. In one example, the first part of the door may comprise electronic visual display 1322, and the second part of the door may comprise electronic visual display 1324. In some examples, the second part of the door may comprise at least an electronic visual display configured to display information (such as electronic visual display 1306, electronic visual display 1324 and electronic visual display 1342), and at least part of the electronic visual display may be configured to be visible to the customers at least when the door is open at a selected angle. For example, the at least part of the electronic visual display may be configured to be hidden from the customers when the door is closed. Some non-limiting examples of such retail storage container may include a cooler (such as a reach-in cooler, walk-in cooler, display cooler, countertop cooler, under-counter cooler, worktop cooler, chest cooler, merchandising cooler, etc.), a refrigerator unit (such as a reach-in refrigerator, display refrigerator, walk-in refrigerator, countertop refrigerator, under-counter refrigerator, worktop refrigerator, chest refrigerator, merchandising refrigerator, etc.), a freezer (such as a reach-in freezer, walk-in freezer, display freezer, countertop freezer, under-counter freezer, worktop freezer, chest freezer, merchandising freezer, etc.), a closet, enclosed storage unit with a door, shelving unit with a door, or any other unit configured to include at least one door and is configured to hold one or more products for sale in a retail establishment.

In one example, the information displayed by the electronic visual display may include promotional information. In another example, the information displayed by the electronic visual display may include instructions for a store associate. In yet another example, the information displayed by the electronic visual display may include elements of a user interface. In an additional example, the information displayed by the electronic visual display may include information related to products. In some examples, the information displayed by the electronic visual display may be controlled using one or more of methods 1700, 1800, 1900, 2000, 2100 and 2200, or using one or more of the steps of the above identified methods.

In some examples, the information displayed by the electronic visual display may be based on a person facing the retail storage container and/or on a person in a vicinity of the retail storage container. In one example, in response to a first person, first information may be presented by the electronic visual display, and in response to a second person, second information may be presented by the electronic visual display, the second information may differ from the first information. In another example, in response to a first person, first information may be presented by the electronic visual display, and in response to a second person, presenting the first information by the electronic visual display may be withheld. In one example, a determination of whether the person is a customer may be made (for example as described below), and the information displayed by the electronic visual display may be based on the determination of whether the person is a customer. In another example, a determination of whether the person is a store associate may be made (for example as described below), and the information displayed by the electronic visual display may be based on the determination of whether the person is a store associate. In yet another example, a determination of whether the person belongs to a particular group of people (such as a particular group of store associates, a particular group of customers, etc.) may be made (for example as described below), and the information displayed by the electronic visual display may be based on the determination of whether the person belongs to the particular group of people. In an additional example, demographic information of the person (such as age, gender, a socio-economic group, etc.) may be determined (for example as described below), and the information displayed by the electronic visual display may be based on the determined demographic information (for example, based on the determined age, based on the determined gender, based on the determined socio-economic group, and so forth). In another example, past behavior of the person may be determined (for example, one or more products picked by the person may be determined, a trajectory of the person may be determined, purchase history of the person may be determined, etc.), and the information displayed by the electronic visual display may be based on the determined past behavior of the person (for example, based on the one or more products picked by the person, based on the a trajectory of the person, based on purchase history of the person may, and so forth). In an additional example, an identity of the person may be determined (for example as described below), and the information displayed by the electronic visual display may be based on the determined identity of the person.

In some examples, the information displayed by the electronic visual display may be based on data related to products stored in the retail storage container. In one example, in response to first plurality of products stored in the retail storage container, first information may be presented by the electronic visual display, and in response to second plurality of products stored in the retail storage container, second information may be presented by the electronic visual display, the second information may differ from the first information. In another example, in response to first plurality of products stored in the retail storage container, first information may be presented by the electronic visual display, and in response to second plurality of products stored in the retail storage container, presenting the first information by the electronic visual display may be withheld. In one example, an inventory of products stored in the retail storage container may be determined (for example as described below), and the information displayed by the electronic visual display may be based on the determined inventory of products stored in the retail storage container. In another example, a type of a product stored in the retail storage container may be determined (for example as described below), and the information displayed by the electronic visual display may be based on the determined type of the product stored in the retail storage container. In yet another example, data related to facings of products stored in the retail storage container may be determined (for example as described below), and the information displayed by the electronic visual display may be based on the determined data related to the facings of the products stored in the retail storage container.

In some examples, the information displayed by the electronic visual display may be based on a label positioned in the retail storage container. In one example, in response to first label positioned in the retail storage container, first information may be presented by the electronic visual display, and in response to second label positioned in the retail storage container, second information may be presented by the electronic visual display, the second information may differ from the first information. In another example, in response to first label positioned in the retail storage container, first information may be presented by the electronic visual display, and in response to second label positioned in the retail storage container, presenting the first information by the electronic visual display may be withheld. In one example, a price displayed on the label may be determined, for example by analyzing an image of the label using OCR algorithms, and the information displayed by the electronic visual display may be based on the determined price displayed on the label. In another example, a product associated with the label may be determined (for example as described below), and the information displayed by the electronic visual display may be based on the determined product associated with the label. In yet another example, a visual code (such as a barcode, a QR code, a serial number, etc.) displayed on the label may be identified, for example by analyzing an image of the label using a visual code identification algorithm, and the information displayed by the electronic visual display may be based on the identified visual code displayed on the label. In an additional example, a product depicted on the label may be identified, for example by analyzing an image of the label using a visual object recognition algorithm, and the information displayed by the electronic visual display may be based on the identified product depicted on the label.

In some examples, the retail storage container may comprise an image sensor, such as an image sensor positioned within the retail storage container, and the second part of the door may further comprise a mirror configured to reflect towards the image sensor an image of at least a portion of an internal part of the retail storage container. In one example, the information displayed by the electronic visual display may be based on an analysis of the image reflected by the mirror and digitally captured using the image sensor, for example based on products and/or labels and/or textual information visible in the image. In one example, the image sensor may be configured to capture an image of a person facing the retail storage container when the door is open, and the information displayed by the electronic visual display may be based on an analysis of the image of the person facing the retail storage container. In one example, an indication that the door is closed may be received (for example, from a sensor connected to the door, from a sensor connected to the retail storage container, from an analysis of one or more images, etc.), and in response to the received indication, the image sensor may be caused to capture at least one image. In some examples, the retail storage container may comprise a shelf, and the mirror may be configured to reflect towards the image sensor an image of at least part of the shelf and of an area above the shelf. In one example, the mirror may be configured to reflect towards the image sensor an image of at least part of the shelf, an area above the shelf, and an area below the shelf In another example, the mirror may be configured to reflect towards the image sensor an image of at least part of the shelf, and at least part of one or more products positioned on the shelf. In yet another example, the mirror may be configured to reflect towards the image sensor an image of at least part of the shelf, at least part of one or more products positioned on the shelf, and at least part of one or more products positioned below the shelf. In an additional example, the mirror may be configured to reflect towards the image sensor an image of at least part of a label attached to the shelf.

In some examples, the second part of the door may further comprise an image sensor configured to capture at least one image of at least a portion of an internal part of the retail storage container. In one example, the information displayed by the electronic visual display may be based on an analysis of an analysis of the at least one image, for example based on products and/or labels and/or textual information visible in the at least one image. In one example, the image sensor may be configured to capture an image of a person facing the retail storage container when the door is open, and the information displayed by the electronic visual display may be based on an analysis of the image of the person facing the retail storage container. In one example, an indication that the door is closed may be received (for example, from a sensor connected to the door, from a sensor connected to the retail storage container, from an analysis of one or more images, etc.), and in response to the received indication, the image sensor may be caused to capture the at least one image. In some examples, the retail storage container may comprise a shelf, and the image sensor may be configured to capture an image of at least part of the shelf and/or of an area above the shelf. For example, the image sensor may be configured to capture an image of at least part of the shelf, an area above the shelf, and an area below the shelf. In another example, the image sensor may be configured to capture an image of at least part of the shelf, and at least part of one or more products positioned on the shelf. In yet another example, the image sensor may be configured to capture an image of at least part of the shelf, at least part of one or more products positioned on the shelf, and at least part of one or more products positioned below the shelf. In an additional example, the image sensor may be configured to capture an image of at least part of a label attached to the shelf.

In some examples, the retail storage container may comprise a shelf, a plurality of sensors may be positioned on the shelf and may be configured to be positioned between the shelf and products positioned on the shelf (for example as described in relation to FIGS. 8A, 8B and 9), and the information displayed by the electronic visual display may be based on an analysis of data captured using the plurality of sensors (for example as described below in relation to methods 1800, 1900 and 2100). In some examples, the retail storage container may comprise a shelf, a plurality of pressure sensors may be positioned on the shelf and may be configured to be positioned between the shelf and products positioned on the shelf, and the information displayed by the electronic visual display may be based on an analysis of pressure data captured using the plurality of pressure sensors (for example as described below in relation to methods 1800, 1900 and 2100). In some examples, the retail storage container may comprise a shelf, a plurality of touch sensors may be positioned on the shelf and may be configured to be positioned between the shelf and products positioned on the shelf, and the information displayed by the electronic visual display may be based on an analysis of touch data captured using the plurality of touch sensors (for example as described below in relation to methods 1800, 1900 and 2100). In some examples, the retail storage container may comprise a shelf, a plurality of light sensors may be positioned on the shelf and may be configured to be positioned between the shelf and products positioned on the shelf, and the information displayed by the electronic visual display may be based on an analysis of light data captured using the plurality of light sensors (for example as described below in relation to methods 1800, 1900 and 2100). In some examples, the retail storage container may comprise a shelf, and the information displayed by the electronic visual display may be based on an analysis of weight data captured using a weight sensor (for example as described below in relation to methods 1800, 1900 and 2100). For example, the weight sensor may be configured to measure a weight of at least one product placed on the shelf.

In some examples, an indication of a state of the door may be received, for example, from a sensor connected to the door, from a sensor connected to the retail storage container, from an analysis of one or more images, and so forth. Some non-limiting examples of such possible states of the door may include open, closed, partly open, open at a particular angle, open at an angle that is within a selected range of angles, partly open to a particular degree, partly open to a degree that is within a selected range of degrees, and so forth. In one example, in response to a first state of the door, the electronic visual display may be caused to display the information, and in response to a second state of the door, causing the electronic visual display to display the information may be forgone and/or withheld. In one example, in response to a first state of the door, the electronic visual display may be caused to display first information, and in response to a second state of the door, the electronic visual display may be caused to display second information, the second information may differ from the first information. In one example, an indication of whether the door is open may be received, in response to an indication that the door is open, the electronic visual display may be caused to display the information, and in response to an indication that the door is closed, causing the electronic visual display to display the information may be forgone and/or withheld. In one example, an indication of a degree of openness of the door may be received, in response to a first degree of openness of the door, the electronic visual display may be caused to display the information, and in response to a second degree of openness of the door, causing the electronic visual display to display the information may be forgone and/or withheld. In one example, an indication of whether the door is open may be received, and an adjustment to a power scheme of the electronic visual display may be caused based on the received indication. In one example, an indication of whether the door is open may be received, in response to an indication that the door is open, the electronic visual display may be caused to turn on, and in response to an indication that the door is closed, the electronic visual display may be caused to turn off. In one example, an indication of a degree of openness of the door may be received, in response to a first degree of openness of the door, the electronic visual display may be caused to turn on, and in response to a second degree of openness of the door, the electronic visual display may be caused to turn off.

In some examples, different determinations on a person may be made. For example a determination of whether the person is a customer may be made, a determination of whether the person is a store associate may be made, a determination of whether the person belongs to a particular group of people (such as a particular group of store associates, a particular group of customers, etc.) may be made, a determination of demographic information of the person (such as age, gender, a socio-economic group, etc.) may be made, a determination of past behavior of the person may be made (for example, one or more products picked by the person may be determined, a trajectory of the person may be determined, purchase history of the person may be determined, etc.), a determination of an identity of a person may be made, and so forth. In some examples, an image of the person may be analyzed, for example using a face recognition algorithm, to access a database comprising information on different people, and the accessed information may be used to make any of the above determinations on the person. In one example, such image may be captured from an environment of the retail store using an image sensor. In some examples, a wireless signal from a personal device of the person may be received, the wireless signal may include a unique identifier (such as a MAC address, a loyalty card number, an employee number, etc.) corresponding to the personal device and/or to the person, and the unique identifier may be used to access a database including a record with information related to the person, and the information related to the person may be used to make any of the above determinations on the person. In an additional information, a tracking algorithms (such as a visual tracking algorithm, a wireless signal tracking algorithm, etc.) may be used to determine past behavior of the person, such as locations within the retail store that the person visited, frequent, stopped by, and so forth. In yet another example, image analysis algorithm to determine sentiment and/or emotional state of the person from an image of the person. In an additional example, a wireless signal from a personal device of the person may be received, the wireless signal may include a record with information related to the person, and the information related to the person may be used to make any of the above determinations on the person. In an additional example, the different determinations on a person may be made using step 1706.

In some examples, information related to a label may be determined, such as a product related to the shelf label, a price associated with the shelf label, a brand associated with the shelf label, and so forth. For example, an image of the label may be analyzed using OCR to recognize text appearing on the label, and the text may include the information (for example, the product name, the brand name, the price, and so forth). In another example, an image of the label may be analyzed using a product recognition algorithm to identify a product from a depiction of at least part of the product on the label, and the identity of the product may be used to determine the product name, the corresponding brand name, the corresponding price, and so forth. In yet another example, an image of the label may be analyzed using a logo recognition algorithm to identify a brand from a logo appearing on the label, and the identified brand may be used to determine the brand name. In an additional example, an image of the label may be analyzed using a visual code reading algorithm to read a visual code appearing on the label (such as a barcode, a QR code, a serial number, etc.), and the read code may be used to access a record in a database including the information related to the label.

A door for a retail storage container with a transparent electronic visual display may enable providence of visual information to a person (such as a customer, a store associate, etc.) standing in front of the retail storage container. The provided information may be used to drive higher sales, to improve customers' experience, and to enhance in-store execution. The presentation of the information on selected regions of the transparent electronic visual display may create an overlay of information over the products and/or shelves in the retail storage container that are visible through the transparent electronic visual display, therefore visually associating the provided information with the overlaid products and/or shelves.

Figure 18:
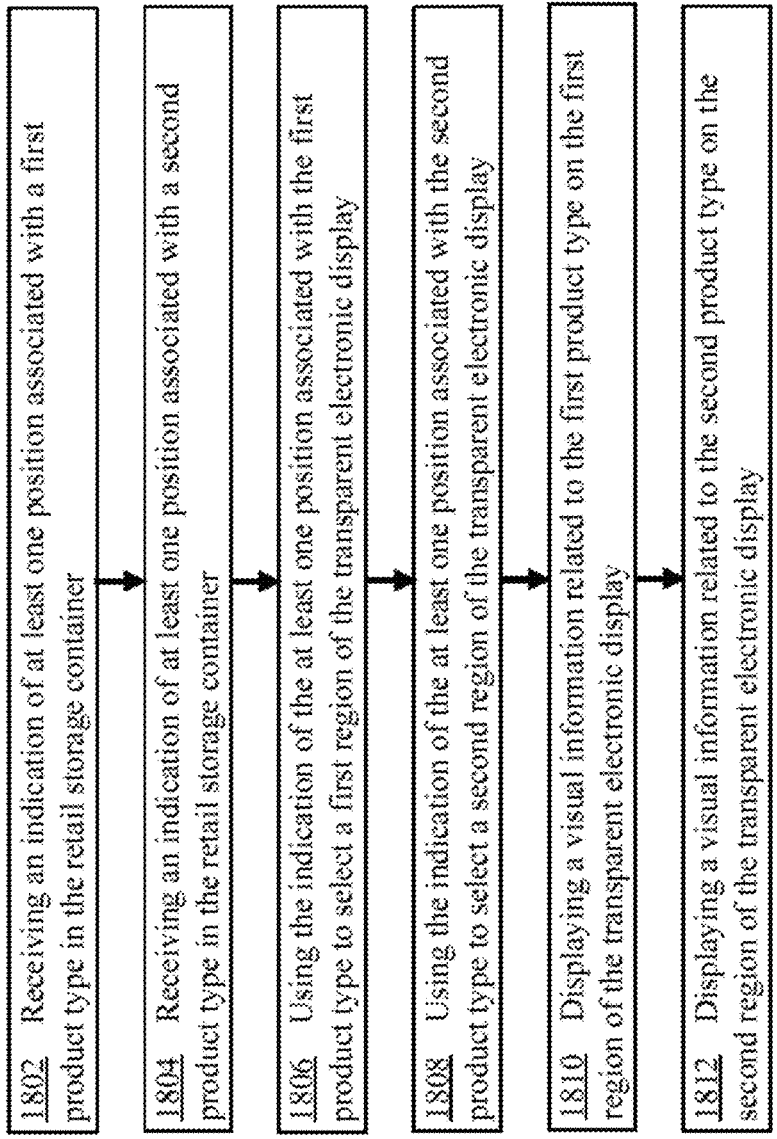
FIG. 18 provides a flowchart of an exemplary method for controlling information displayed on a transparent electronic visual display that is part of a door for a retail storage container, consistent with the present disclosure.

FIG. 18 provides a flowchart of an exemplary method 1800 for controlling information displayed on a transparent electronic visual display that is part of a door for a retail storage container, consistent with the present disclosure. In this example, method 1800 for controlling information displayed on a transparent electronic display that is part of a door for a retail storage container may comprise: receiving an indication of at least one position associated with a first product type in the retail storage container (step 1802); receiving an indication of at least one position associated with a second product type in the retail storage container (step 1804); using the indication of the at least one position associated with the first product type to select a first region of the transparent electronic display (step 1806); using the indication of the at least one position associated with the second product type to select a second region of the transparent electronic display (step 1808); displaying visual information related to the first product type on the first region of the transparent electronic display (step 1810); and displaying visual information related to the second product type on the second region of the transparent electronic display (step 1812). In one example, steps 1804, 1808 and 1812 may be omitted from method 1800.

In some examples, step 1802 may comprise receiving an indication of at least one position associated with a first product type in the retail storage container, and step 1804 may comprise receiving an indication of at least one position associated with a second product type in the retail storage container. The second product type may differ from the first product type. Some non-limiting examples of such indication of a position of a product may include any combination of one or more of a height indication, a vertical position indication, a horizontal position indication, a shelf indication, an indication of a position on the shelf, and so forth. For example, such indications of at least one position associated with a particular product type may be read from memory (for example, from memory 226 or from memory 1226), may be received from an external system (for example, using network interface 206), may be determined by analyzing images of the retail storage container (for example as described herein), may be determined by analyzing data captured using sensors positioned between a shelf in the retail storage container and products placed on the shelf (for example as described herein), and so forth.

In one example, the at least one position associated with the first product type may include a position of the first product type in a planogram, and/or the at least one position associated with the second product type may include a position of the second product type in the planogram. Further, in one example, the indication of the at least one position associated with the first product type received by step 1802 and the indication of the at least one position associated with the second product type received by step 1804 may be based on an analysis of the planogram.

In one example, the at least one position associated with the first product type may include an actual position of products of the first product type in the retail storage container, and/or the at least one position associated with the second product type may include an actual position of products of the second product type in the retail storage container. For example, the actual position of the products of the different product types may be determined by analyzing images of the products, by analyzing data captured using sensors positioned between a shelf in the retail storage container and products placed on the shelf, and so forth, for example as described herein.

In one example, the at least one position associated with the first product type may include a position of a label corresponding to the first product type in the retail storage container, and/or the at least one position associated with the second product type may include a position of a label corresponding to the second product type in the retail storage container. For example, the position of the labels corresponding to the product types may be determined by analyzing images of the labels to identify a location of the labels and/or correspondence of the labels to different product types, for example based on textual information presented on the labels (for example using OCR algorithms), based on visual code presented on the label (for example using visual code recognition algorithms), based on an image of the product (for example using product recognition algorithms), and so forth.

In one example, the at least one position associated with the first product type may include a position of an empty space dedicated to the first product type in the retail storage container, and/or the at least one position associated with the second product type may include a position of an empty space dedicated to the second product type in the retail storage container. For example, empty space dedicated to a product type may be identified by comparing the empty spaces in the retail storage container to a planogram and/or to a realogram. In one example, the empty spaces in the retail storage container may be identified by analyzing images of the retail storage container using a product detection algorithm to identify regions of the retail storage container that hold no products, by analyzing data captured using sensors (such as pressure sensors, touch sensors, light sensors, weight sensors, etc.) positioned on a shelf in the retail storage container, and so forth, for example as described herein.

In one example, the at least one position associated with the first product type may include a position at which products of the first product type were previously placed in the retail storage container and at which products of the first product type are not currently placed, and/or the at least one position associated with the second product type may include a position at which products of the second product type were previously placed in the retail storage container and at which products of the second product type are not currently placed. For example, a position at which products of a particular product type were previously placed in the retail storage container and at which products of the particular product type are not currently placed may be identified by analyzing images from the two point in time using product detection and/or recognition algorithms, by analyzing patterns in data captured using sensors (such as pressure sensors, touch sensors, light sensors, weight sensors, etc.) positioned between a shelf in the retail storage container and products placed on the shelf, and so forth, for example as described herein.

In one example, the indication of the at least one position associated with the first product type received by step 1802 may be based on an analysis of at least one image of products placed in the retail storage container, and/or the indication of the at least one position associated with the second product type received by step 1804 may be based on an analysis of the at least one image of products placed in the retail storage container. For example, product detection and/or recognition algorithms may be used to analyze the at least one image and identify to positions of products of different product types in the retail storage container.

In some examples, the retail storage container may comprise a shelf, a plurality of sensors may be positioned on the shelf and configured to be positioned between the shelf and products positioned on the shelf (for example as described in relation to FIGS. 8A, 8B and 9), the indication of the at least one position associated with the first product type received by step 1802 may be based on an analysis of data captured using the plurality of sensors (for example as described in relation to FIGS. 10A and 10B), and/or the indication of the at least one position associated with the second product type received by step 1804 may be based on an analysis of data captured using the plurality of sensors (for example as described in relation to FIGS. 10A and 10B). In one example, the retail storage container may comprise a shelf, a plurality of pressure sensors may be positioned on the shelf and may be configured to be positioned between the shelf and products positioned on the shelf, and the indication of the at least one position associated with the first product type received by step 1802 and/or the indication of the at least one position associated with the second product type received by step 1804 may be based on an analysis of pressure data captured using the plurality of pressure sensors. In some examples, the retail storage container may comprise a shelf, a plurality of touch sensors may be positioned on the shelf and may be configured to be positioned between the shelf and products positioned on the shelf, and the indication of the at least one position associated with the first product type received by step 1802 and/or the indication of the at least one position associated with the second product type received by step 1804 may be based on an analysis of touch data captured using the plurality of touch sensors. In some examples, the retail storage container may comprise a shelf, a plurality of light sensors may be positioned on the shelf and may be configured to be positioned between the shelf and products positioned on the shelf, and the indication of the at least one position associated with the first product type received by step 1802 and/or the indication of the at least one position associated with the second product type received by step 1804 may be based on an analysis of light data captured using the plurality of light sensors. In some examples, the retail storage container may comprise a shelf, and the indication of the at least one position associated with the first product type received by step 1802 may be based on an analysis of weight data captured using the weight sensor, the weight sensor may be configured to measure a weight of at least one product placed on at least part of the shelf.

In some examples, step 1806 may comprise using the indication of the at least one position associated with the first product type to select a first region of the transparent electronic display, and step 1808 may comprise using the indication of the at least one position associated with the second product type to select a second region of the transparent electronic display. The second region may differ from the first region. For example, the selection of the first region of the transparent electronic display by step 1806 may be configured to cause at least part of the displayed visual information related to the first product type to appear over at least part of the at least one position associated with the first product type when viewed from a particular viewing point, and the selection of the second region of the transparent electronic display by step 1808 may be configured to cause at least part of the displayed visual information related to the second product type to appear over at least part of the at least one position associated with the second product type when viewed from the particular viewing point. For example, geometrical analysis may be used to select a region of the transparent electronic display that is on a straight line connecting the particular viewing point and the corresponding at least one position associated with the corresponding product type. In another example, a predefined mapping of positions associated with product types to regions of the transparent electronic display may be used to select the region of the transparent electronic display corresponding to the product type based on the indication of the at least one position associated with the product type. The predefined mapping may be configured to select a region that causes visual information displayed in the selected region to appear over at least part of the at least one position associated with the corresponding product type when viewed from the particular viewing point.

In some examples, an indication of a state of the door may be received, for example, from a sensor connected to the door, from a sensor connected to the retail storage container, from an analysis of one or more images, and so forth. Some non-limiting examples of such possible states of the door may include open, closed, partly open, open at a particular angle, open at an angle that is within a selected range of angles, partly open to a particular degree, partly open to a degree that is within a selected range of degrees, and so forth. In some examples, the selection of the first region of the transparent electronic display by step 1806 and the selection of the second region of the transparent electronic display by step 1808 may be based on the state of the door. For example, in response to a first received indication of the state of the door, step 1806 may select one region as the first region of the transparent electronic display, and in response to a second received indication of the state of the door, step 1806 may select a different region as the first region of the transparent electronic display. In one example, an indication of whether the door is open may be received, in response to an indication that the door is open, step 1806 may select one region as the first region of the transparent electronic display, and in response to an indication that the door is closed, step 1806 may select a different region as the first region of the transparent electronic display. In one example, an indication of a degree of openness of the door may be received, in response to a first degree of openness of the door, step 1806 may select one region as the first region of the transparent electronic display, and in response to a second degree of openness of the door, step 1806 may select a different region as the first region of the transparent electronic display.

In some examples, the selection of the first region of the transparent electronic display by step 1806 and the selection of the second region of the transparent electronic display by step 1808 may be based on a person facing the retail storage container, for example on a height of the person, on a position of a face of the person, on a position of at least one eye of the person, on an orientation of a face of the person, on a direction of a gaze of the person, and so forth. For example, the particular viewing point discussed above may be selected based on a height of the person, on a position of a face of the person, on a position of at least one eye of the person, on an orientation of a face of the person, on a direction of a gaze of the person, and so forth. In one example, in response to one posture of the person facing the retail storage container, step 1806 may select one region of the transparent electronic display, and in response to a different posture of the person facing the retail storage container, step 1806 may select a different region of the transparent electronic display.

In some examples, step 1810 may comprise displaying visual information related to the first product type on the first region of the transparent electronic display, and step 1812 may comprise displaying visual information related to the second product type on the second region of the transparent electronic display. Some non-limiting examples of such visual information related to a product type may include a visual indication of a price corresponding to the product type, a visual indication of a name corresponding to the product type (such as a name of the product type, a brand name corresponding to the product type, and so forth), a promotion corresponding to the product type, an indication of a need to restock the product type in the retail storage container, an indication of a need to remove products of the product type from the retail storage container, an indication of a need to collect products of the product type from the retail storage container, an indication of a need to handle a label corresponding to the product type in the retail storage container, and so forth. For example, the visual information related to the first product type displayed by step 1810 may include a price corresponding to the first product type, and/or the visual information related to the second product type displayed by step 1812 may include a price corresponding to the second product type. In another example, the visual information related to the first product type displayed by step 1810 may include a name corresponding to the first product type (such as a name of the first product type, a brand name corresponding to the first product type, and so forth), and/or the visual information related to the second product type displayed by step 1810 may include a name corresponding to the second product type (such as a name of the second product type, a brand name corresponding to the second product type, and so forth). In yet another example, the visual information related to the first product type displayed by step 1810 may include a promotion corresponding to the first product type, and/or the visual information related to the second product type displayed by step 1812 may include a promotion corresponding to the second product type. In an additional example, the visual information related to the first product type displayed by step 1810 may include an indication of a need to restock the first product type in the retail storage container, and/or the visual information related to the second product type displayed by step 1812 may include an indication of a need to reposition products of the first product type in the retail storage container. In another example, the visual information related to the first product type displayed by step 1810 may include an indication of a need to remove products of the first product type from the retail storage container, and/or the visual information related to the second product type displayed by step 1812 may include an indication of a need to remove products of the second product type from the retail storage container. In yet another example, the visual information related to the first product type displayed by step 1810 may include an indication of a need to collect products of the first product type from the retail storage container, and/or the visual information related to the second product type displayed by step 1812 may include an indication of a need to collect products of the second product type from the retail storage container. In an additional example, the visual information related to the first product type displayed by step 1810 may include an indication of a need to handle a label corresponding to the first product type in the retail storage container, and/or the visual information related to the second product type displayed by step 1812 may include an indication of a need to handle a label corresponding to the second product type in the retail storage container. In some examples, step 1810 may select the visual information related to the first product type for display and/or step 1812 may select the visual information related to the second product type for display using method 1700. In some examples, step 1810 may determine whether to display the visual information related to the first product type and/or step 1812 may determine whether to display the visual information related to the second product type using method 1900 and/or method 2100. In some examples, step 1810 may select display parameters for the display of the visual information related to the first product type and/or step 1812 may select display parameters for the display of the visual information related to the second product type using method 2000 and/or method 2200.

In some examples, the retail storage container may comprise a shelf, a plurality of sensors may be positioned on the shelf and may be configured to be positioned between the shelf and products positioned on the shelf (for example as described in relation to FIGS. 8A, 8B and 9), and the visual information related to the first product type displayed by step 1810 may be based on an analysis of data captured using the plurality of sensors, and/or the visual information related to the second product type displayed by step 1812 may be based on the analysis of data captured using the plurality of sensors, for example as described herein. In one example, the data captured using the plurality of sensors may be analyzed using step 1704. In one example, types of products, positions of products, facings of products, inventory, etc. may be identified by analyzing the data captured using the plurality of sensors, as described above, and the displayed visual information related to a product type may be based on such identified information, for example as described below. In one example, the retail storage container may comprise a shelf, a plurality of pressure sensors may be positioned on the shelf and may be configured to be positioned between the shelf and products positioned on the shelf, and the visual information related to the first product type displayed by step 1810 and/or the visual information related to the second product type displayed by step 1812 may be based on an analysis of pressure data captured using the plurality of pressure sensors. In one example, the retail storage container may comprise a shelf, a plurality of touch sensors may be positioned on the shelf and may be configured to be positioned between the shelf and products positioned on the shelf, and the visual information related to the first product type displayed by step 1810 and/or the visual information related to the second product type displayed by step 1812 may be based on an analysis of touch data captured using the plurality of touch sensors. In one example, the retail storage container may comprise a shelf, a plurality of light sensors may be positioned on the shelf and configured to be positioned between the shelf and products positioned on the shelf, and the visual information related to the first product type displayed by step 1810 and/or the visual information related to the second product type displayed by step 1812 may be based on an analysis of light data captured using the plurality of light sensors. In one example, the retail storage container may comprise a shelf, and the visual information related to the first product type displayed by step 1810 and/or the visual information related to the second product type displayed by step 1812 may be based on an analysis of weight data captured using the weight sensor. For example, the weight sensor may be configured to measure a weight of at least one product placed on the shelf.

In some examples, the visual information related to the first product type displayed by step 1810 and/or the visual information related to the second product type displayed by step 1812 may be based on an analysis of at least one image of products placed in the retail storage container, for example as described above. In one example, the at least one image of products placed in the retail storage container may be captured using an image sensor connected to the retail storage container, using an image sensor connected to a door of the retail storage container, using a mirror connected to a door of the retail storage container (as described above), and so forth. In one example, the at least one image of products placed in the retail storage container may be received using step 1702. In one example, the at least one image of products placed in the retail storage container may be analyzed using step 1704. In one example, types of products, positions of products, condition of products, facings of products, inventory, etc. may be identified by analyzing the at least one image, as described above, and the displayed visual information related to a product type may be based on such identified information, for example as described below.

In some examples, the visual information related to the first product type displayed by step 1810 may be based on an amount of products of the first product type placed in the retail storage container and/or the visual information related to the second product type displayed by step 1812 may be based on an amount of products of the second product type placed in the retail storage container. For example, in response to a first amount of products of a particular product type placed in the retail storage container, first visual information related to the particular product type may be displayed, and in response to a second amount of products of a particular product type placed in the retail storage container, second visual information related to the particular product type may be displayed, the second visual information may differ from the first visual information. In another example, in response to a first amount of products of a particular product type placed in the retail storage container, first visual information related to the particular product type may be displayed, and in response to a second amount of products of a particular product type placed in the retail storage container, displaying the first visual information may be forgone and/or withheld. In one example, an amount of products of the first product type in the retail storage container may be obtained (for example, by analyzing at least one image of the product, by analyzing data captured using a plurality of sensors positioned between the shelf and products positioned on the shelf, using any of the methods described herein, etc.), the amount of products of the first product type in the retail storage container may be compared with a selected threshold, in response to a first result of the comparison, step 1810 may display first visual information related to the first product type, and in response to a second result of the comparison, step 1810 may display second visual information related to the first product type, the second visual information may differ from the first visual information.

In some examples, the visual information related to the first product type displayed by step 1810 may be based on facings of the first product type in the retail storage container and/or the visual information related to the second product type displayed by step 1812 may be based on facings of the second product type in the retail storage container. For example, in response to a first facings configuration of a particular product type in the retail storage container, first visual information related to the particular product type may be displayed, and in response to a second facings configuration of the particular product type in the retail storage container, second visual information related to the particular product type may be displayed, the second visual information may differ from the first visual information. In another example, in response to a first facings configuration of a particular product type in the retail storage container, first visual information related to the particular product type may be displayed, and in response to a second facings configuration of the particular product type in the retail storage container, displaying the first visual information may be forgone and/or withheld.

In some examples, the visual information related to the first product type displayed by step 1810 may be based on an information presented on a label corresponding to the first product type and/or the visual information related to the second product type displayed by step 1812 may be based on information presented on a label corresponding to the second product type. For example, in response to a first information presented on a label corresponding to a particular product type, first visual information related to the particular product type may be displayed, and in response to a second information presented on the label corresponding to the particular product type, second visual information related to the particular product type may be displayed, the second visual information may differ from the first visual information. In another example, in response to a first information presented on a label corresponding to a particular product type, first visual information related to the particular product type may be displayed, and in response to a second information presented on the label corresponding to the particular product type, displaying the first visual information may be forgone and/or withheld.

In some examples, the visual information related to the first product type displayed by step 1810 may be based on a price corresponding to the first product type and/or the visual information related to the second product type displayed by step 1812 may be based on a price corresponding to the second product type. For example, in response to a first price corresponding to a particular product type, first visual information related to the particular product type may be displayed, and in response to a second price corresponding to the particular product type, second visual information related to the particular product type may be displayed, the second visual information may differ from the first visual information. In another example, in response to a first a price corresponding to a particular product type, first visual information related to the particular product type may be displayed, and in response to a second price corresponding to the particular product type, displaying the first visual information may be forgone and/or withheld.

In some examples, the visual information related to the first product type displayed by step 1810 may be based on the first region of the transparent electronic display selected by step 1806 and/or the visual information related to the second product type displayed by step 1812 may be based on the second region of the transparent electronic display selected by step 1808. For example, in response to a first selection of the first region of the transparent electronic display selected by step 1806, first visual information related to the particular product type may be displayed, and in response to a second selection of the first region of the transparent electronic display selected by step 1806, second visual information related to the particular product type may be displayed, the second visual information may differ from the first visual information. In another example, in response to a first selection of the first region of the transparent electronic display selected by step 1806, first visual information related to the particular product type may be displayed, and in response to a second selection of the first region of the transparent electronic display selected by step 1806, displaying the first visual information may be forgone and/or withheld.

In some examples, the visual information related to the first product type displayed by step 1810 may be based on the at least one position associated with the first product type in the retail storage container (for example as indicated by the indication received by step 1802) and/or the visual information related to the second product type displayed by step 1812 may be based on the at least one position associated with the second product type in the retail storage container (for example as indicated by the indication received by step 1804). For example, in response to a first indication of the at least one position associated with the first product type in the retail storage container received by step 1802, first visual information related to the particular product type may be displayed, and in response to a second indication of the at least one position associated with the first product type in the retail storage container received by step 1802, second visual information related to the particular product type may be displayed, the second visual information may differ from the first visual information. In another example, in response to a first indication of the at least one position associated with the first product type in the retail storage container received by step 1802, first visual information related to the particular product type may be displayed, and in response to a second indication of the at least one position associated with the first product type in the retail storage container received by step 1802, displaying the first visual information may be forgone and/or withheld.

In some examples, the visual information related to the first product type displayed by step 1810 and/or the visual information related to the second product type displayed by step 1812 may be based on a person facing the retail storage container. For example, in response to a first person facing the retail storage container, first visual information related to a particular product type may be displayed, and in response to a second person facing the retail storage container, second visual information related to the particular product type may be displayed, the second visual information may differ from the first visual information. In another example, in response to a first person facing the retail storage container, first visual information related to a particular product type may be displayed, and in response to a second person facing the retail storage container, displaying the first visual information may be forgone and/or withheld.

Providing selected visual information to a person (such as a customer, a store associate, etc.) may be used to drive higher sales, to improve customers' experience, and to enhance in-store execution. Correct selection of the information and correct selection of the visual appearance of the information may help obtaining these objectives.

Figure 19:
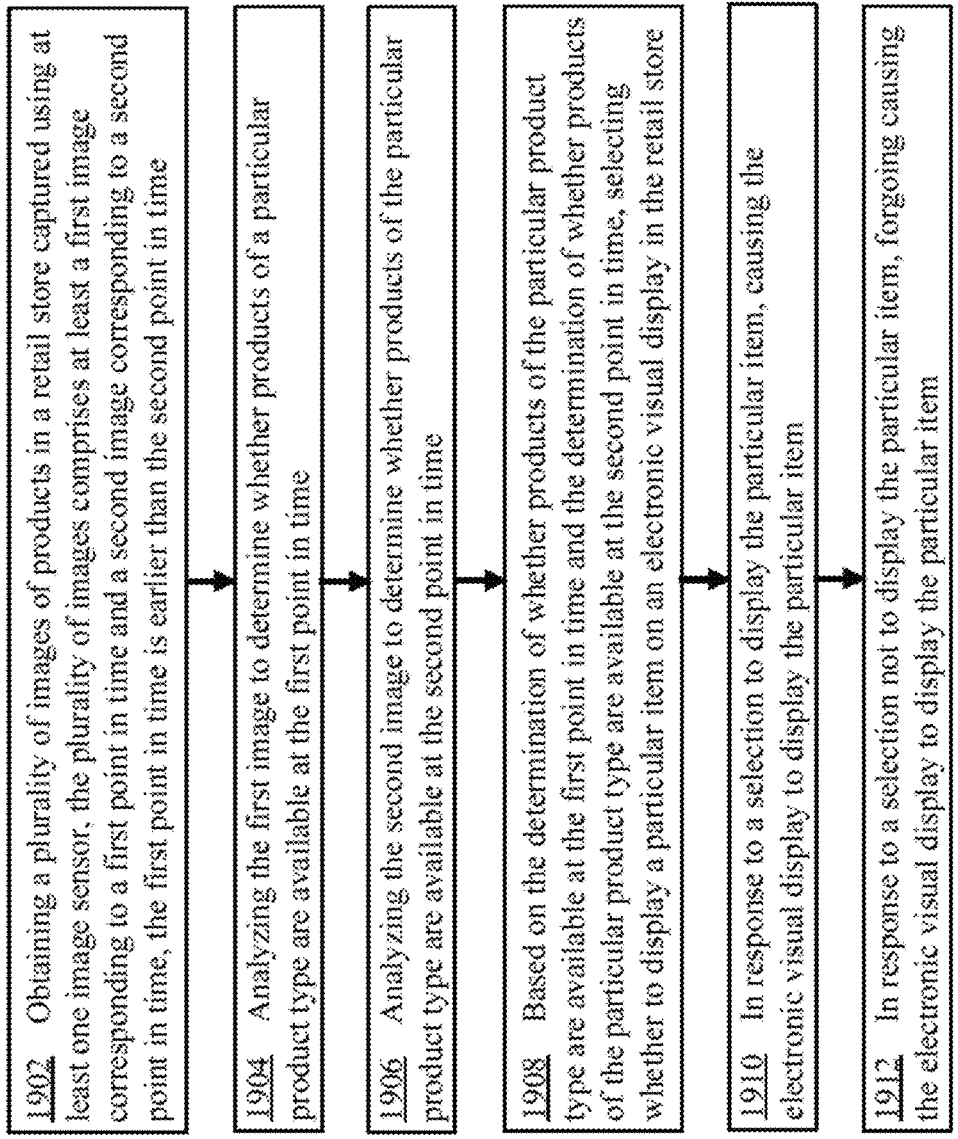
FIG. 19 provides a flowchart of an exemplary method for selecting items for presentation on electronic visual displays in retail stores, consistent with the present disclosure.

FIG. 19 provides a flowchart of an exemplary method 1900 for selecting items for presentation on electronic visual displays in retail stores, consistent with the present disclosure. In this example, method 1900 for selecting items for presentation on electronic visual displays in retail stores may comprise: obtaining a plurality of images of products in a retail store captured using at least one image sensor (step 1902), the plurality of images may comprise at least a first image corresponding to a first point in time and a second image corresponding to a second point in time, the first point in time is earlier than the second point in time; analyzing the first image to determine whether products of a particular product type are available at the first point in time (step 1904); analyzing the second image to determine whether products of the particular product type are available at the second point in time (step 1906); selecting whether to display a particular item on an electronic visual display in the retail store (step 1908), for example based on the determination of whether products of the particular product type are available at the first point in time and the determination of whether products of the particular product type are available at the second point in time; in response to a selection to display the particular item, causing the electronic visual display to display the particular item (step 1910); and in response to a selection not to display the particular item, forgoing causing the electronic visual display to display the particular item (step 1912). In some examples, step 1902 and/or step 1904 and/or step 1906 may be omitted from method 1900, the determination of whether products of the particular product type are available at the first point in time and/or the determination of whether products of the particular product type are available at the second point in time may be based on an analysis of data captured using a plurality of sensors positioned on the shelf and configured to be positioned between the shelf and products positioned on the shelf (for example as described in relation to FIGS. 8A, 8B and 9), for example as described herein.

Figure 20:
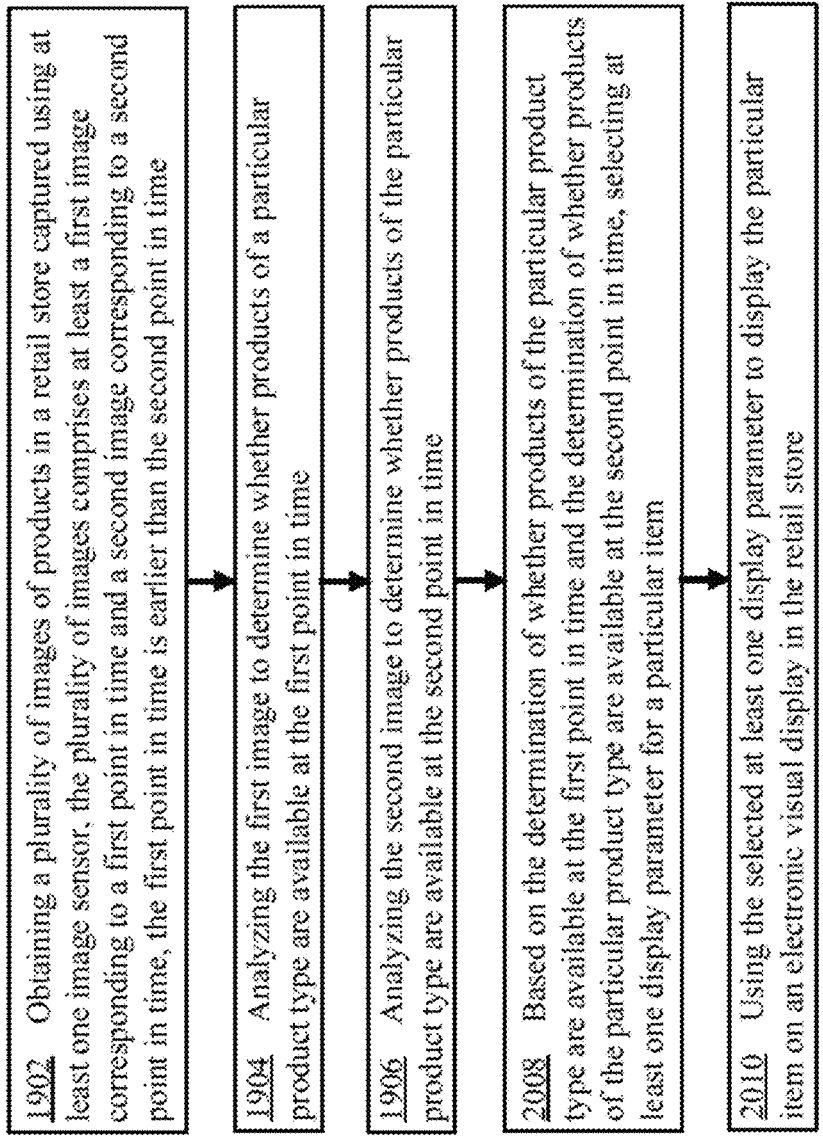
FIG. 20 provides a flowchart of an exemplary method for customized presentation of items on electronic visual displays in retail stores, consistent with the present disclosure.

FIG. 20 provides a flowchart of an exemplary method 2000 for customized presentation of items on electronic visual displays in retail stores, consistent with the present disclosure. In this example, method 2000 for customized presentation of items on electronic visual displays in retail stores may comprise: obtaining a plurality of images of products in a retail store captured using at least one image sensor (step 1902), the plurality of images may comprise at least a first image corresponding to a first point in time and a second image corresponding to a second point in time, the first point in time is earlier than the second point in time; analyzing the first image to determine whether products of a particular product type are available at the first point in time (step 1904); analyzing the second image to determine whether products of the particular product type are available at the second point in time (step 1906); selecting at least one display parameter for a particular item (step 2008), for example based on the determination of whether products of the particular product type are available at the first point in time and the determination of whether products of the particular product type are available at the second point in time; and using the selected at least one display parameter to display the particular item on an electronic visual display in the retail store (step 2010). In some examples, step 1902 and/or step 1904 and/or step 1906 may be omitted from method 2000, the determination of whether products of the particular product type are available at the first point in time and/or the determination of whether products of the particular product type are available at the second point in time may be based on an analysis of data captured using a plurality of sensors positioned on the shelf and configured to be positioned between the shelf and products positioned on the shelf (for example as described in relation to FIGS. 8A, 8B and 9), for example as described herein.

Figure 21:
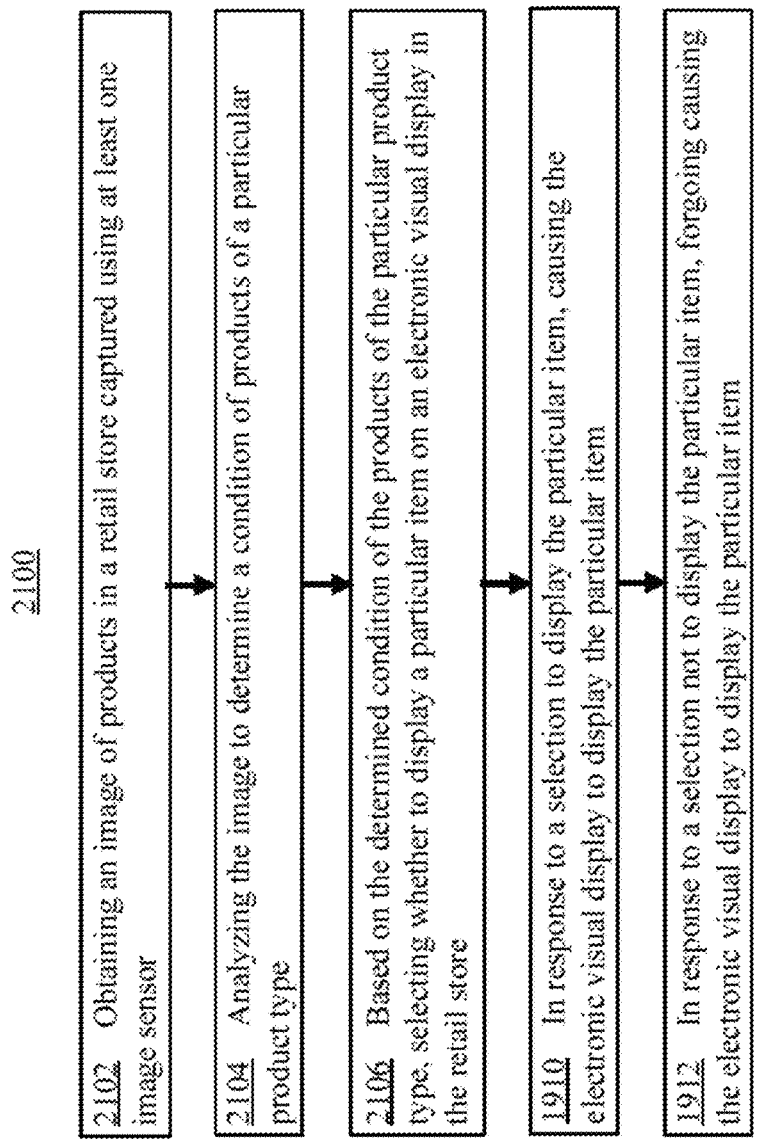
FIG. 21 provides a flowchart of an exemplary method for selecting items for presentation on electronic visual displays in retail stores, consistent with the present disclosure.

FIG. 21 provides a flowchart of an exemplary method 2100 for selecting items for presentation on electronic visual displays in retail stores, consistent with the present disclosure. In this example, method 2100 for selecting items for presentation on electronic visual displays in retail stores may comprise: obtaining an image of products in a retail store captured using at least one image sensor (step 2102); analyzing the image to determine a condition of products of a particular product type (step 2104); selecting whether to display a particular item on an electronic visual display in the retail store (step 2106), for example based on the determined condition of the products of the particular product type; in response to a selection to display the particular item, causing the electronic visual display to display the particular item (step 1910); and in response to a selection not to display the particular item, forgoing causing the electronic visual display to display the particular item (step 1912).

Figure 22:
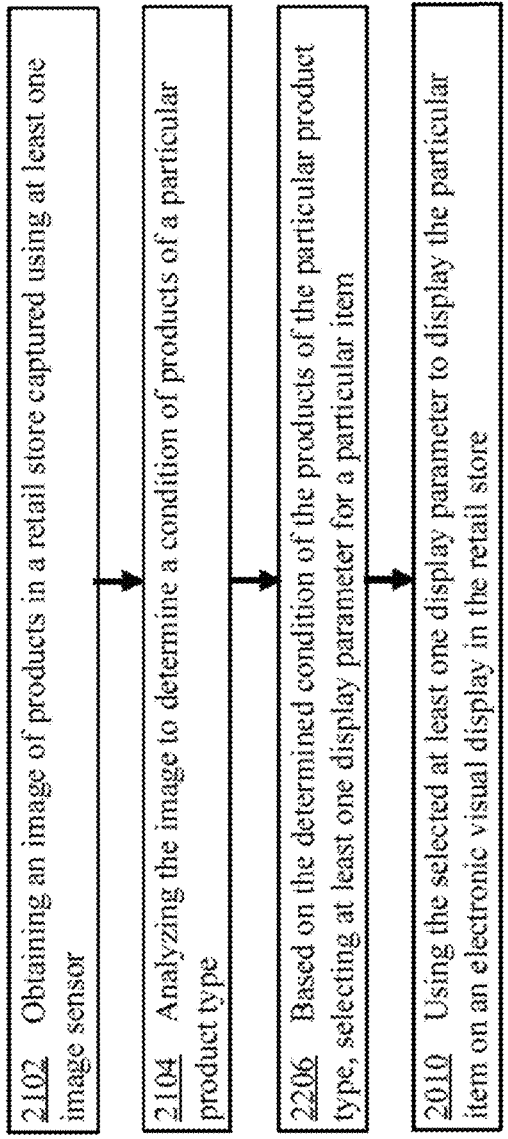
FIG. 22 provides a flowchart of an exemplary method for customized presentation of items on electronic visual displays in retail stores, consistent with the present disclosure.

FIG. 22 provides a flowchart of an exemplary method 2200 for customized presentation of items on electronic visual displays in retail stores, consistent with the present disclosure. In this example, method 2200 for customized presentation of items on electronic visual displays in retail stores may comprise: obtaining an image of products in a retail store captured using at least one image sensor (step 2102); analyzing the image to determine a condition of products of a particular product type (step 2104); selecting at least one display parameter for a particular item (step 2206), for example based on the determined condition of the products of the particular product type; and using the selected at least one display parameter to display the particular item on an electronic visual display in the retail store (step 2010).

Some non-limiting examples of the at least one display parameter (for example, of method 2000, of method 2200, of step 2008, of step 2010, of step 2206, etc.) may include a display size for the particular item, a motion pattern for the particular item, a display position on the electronic visual display for the particular item, a color scheme for the particular item, a color scheme for a background of the particular item, a brightness for the particular item, a contrast for the particular item, a font for the particular item, a presentation time for the particular item, and so forth.

Some non-limiting examples of the particular item (for example, of method 1900, of method 2000, of method 2100, of method 2200, step 1908, step 1910, step 1912, step 2008, step 2010, step 2106, step 2206, etc.) may include an indication of the particular product type, a price corresponding to the particular product type, a name corresponding to the particular product type, (such as a name of the particular product type, a brand name corresponding to the particular product type, etc.), a promotion corresponding to the particular product type, a depiction of at least part of a product of the particular product type, and so forth. In one example, the particular item of method 2100 and/or method 2200 may include an indication of the condition of the products of the particular product type, for example of the condition of the products of the particular product type determined by step 2104.

In some non-limiting examples, a particular product type may be considered available when products of the particular product type are available for sale in the retail store, when products of the particular product type are available for display in the retail store, when products of the particular product type are present at selected location within the retail store (for example, at a selected part of a shelf, at a selected shelf, at a selected part of a shelving unit, at a selected shelving unit, at a select part of a display, at a selected display, at a selected part of a retail storage container, at a selected retail storage container, etc.), and so forth.

In some examples, step 1902 may comprise obtaining a plurality of images of products in a retail store captured using at least one image sensor. The plurality of images obtained by step 1902 may comprise at least a first image corresponding to a first point in time and a second image corresponding to a second point in time. The first point in time may be earlier than the second point in time. For example, at least part of the plurality of images may be read from memory (for example, from memory 226 or from memory 1226), may be received from an external system (for example, using network interface 206), may be captured using image sensors (for example, using capturing device 125), and so forth.

In some examples, step 1904 may comprise analyzing the first image obtained by step 1902 to determine whether products of a particular product type are available at the first point in time, and step 1906 may comprise analyzing the second image obtained by step 1902 to determine whether products of the particular product type are available at the second point in time. In some examples, the plurality of images obtained by step 1902 may further comprise a preceding image corresponding to a preceding point in time, the preceding point in time may be earlier than the first point in time, and the preceding image may be analyzed to determine whether products of the particular product type are available at the preceding point in time. For example, a machine learning model may be trained using training examples to determine whether products of a particular product type are available from an image, and the trained machine learning model may be used to analyze an image and determine whether products of the particular product type are available at the point in time corresponding to the image. For example, step 1904 may use the trained machine learning model to analyze the first image obtained by step 1902 and to determine whether products of a particular product type are available at the first point in time, step 1906 may use the trained machine learning model to analyze the second image obtained by step 1902 and to determine whether products of a particular product type are available at the second point in time, and the trained machine learning model may be used to analyze the preceding image and to determine whether products of a particular product type are available at the preceding point in time. An example of such training example may include an image, together with a label indicating whether products of a selected product type are available. In another example, an artificial neural network (such as a deep neural network, a convolutional neural network, etc.) may be configured to determine whether products of a particular product type are available from an image, and the artificial neural network may be used to analyze an image and determine whether products of the particular product type are available at the point in time corresponding to the image.

In some examples, an electronic visual display (such as the electronic visual display of method 1700, of method 1900, of method 2000, of method 2100, of method 2200, of FIG. 16A-16F, etc.) may be connected to a shelf in the retail store. In one example, determining whether products of the particular product type are available at the first point in time (for example by step 1904) may include determining whether products of the particular product type are available at the first point in time on the shelf, and/or determining whether products of the particular product type are available at the second point in time (for example by step 1906) may include determining whether products of the particular product type are available at the second point in time on the shelf. In another example, determining whether products of the particular product type are available at the first point in time (for example by step 1904) may include determining whether products of the particular product type are available at the first point in time under the shelf, and/or determining whether products of the particular product type are available at the second point in time (for example by step 1906) may include determining whether products of the particular product type are available at the second point in time under the shelf.

In some examples, an electronic visual display (such as the electronic visual display of method 1700, of method 1800, of method 1900, of method 2000, of method 2100, of method 2200, of FIG. 13A-13C, of FIG. 14A-14F, of FIG. 15A-15H, etc.) may be connected to a door of a retail storage container in the retail store. In one example, determining whether products of the particular product type are available at the first point in time (for example by step 1904) may include determining whether products of the particular product type are available at the first point in time in the retail storage container, and/or determining whether products of the particular product type are available at the second point in time (for example by step 1906) may include determining whether products of the particular product type are available at the second point in time in the retail storage container.

Additionally or alternatively to step 1902, method 1900 and/or method 2000 may comprise obtaining data captured at the first point in time using a plurality of sensors positioned on a shelf in the retail store and configured to be positioned between the shelf and products positioned on the shelf (for example as described in relation to FIGS. 8A, 8B and 9), and/or obtaining data captured at the second point in time using the plurality of sensors. Further, additionally or alternatively to step 1904, method 1900 and/or method 2000 may comprise basing the determination of whether products of the particular product type are available at the first point in time on an analysis of the data captured at the first point in time using the plurality of sensors. Further, additionally or alternatively to step 1906, method 1900 and/or method 2000 may comprise basing the determination of whether products of the particular product type are available at the second point in time on an analysis of the data captured at the second point in time using the plurality of sensors. Some non-limiting examples of such sensors may include pressure sensors, touch sensors, light sensors, weight sensors, electrical impedance sensors, and so forth. For example, a machine learning model may be trained using training examples to determine whether products of the particular product type are available from data captured using the plurality of sensors, and the trained machine learning model may be used to analyze the data captured at a particular point in time using the plurality of sensors to determine whether products of the particular product type are available at the particular point in time. An example of such training example may include data captured using the plurality of sensors, together with a label indicating whether products of the particular product type are available. In another example, an artificial neural network (such as a deep neural network, a convolutional neural network, etc.) may be configured to determine whether products of the particular product type are available from data captured using the plurality of sensors, and the artificial neural network may be used to analyze the data captured at a particular point in time using the plurality of sensors to determine whether products of the particular product type are available at the particular point in time. In one example, pressure data captured at the first point in time using a plurality of pressure sensors positioned on a shelf in the retail store and configured to be positioned between the shelf and products positioned on the shelf may be obtained, pressure data captured at the second point in time using the plurality of pressure sensors may be obtained, the determination of whether products of the particular product type are available at the first point in time may be based on an analysis of the pressure data captured at the first point in time using the plurality of pressure sensors (for example as described above), and the determination of whether products of the particular product type are available at the second point in time may be based on an analysis of the pressure data captured at the second point in time using the plurality of pressure sensors (for example as described above). In one example, touch data captured at the first point in time using a plurality of touch sensors positioned on a shelf in the retail store and configured to be positioned between the shelf and products positioned on the shelf may be obtained, touch data captured at the second point in time using the plurality of touch sensors may be obtained, the determination of whether products of the particular product type are available at the first point in time may be based on an analysis of the touch data captured at the first point in time using the plurality of touch sensors (for example as described above), and the determination of whether products of the particular product type are available at the second point in time may be based on an analysis of the touch data captured at the second point in time using the plurality of touch sensors (for example as described above). In one example, light data captured at the first point in time using a plurality of light sensors positioned on a shelf in the retail store and configured to be positioned between the shelf and products positioned on the shelf may be obtained, light data captured at the second point in time using the plurality of light sensors may be obtained, the determination of whether products of the particular product type are available at the first point in time may be based on an analysis of the light data captured at the first point in time using the plurality of light sensors (for example as described above), and the determination of whether products of the particular product type are available at the second point in time may be based on an analysis of the light data captured at the second point in time using the plurality of light sensors (for example as described above). In some examples, weight data captured at the first point in time using a weight sensor corresponding to at least part of a shelf in the retail store may be obtained, weight data captured at the second point in time using the weight sensor may be obtained, the determination of whether products of the particular product type are available at the first point in time may be based on an analysis of the weight data captured at the first point in time using the weight sensor (for example as described above), and the determination of whether products of the particular product type are available at the second point in time may be based on an analysis of the weight data captured at the second point in time using the weight sensor (for example as described above). For example, the weight sensor may be configured to measure a weight of at least one product placed on the shelf.

In some examples, step 1908 may comprise selecting whether to display a particular item on an electronic visual display in the retail store, for example based on the determination of whether products of the particular product type are available at the first point in time (for example of step 1904, based on the analysis of the data captured using the plurality of sensors positioned on a shelf in the retail store and configured to be positioned between the shelf and products positioned on the shelf, etc.) and/or on the determination of whether products of the particular product type are available at the second point in time (for example of step 1906, based on the analysis of the data captured using the plurality of sensors positioned on a shelf in the retail store and configured to be positioned between the shelf and products positioned on the shelf, and so forth). In one example, in response to a determination that products of the particular product type are missing at the first point in time (for example by step 1904, based on the analysis of the data captured using the plurality of sensors, etc.) and a determination that products of the particular product type are missing at the second point in time (for example by step 1906, based on the analysis of the data captured using the plurality of sensors, etc.), step 1908 may select not to display the particular item on the electronic visual display in the retail store, and in response to at least one of a determination that products of the particular product type are available at the first point in time (for example by step 1904, based on the analysis of the data captured using the plurality of sensors, etc.) and a determination that products of the particular product type are available at the second point in time (for example by step 1906, based on the analysis of the data captured using the plurality of sensors, etc.), step 1908 may select to display the particular item on the electronic visual display in the retail store, for example where the particular item may include an indication of the particular product type. In another example, in response to a determination that products of the particular product type are missing at the first point in time (for example by step 1904, based on the analysis of the data captured using the plurality of sensors, etc.) and a determination that products of the particular product type are missing at the second point in time (for example by step 1906, based on the analysis of the data captured using the plurality of sensors, etc.), step 1908 may select to display the particular item on the electronic visual display in the retail store, and in response to at least one of a determination that products of the particular product type are available at the first point in time (for example by step 1904, based on the analysis of the data captured using the plurality of sensors, etc.) and a determination that products of the particular product type are available at the second point in time (for example by step 1906, based on the analysis of the data captured using the plurality of sensors, etc.), step 1908 may select not to display the particular item on the electronic visual display in the retail store, for example where the particular item may include an indication of a prolong shortage of the particular product type.

In some examples, the plurality of images obtained by step 1902 may further comprise a preceding image corresponding to a preceding point in time, the preceding point in time may be earlier than the first point in time, and the preceding image may be analyzed to determine whether products of the particular product type are available at the preceding point in time, for example as described above. Further, step 1908 may further base the selection of whether to display the particular item on the electronic visual display in the retail store on the determination of whether products of particular product type are available at the preceding point in time. In one example, in response to a determination that products of the particular product type are missing at the preceding point in time, a determination that products of the particular product type are available at the first point in time (for example by step 1904, based on the analysis of the data captured using the plurality of sensors, etc.) and a determination that products of the particular product type are missing at the second point in time (for example by step 1906, based on the analysis of the data captured using the plurality of sensors, etc.), step 1908 may select not to display the particular item on the electronic visual display in the retail store, and in response to a determination that products of the particular product type are available at the preceding point in time, the determination that products of the particular product type are available at the first point in time (for example by step 1904, based on the analysis of the data captured using the plurality of sensors, etc.) and the determination that products of the particular product type are missing at the second point in time (for example by step 1906, based on the analysis of the data captured using the plurality of sensors, etc.), step 1908 may select to display the particular item on the electronic visual display in the retail store. In another example, in response to a determination that products of the particular product type are missing at the preceding point in time, a determination that products of the particular product type are missing at the first point in time (for example by step 1904, based on the analysis of the data captured using the plurality of sensors, etc.) and a determination that products of the particular product type are missing at the second point in time (for example by step 1906, based on the analysis of the data captured using the plurality of sensors, etc.), step 1908 may select not to display the particular item on the electronic visual display in the retail store, and in response to at least one of a determination that products of the particular product type are available at the preceding point in time, a determination that products of the particular product type are available at the first point in time (for example by step 1904, based on the analysis of the data captured using the plurality of sensors, etc.) and the determination that products of the particular product type are available at the second point in time (for example by step 1906, based on the analysis of the data captured using the plurality of sensors, etc.), step 1908 may select to display the particular item on the electronic visual display in the retail store. In yet another example, in response to a determination that products of the particular product type are missing at the preceding point in time, a determination that products of the particular product type are missing at the first point in time (for example by step 1904, based on the analysis of the data captured using the plurality of sensors, etc.) and a determination that products of the particular product type are missing at the second point in time (for example by step 1906, based on the analysis of the data captured using the plurality of sensors, etc.), step 1908 may select to display the particular item on the electronic visual display in the retail store, and in response to at least one of a determination that products of the particular product type are available at the preceding point in time, a determination that products of the particular product type are available at the first point in time (for example by step 1904, based on the analysis of the data captured using the plurality of sensors, etc.) and the determination that products of the particular product type are available at the second point in time (for example by step 1906, based on the analysis of the data captured using the plurality of sensors, etc.), step 1908 may select not to display the particular item on the electronic visual display in the retail store, for example where the particular item may include an indication of a prolong shortage of the particular product type. In an additional example, in response to a determination that products of the particular product type are missing at the preceding point in time, a determination that products of the particular product type are available at the first point in time (for example by step 1904, based on the analysis of the data captured using the plurality of sensors, etc.) and a determination that products of the particular product type are missing at the second point in time (for example by step 1906, based on the analysis of the data captured using the plurality of sensors, etc.), step 1908 may select to display the particular item on the electronic visual display in the retail store, and in response to at least one of a determination that products of the particular product type are available at the preceding point in time and a determination that products of the particular product type are available at the second point in time (for example by step 1906, based on the analysis of the data captured using the plurality of sensors, etc.), step 1908 may select not to display the particular item on the electronic visual display in the retail store, for example where the particular item may include an indication of a repeated shortage of the particular product type, or in another example, where in response to a determination that products of the particular product type are missing at the first point in time (for example by step 1904, based on the analysis of the data captured using the plurality of sensors, etc.), step 1908 may select not to display the particular item on the electronic visual display in the retail store.

In some examples, step 1908 may further base the selection of whether to display the particular item on the electronic visual display in the retail store on an elapsed time between the first point in time and the second point in time. For example, in response to a first elapsed time between the first point in time and the second point in time, step 1908 may select to display the particular item on the electronic visual display in the retail store, and in response to a second elapsed time between the first point in time and the second point in time, step 1908 may select not to display the particular item on the electronic visual display in the retail store.

In some examples, step 1908 may further base the selection of whether to display the particular item on the electronic visual display in the retail store on an elapsed time since the second point in time. For example, in response to a first elapsed time since the second point in time, step 1908 may select to display the particular item on the electronic visual display in the retail store, and in response to a second elapsed time since the second point in time, step 1908 may select not to display the particular item on the electronic visual display in the retail store.

In some examples, for example in response to a selection to display the particular item by step 1908 and/or by step 2106, step 1910 may cause the electronic visual display to display the particular item, for example as described above. In some examples, for example in response to a selection not to display the particular item by step 1908 and/or by step 2106, step 1912 may forgo causing the electronic visual display to display the particular item.

In some examples, step 2008 may comprise selecting at least one display parameter for a particular item, for example based on the determination of whether products of the particular product type are available at the first point in time (for example of step 1904, based on the analysis of the data captured using the plurality of sensors positioned on a shelf in the retail store and configured to be positioned between the shelf and products positioned on the shelf, etc.) and/or the determination of whether products of the particular product type are available at the second point in time (for example of step 1906, based on the analysis of the data captured using the plurality of sensors positioned on a shelf in the retail store and configured to be positioned between the shelf and products positioned on the shelf, etc.) For example, in response to a first combination of the determination of whether products of the particular product type are available at the first point in time and the determination of whether products of the particular product type are available at the second point in time, step 2008 may select a first at least one display parameter for the particular item, and in response to a second combination of the determination of whether products of the particular product type are available at the first point in time and the determination of whether products of the particular product type are available at the second point in time, step 2008 may select a second at least one display parameter for the particular item, the at least one display parameter may differ from the first at least one display parameter.

In some examples, the plurality of images obtained by step 1902 may further comprise a preceding image corresponding to a preceding point in time, the preceding point in time may be earlier than the first point in time, and the preceding image may be analyzed to determine whether products of the particular product type are available at the preceding point in time, for example as described above. Further, step 2008 may further base the selection of the at least one display parameter for the particular item on the determination of whether products of the particular product type are available at the preceding point in time. For example, in response to a first combination of the determination of whether products of the particular product type are available at the first point in time, the determination of whether products of the particular product type are available at the second point in time and the determination of whether products of the particular product type are available at the preceding point in time, step 2008 may select a first at least one display parameter for the particular item, and in response to a second combination of the determination of whether products of the particular product type are available at the first point in time, the determination of whether products of the particular product type are available at the second point in time and the determination of whether products of the particular product type are available at the preceding point in time, step 2008 may select a second at least one display parameter for the particular item, the at least one display parameter may differ from the first at least one display parameter.

In some examples, step 2008 may further base the selection of the at least one display parameter for the particular item on an elapsed time between the first point in time and the second point in time. For example, in response to a first elapsed time between the first point in time and the second point in time, step 2008 may select a first at least one display parameter for the particular item, and in response to a second elapsed time between the first point in time and the second point in time, step 2008 may select a second at least one display parameter for the particular item, the second at least one display parameter may differ from the first at least one display parameter.

In some examples, step 2008 may further base the selection of the at least one display parameter for the particular item on an elapsed time since the second point in time. For example, in response to a first elapsed time since the second point in time, step 2008 may select a first at least one display parameter for the particular item, and in response to a second elapsed time since the second point in time, step 2008 may select a second at least one display parameter for the particular item, the second at least one display parameter may differ from the first at least one display parameter.

In some examples, step 2010 may comprise using the at least one display parameter selected by step 2108 and/or by step 2206 to display the particular item on an electronic visual display in the retail store.

In some examples, step 2102 may comprise obtaining an image of products in a retail store captured using at least one image sensor. For example, the image of products in the retail store may be read from memory (for example, from memory 226 or from memory 1226), may be received from an external system (for example, using network interface 206), may be captured using image sensors (for example, using capturing device 125), and so forth.

In some examples, step 2104 may comprise analyzing the image obtained by step 2102 to determine a condition of products of a particular product type. In some examples, a preceding image of products in a retail store captured using the at least one image sensor at a preceding point in time before the capturing time of the image may be obtained, and the preceding image to may be analyzed to determine a preceding condition of the products of the particular product type at the preceding point in time. For example, a machine learning model may be trained using training examples to determine condition of products from images of the products, step 2104 may use the trained machine learning model to analyze the image obtained by step 2102 to determine the condition of products of the particular product type at the capturing time of the image obtained by step 2102, and/or the trained machine learning model may be used to analyze the preceding image to determine the preceding condition of the products of the particular product type at the preceding point in time. An example of such training example may include an image of products, together with a label indicating the condition of the product. In another example, an artificial neural network (such as a deep neural network, a convolutional neural network, etc.) may be configured to determine condition of products from images of the products, step 2104 may use the artificial neural network to analyze the image obtained by step 2102 to determine the condition of products of the particular product type at the capturing time of the image obtained by step 2102, and/or the artificial neural network may be used to analyze the preceding image to determine the preceding condition of the products of the particular product type at the preceding point in time.

In some examples, an electronic visual display (such as the electronic visual display of method 1700, of method 1900, of method 2000, of method 2100, of method 2200, of FIG. 16A-16F, etc.) may be connected to a shelf in the retail store. In one example, the condition of products of the particular product type determined by step 2104 may include a condition of products of the particular product type placed on the shelf. In another example, the condition of products of the particular product type determined by step 2104 may include a condition of products of the particular product type placed under the shelf.

In some examples, an electronic visual display (such as the electronic visual display of method 1700, of method 1800, of method 1900, of method 2000, of method 2100, of method 2200, of FIG. 13A-13C, of FIG. 14A-14F, of FIG. 15A-15H, etc.) may be connected to a door of a retail storage container in the retail store. In one example, the condition of products of the particular product type determined by step 2104 may include a condition of products of the particular product type placed in the retail storage container.

Additionally or alternatively to step 2102, method 2100 and/or method 2200 may comprise obtaining data captured using a plurality of sensors positioned on a shelf in the retail store and configured to be positioned between the shelf and products positioned on the shelf (for example as described in relation to FIGS. 8A, 8B and 9). Further, additionally or alternatively to step 2104, method 2100 and/or method 2200 may comprise basing the determination of the condition of the products of the particular product type on an analysis of the data captured using the plurality of sensors. Some non-limiting examples of such sensors may include pressure sensors, touch sensors, light sensors, weight sensors, electrical impedance sensors, and so forth. For example, a machine learning model may be trained using training examples to determine a condition of the products of the particular product type from data captured using the plurality of sensors, and step 2104 may use the trained machine learning model to analyze the data captured using the plurality of sensors to determine the condition of the products of the particular product type. An example of such training example may include data captured using the plurality of sensors, together with a label indicating the condition of the products of the particular product type. In another example, an artificial neural network (such as a deep neural network, a convolutional neural network, etc.) may be configured to determine a condition of the products of the particular product type from data captured using the plurality of sensors, and step 2104 may use the artificial neural network to analyze the data captured using the plurality of sensors to determine the condition of the products of the particular product type. In one example, electrical impedance data captured using a plurality of electrical impedance sensors positioned on a shelf in the retail store and configured to be positioned between the shelf and products positioned on the shelf may be obtained, and the determination of the condition of the products of the particular product type may be based on an analysis of the electrical impedance data captured using the plurality of electrical impedance sensors (for example as described above). In one example, light data captured using a plurality of light sensors positioned on a shelf in the retail store and configured to be positioned between the shelf and products positioned on the shelf may be obtained, and the determination of the condition of the products of the particular product type may be based on an analysis of the light data captured using the plurality of light sensors (for example as described above).

In some examples, step 2106 may comprise selecting whether to display a particular item on an electronic visual display in the retail store, for example based on the condition of the products of the particular product type determined by step 2104, based on the condition of the products of the particular product type determined based on the analysis of the data captured using the plurality of sensors positioned on a shelf in the retail store and configured to be positioned between the shelf and products positioned on the shelf, and so forth. For example, in response to a first determined condition of the products of the particular product type, step 2106 may select to display the particular item on the electronic visual display in the retail store, and in response to a second determined condition of the products of the particular product type, step 2106 may select not to display the particular item on the electronic visual display in the retail store. In another example, in response to a first determined condition of the products of the particular product type, step 2106 may select to display the particular item on the electronic visual display in the retail store, and in response to a second determined condition of the products of the particular product type, step 2106 may select to display an alternative item on the electronic visual display in the retail store. In yet another example, in response to a determination that the condition of the products of the particular product type is a good condition, step 2106 may select to display the particular item on the electronic visual display in the retail store, and in response to a determination that the condition of the products of the particular product type is a bad condition, step 2106 may select not to display the particular item on the electronic visual display in the retail store, for example where the particular item may include an indication of the particular product type. In an additional example, in response to a determination that the condition of the products of the particular product type is a bad condition, step 2106 may select to display the particular item on the electronic visual display in the retail store, and in response to a determination that the condition of the products of the particular product type is a good condition, step 2106 may select not to display the particular item on the electronic visual display in the retail store, for example where the particular item may include a promotion corresponding to the particular product type. In some examples, in response to a determination that the condition of the products of the particular product type is a condition that requires maintenance, step 2106 may select to display the particular item on the electronic visual display in the retail store, and in response to a determination that the condition of the products of the particular product type is a condition that do not require maintenance, step 2106 may select not to display the particular item on the electronic visual display in the retail store, for example where the particular item may include an indication of the required maintenance, may include an indication of the condition, may include an indication to a store associate, and so forth.

In some examples, step 2106 may further base the selection of whether to display the particular item on the electronic visual display in the retail store on an elapsed time since the capturing of the image obtained by step 2102. For example, in response to a first elapsed time since the capturing of the image obtained by step 2102, step 2106 may select to display the particular item on the electronic visual display in the retail store, and in response to a second elapsed time since the capturing of the image obtained by step 2102, step 2106 may select not to display the particular item on the electronic visual display in the retail store.

In some examples, a preceding image of products in a retail store captured using the at least one image sensor at a preceding point in time before the capturing time of the image may be obtained, and the preceding image to may be analyzed to determine a preceding condition of the products of the particular product type at the preceding point in time. Further, step 2106 may further base the selection of whether to display the particular item on the electronic visual display in the retail store on the determined preceding condition of the products of the particular product type at the preceding point in time. For example, in response to a first determined preceding condition, step 2106 may select to display the particular item on the electronic visual display in the retail store, and in response to a second determined preceding condition, step 2106 may select not to display the particular item on the electronic visual display in the retail store. In some examples, the determined preceding condition may be compared with the determined condition example, and step 2106 may base the selection of whether to display the particular item on the electronic visual display in the retail store on a result of the comparison. For example, in response to a first result of the comparison, step 2106 may select to display the particular item on the electronic visual display in the retail store, and in response to a second result of the comparison, step 2106 may select not to display the particular item on the electronic visual display in the retail store. In some examples, the determined preceding condition and the determined condition may be used to predict a future condition of products of the particular product type at a later point in time after the capturing time of the image (for example, using an extrapolation algorithm), and step 2106 may base the selection of whether to display the particular item on the electronic visual display in the retail store on the predicted future condition. For example, in response to a first predicted future condition, step 2106 may select to display the particular item on the electronic visual display in the retail store, and in response to a second predicted future condition, step 2106 may select not to display the particular item on the electronic visual display in the retail store.

In some examples, the image obtained by step 2102 may be analyzed (for example in a similar manner as described above with respect to step 2104) to determine a condition of the products of a second product type (the second product type may differ from the particular product type), and step 2106 may further base the selection of whether to display the particular item on the electronic visual display in the retail store on the determined condition of the products of the second product type. For example, the determined condition of the products of the particular product type may be compared with the determined condition of the products of the second product type, in response to a first result of the comparison, step 2106 may select to display the particular item on the electronic visual display in the retail store, and in response to a second result of the comparison, step 2106 may select not to display the particular item on the electronic visual display in the retail store.

In some examples, the selection of whether to display the particular item on the electronic visual display in the retail store by step 1908 and/or by step 2106 may be further based on information related to a person in a vicinity of the electronic visual display. For example, in response to a first information related to the person in the vicinity of the electronic visual display, step 1908 and/or step 2106 may select to display the particular item on the electronic visual display in the retail store, and in response to a second information related to the person in the vicinity of the electronic visual display, step 1908 and/or step 2106 may select not to display the particular item on the electronic visual display in the retail store. In some examples, the selection of whether to display the particular item on the electronic visual display in the retail store by step 1908 and/or by step 2106 may be further based on an analysis of an image of a person in a vicinity of the electronic visual display. For example, the image may be analyzed to determine information related to the person (such as an identity of the person, an indication of a gender of the person, an indication of an age of a person, an indication of a social economic group of the person, a height of the person, an indication of a weight of the person, etc.), and the selection of whether to display the particular item on the electronic visual display in the retail store by step 1908 and/or by step 2106 may be further based on the determined information related to the person. In another example, the selection of whether to display the particular item on the electronic visual display in the retail store by step 1908 and/or by step 2106 may be further based on an identity of a person in a vicinity of the electronic visual display. In yet another example, the selection of whether to display the particular item on the electronic visual display in the retail store by step 1908 and/or by step 2106 may be further based on at least one of an indication of a gender of the person, an indication of an age of the person, and an indication of a social economic group of the person. In an additional example, the selection of whether to display the particular item on the electronic visual display in the retail store by step 1908 and/or by step 2106 may be further based on at least one of an indication of a height of the person and an indication of a weight of the person.

In some examples, the selection of whether to display the particular item on the electronic visual display in the retail store by step 1908 and/or by step 2106 may be further based on a current time of day and/or on opening hours of the retail store. For example, in response to a first time of day, step 1908 and/or step 2106 may select to display the particular item on the electronic visual display in the retail store, and in response to a second time of day, step 1908 and/or step 2106 may select not to display the particular item on the electronic visual display in the retail store. In another example, the current time of day may be compared with opening hours of the retail store in response to a first result of the comparison, step 1908 and/or step 2106 may select to display the particular item on the electronic visual display in the retail store, and in response to a second result of the comparison, step 1908 and/or step 2106 may select not to display the particular item on the electronic visual display in the retail store.

In some examples, step 2206 may comprise selecting at least one display parameter for a particular item, for example based on the condition of the products of the particular product type determined by step 2104, based on the condition of the products of the particular product type determined based on the analysis of the data captured using the plurality of sensors positioned on a shelf in the retail store and configured to be positioned between the shelf and products positioned on the shelf, and so forth. For example, in response to a first determined condition of the products of the particular product type, step 2206 may select a first at least one display parameter for the particular item, and in response to a second determined condition of the products of the particular product type, step 2206 may select a second at least one display parameter for the particular item, the second at least one display parameter may differ from the first at least one display parameter. In another example, in response to a determination that the condition of the products of the particular product type is a good condition, step 2206 may select a first at least one display parameter for the particular item, and in response to a determination that the condition of the products of the particular product type is a bad condition, step 2206 may select a second at least one display parameter for the particular item, the second at least one display parameter may differ from the first at least one display parameter. In yet another example, in response to a determination that the condition of the products of the particular product type is a condition that requires maintenance, step 2206 may select a first at least one display parameter for the particular item, and in response to a determination that the condition of the products of the particular product type is a condition that do not require maintenance, step 2206 may select a second at least one display parameter for the particular item, the second at least one display parameter may differ from the first at least one display parameter.

In some examples, the determined condition of the products of the particular product type may be a condition that requires maintenance, and the image obtained by step 2102 may be analyzed to determine an indicator of urgency of the required maintenance. For example, a machine learning model may be trained using training examples to determine urgency of required maintenance from images, and the trained machine learning model may be used to analyze the image obtained by step 2102 and determine the indicator of urgency of the required maintenance. An example of such training example may include an image of a condition requiring maintenance activity, together with a label indicating the required maintenance. In another example, an artificial neural network (such as a deep neural network, a convolutional neural network, etc.) may be configured to determine urgency of required maintenance from images, and the artificial neural network may be used to analyze the image obtained by step 2102 and determine the indicator of urgency of the required maintenance. In yet another example, the indicator of urgency of the required maintenance may be determined based on the determined condition of the products of the particular product type, for example using a lookup table or a function that takes as input the determined condition of the products of the particular product type and returns a corresponding indication of urgency. Further, in some examples, step 2206 may further base the selection of the at least one display parameter for the particular item on the determined indicator of the urgency of the required maintenance, for example where the particular item may include an indication of the required maintenance, may include an indication of the condition, may include an indication to a store associate, and so forth. For example, in response to a first determined indicator of the urgency, step 2206 may select a first at least one display parameter for the particular item, and in response to a second determined indicator of the urgency, step 2206 may select a second at least one display parameter for the particular item, the second at least one display parameter may differ from the first at least one display parameter.

In some examples, step 2206 may further base the selection of the at least one display parameter for the particular item on an elapsed time since the capturing of the image obtained by step 2102. For example, in response to a first elapsed time since the capturing of the image obtained by step 2102, step 2206 may select a first at least one display parameter for the particular item, and in response to a second elapsed time since the capturing of the image obtained by step 2102, step 2206 may select a second at least one display parameter for the particular item, the second at least one display parameter may differ from the first at least one display parameter.

In some examples, a preceding image of products in a retail store captured using the at least one image sensor at a preceding point in time before the capturing time of the image may be obtained, and the preceding image to may be analyzed to determine a preceding condition of the products of the particular product type at the preceding point in time. Further, step 2206 may further base the selection of the at least one display parameter for the particular item on the determined preceding condition. For example, in response to a first determined preceding condition, step 2206 may select a first at least one display parameter for the particular item, and in response to a second determined preceding condition, step 2206 may select a second at least one display parameter for the particular item, the second at least one display parameter may differ from the first at least one display parameter. In some examples, the determined preceding condition may be compared with the determined condition example, and step 2206 may base the selection of the at least one display parameter for the particular item on a result of the comparison. For example, in response to a first result of the comparison, step 2206 may select a first at least one display parameter for the particular item, and in response to a second result of the comparison, step 2206 may select a second at least one display parameter for the particular item, the second at least one display parameter may differ from the first at least one display parameter. In some examples, the determined preceding condition and the determined condition may be used to predict a future condition of products of the particular product type at a later point in time after the capturing time of the image (for example, using an extrapolation algorithm), and step 2206 may base the selection of the at least one display parameter for the particular item on the electronic visual display in the retail store on the predicted future condition. For example, in response to a first predicted future condition, step 2206 may select a first at least one display parameter for the particular item, and in response to a second predicted future condition, step 2206 may select a second at least one display parameter for the particular item, the second at least one display parameter may differ from the first at least one display parameter.

In some examples, the image obtained by step 2102 may be analyzed (for example in a similar manner as described above with respect to step 2104) to determine a condition of the products of a second product type (the second product type may differ from the particular product type), and step 2206 may further base the selection of the at least one display parameter for the particular item on the determined condition of the products of the second product type. For example, the determined condition of the products of the particular product type may be compared with the determined condition of the products of the second product type, in response to a first result of the comparison, step 2206 may select a first at least one display parameter for the particular item, and in response to a second result of the comparison, step 2206 may select a second at least one display parameter for the particular item, the second at least one display parameter may differ from the first at least one display parameter.

In some examples, the selection of the at least one display parameter for the particular item by step 2008 and/or by step 2206 may be further based on information related to a person in a vicinity of the electronic visual display. For example, in response to a first information related to the person in the vicinity of the electronic visual display, step 2008 and/or by step 2206 may select a first at least one display parameter for the particular item, and in response to a second information related to the person in the vicinity of the electronic visual display, step 2008 and/or by step 2206 may select a second at least one display parameter for the particular item, the second at least one display parameter for the particular item may differ from the first at least one display parameter for the particular item. In some examples, the selection of the at least one display parameter for the particular item by step 2008 and/or by step 2206 may be further based on an analysis of an image of a person in a vicinity of the electronic visual display, the image may be captured from an environment of the electronic visual display using an image sensor. For example, the image may be analyzed to determine information related to the person (such as an identity of the person, an indication of a gender of the person, an indication of an age of a person, an indication of a social economic group of the person, a height of the person, an indication of a weight of the person, etc.), and the selection of the at least one display parameter for the particular item by step 2008 and/or by step 2206 may be further based on the determined information related to the person. In another example, the selection of the at least one display parameter for the particular item by step 2008 and/or by step 2206 may be further based on an identity of a person in a vicinity of the electronic visual display. In yet another example, the selection of the at least one display parameter for the particular item by step 2008 and/or by step 2206 may be further based on at least one of an indication of a gender of the person, an indication of an age of the person, and an indication of a social economic group of the person. In an additional example, the selection of the at least one display parameter for the particular item by step 2008 and/or by step 2206 may be further based on at least one of an indication of a height of the person and an indication of a weight of the person.

In some examples, the selection of the at least one display parameter for the particular item by step 2008 and/or by step 2206 may be further based on a current time of day and/or on opening hours of the retail store. For example, in response to a first time of day, step 2008 and/or by step 2206 may select a first at least one display parameter for the particular item, and in response to a second time of day, step 2008 and/or by step 2206 may select a second at least one display parameter for the particular item, the second at least one display parameter for the particular item may differ from the first at least one display parameter for the particular item. In another example, the current time of day may be compared with opening hours of the retail store in response to a first result of the comparison, step 2008 and/or by step 2206 may select a first at least one display parameter for the particular item, and in response to a second result of the comparison, step 2008 and/or by step 2206 may select a second at least one display parameter for the particular item, the second at least one display parameter for the particular item may differ from the first at least one display parameter for the particular item.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A non-transitory computer-readable medium including instructions that when executed by a processor cause the processor to perform a method for customized presentation of items on electronic visual displays in retail stores, the method comprising:
    obtaining a plurality of images of products in a retail store captured using at least one image sensor, the plurality of images comprises at least a first image corresponding to a first point in time and a second image corresponding to a second point in time, the first point in time is earlier than the second point in time;
    analyzing, using a machine learning model trained using training example images and product type availabilities associated with the training example images, the first image to determine whether products of a particular product type are available at the first point in time;
    analyzing, using the machine learning model, the second image to determine whether products of the particular product type are available at the second point in time;
    analyzing the second image to determine at least one position associated with the particular product type;
    using the determined at least one position associated with the particular product type to select a region of an electronic visual display in the retail store;
    based on the determination of whether products of the particular product type are available at the first point in time and the determination of whether products of the particular product type are available at the second point in time, selecting at least one display parameter for a particular item; and
    using the selected at least one display parameter to display the particular item on the selected region of the electronic visual display in the retail store.

2. The non-transitory computer-readable medium of claim 1, wherein the at least one display parameter includes a display size for the particular item.

3. The non-transitory computer-readable medium of claim 1, wherein the at least one display parameter includes a motion pattern for the particular item.

4. The non-transitory computer-readable medium of claim 1, wherein the at least one display parameter includes a display position on the electronic visual display for the particular item.

5. The non-transitory computer-readable medium of claim 1, wherein the at least one display parameter includes a color scheme for the particular item.

6. The non-transitory computer-readable medium of claim 1, wherein the plurality of images comprises a preceding image corresponding to a preceding point in time, the preceding point in time is earlier than the first point in time, and the method further comprises:
    analyzing the preceding image to determine whether products of the particular product type are available at the preceding point in time; and
    further basing the selection of the at least one display parameter for the particular item on the determination of whether products of the particular product type are available at the preceding point in time.

7. The non-transitory computer-readable medium of claim 1, wherein the selection of the at least one display parameter for the particular item is further based on an elapsed time between the first point in time and the second point in time.

8. The non-transitory computer-readable medium of claim 1, wherein the selection of the at least one display parameter for the particular item is further based on an elapsed time since the second point in time.

9. The non-transitory computer-readable medium of claim 1, wherein the selection of the at least one display parameter for the particular item is further based on information related to a person in a vicinity of the electronic visual display.

10. The non-transitory computer-readable medium of claim 1, wherein the selection of the at least one display parameter for the particular item is further based on a time of day.

11. The non-transitory computer-readable medium of claim 1, wherein the electronic visual display is connected to a shelf in the retail store.

12. The non-transitory computer-readable medium of claim 1, wherein the electronic visual display is connected to a door of a retail storage container in the retail store.

13. The non-transitory computer-readable medium of claim 1, wherein the electronic visual display is part of a personal device of a store associate.

14. The non-transitory computer-readable medium of claim 1, wherein the electronic visual display is part of a personal device of a customer.

15. The non-transitory computer-readable medium of claim 1, wherein the method further comprises:
    obtaining data captured at the first point in time using a plurality of sensors positioned on a shelf in the retail store and configured to be positioned between the shelf and products positioned on the shelf;
    obtaining data captured at the second point in time using the plurality of sensors;

basing the determination of whether products of the particular product type are available at the first point in time on an analysis of the data captured at the first point in time using the plurality of sensors; and basing the determination of whether products of the particular product type are available at the second point in time on an analysis of the data captured at the second point in time using the plurality of sensors.

16. The non-transitory computer-readable medium of claim 1, wherein the method further comprises:

obtaining weight data captured at the first point in time using a weight sensor corresponding to at least part of a shelf in the retail store;

obtaining weight data captured at the second point in time using the weight sensor;

basing the determination of whether products of the particular product type are available at the first point in time on an analysis of the weight data captured at the first point in time using the weight sensor; and basing the determination of whether products of the particular product type are available at the second point in time on an analysis of the weight data captured at the second point in time using the weight sensor.

17. The non-transitory computer-readable medium of claim 1, wherein the selection of the region of the electronic visual display is further based on a position of a face of a person facing a retail storage container.

18. A method for customized presentation of items on electronic visual displays in retail stores, the method comprising:

obtaining a plurality of images of products in a retail store captured using at least one image sensor, the plurality of images comprises at least a first image corresponding to a first point in time and a second image corresponding to a second point in time, the first point in time is earlier than the second point in time;

analyzing, using a machine learning model trained using training example images and product type availabilities associated with the training example images, the first image to determine whether products of a particular product type are available at the first point in time;

analyzing, using the machine learning model, the second image to determine whether products of the particular product type are available at the second point in time;

analyzing the second image to determine at least one position associated with the particular product type;

using the determined at least one position associated with the particular product type to select a region of an electronic visual display in the retail store;

based on the determination of whether products of the particular product type are available at the first point in time and the determination of whether products of the particular product type are available at the second point in time, selecting at least one display parameter for a particular item; and using the selected at least one display parameter to display the particular item on the selected region of the electronic visual display in the retail store.

19. A system for customized presentation of items on electronic visual displays in retail stores, the system comprising:

at least one processor configured to:

obtain a plurality of images of products in a retail store captured using at least one image sensor, the plurality of images comprises at least a first image corresponding to a first point in time and a second image corresponding to a second point in time, the first point in time is earlier than the second point in time;

analyze, using a machine learning model trained using training example images and product type availabilities associated with the training example images, the first image to determine whether products of a particular product type are available at the first point in time;

analyze, using the machine learning model, the second image to determine whether products of the particular product type are available at the second point in time;

analyze the second image to determine at least one position associated with the particular product type;

use the determined at least one position associated with the particular product type to select a region of an electronic visual display in the retail store;

based on the determination of whether products of the particular product type are available at the first point in time and the determination of whether products of the particular product type are available at the second point in time, select at least one display parameter for a particular item; and use the selected at least one display parameter to display the particular item on the selected region of the electronic visual display in the retail store.

* * * * *